US012707501B2

(12) United States Patent
Ramachandra et al.

(10) Patent No.: US 12,707,501 B2
(45) Date of Patent: Aug. 11, 2026

(54) UE, NETWORKS NODES, AND METHODS PERFORMED THEREBY, FOR HANDLING RACH-REPORTS

(71) Applicant: Telefonaktiebolaget LM Ericsson (publ), Stockholm (SE)

(72) Inventors: Pradeepa Ramachandra, Linköping (SE); Angelo Centonza, Granada (ES); Marco Belleschi, Solna (SE); Ali Parichehrehteroujeni, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 678 days.

(21) Appl. No.: 18/022,186

(22) PCT Filed: Aug. 20, 2021

(86) PCT No.: PCT/SE2021/050817
§ 371 (c)(1),
(2) Date: Feb. 20, 2023

(87) PCT Pub. No.: WO2022/039661
PCT Pub. Date: Feb. 24, 2022

(65) Prior Publication Data
US 2024/0215072 A1 Jun. 27, 2024

Related U.S. Application Data

(60) Provisional application No. 63/068,590, filed on Aug. 21, 2020.

(51) Int. Cl.
*H04W 4/00* (2018.01)
*H04W 48/16* (2009.01)
(Continued)

(52) U.S. Cl.
CPC ....... *H04W 74/0833* (2013.01); *H04W 48/16* (2013.01); *H04W 74/0836* (2024.01)

(58) Field of Classification Search
CPC .......................... H04W 48/16; H04W 74/0833
(Continued)

(56) References Cited

U.S. PATENT DOCUMENTS

2012/0039302 A1* 2/2012 Chun ................ H04W 36/0027 370/331
2014/0036817 A1* 2/2014 Chang ............... H04W 72/0446 370/329
(Continued)

FOREIGN PATENT DOCUMENTS

CN 105722213 B 8/2019
JP 2020524432 A 8/2020
(Continued)

OTHER PUBLICATIONS

3GPP, "3rd Generation Partnership Project; Technical Specification Group Radio Access Network; NG-RAN; F1 application protocol (F1AP) (Release 16)", 3GPP TS 38.473 V16.2.0, Jul. 2020, 1-363.
(Continued)

*Primary Examiner* — Temica M Beamer
(74) *Attorney, Agent, or Firm* — Murphy, Bilak & Homiller, PLLC

(57) ABSTRACT

A method for providing one or more indications related to a random access procedure by a first node (101) to a second cell (122, 124), when served by a first cell (121). The second cell (122, 124) is a secondary cell. The first node (111) registers (1401) a first identifier of the second cell (122, 124) and one or more first indications indicating at least one of: i) a second identifier of the first cell (121), ii) a third identifier of a primary secondary cell (123), iii) a fourth identifier of a first network node (111) owning the first cell
(Continued)

(121), iv) a fifth identifier of a second network node (112) owning the primary secondary cell (123), and v) an indicator of a cell group the second cell (122, 124) belongs to. The first node (111) also provides (1402) one or more second indications based on the registered identifier and indications.

25 Claims, 18 Drawing Sheets

(51) Int. Cl.
*H04W 74/0833* (2024.01)
*H04W 74/0836* (2024.01)

(58) Field of Classification Search
USPC .......................................................... 370/328
See application file for complete search history.

(56) References Cited

U.S. PATENT DOCUMENTS

| | | | | |
|---|---|---|---|---|
| 2017/0111932 | A1 | 4/2017 | Uemura et al. | |
| 2017/0289937 | A1 | 10/2017 | Urabayashi et al. | |
| 2020/0021452 | A1 * | 1/2020 | Sharma | H04L 12/189 |
| 2022/0159726 | A1 | 5/2022 | Ohara | |

FOREIGN PATENT DOCUMENTS

| | | | |
|---|---|---|---|
| WO | 2015141637 | A1 | 9/2015 |
| WO | 2016047513 | | 3/2016 |
| WO | 2018232381 | A1 | 12/2018 |
| WO | 2020074636 | A1 | 4/2020 |
| WO | 2020166047 | A1 | 8/2020 |

OTHER PUBLICATIONS

3GPP , "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.3.0, Sep. 2018, 1-358.

3GPP , "3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340 V16.2.0, Jul. 2020, 1-78.

3GPP , "3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.0.0, Mar. 2020, 1-1048.

3GPP , "3rd Generation Partnership Project; Technical Specification Group Radio Access Network; NG-RAN; NG Application Protocol (NGAP) (Release 16)", 3GPP TS 38.413 V16.2.0, 2020-07, 1-462.

3GPP , "3rd Generation Partnership Project; Technical Specification Group Radio Access Network; NG-RAN; Xn application protocol (XnAP) (Release 16)", 3GPP TS 38.423 V16.2.0, Jul. 2020, 1-447.

3GPP , "3rd Generation Partnership Project; Technical Specification Group Radio Access Network; NR; Radio Resource Control (RRC) protocol specification (Release 16)", 3GPP TS 38.331 V16.0.0, Mar. 2020, 1-835.

Unknown, Author , "Changes related to RAReport and logged MDT report contents—NBC change", 3GPP TSG-RAN WG2 Meeting #112-e, R2-2010609, Electronic Meeting, Nov. 2-13, 2020, 1-15.

Unknown, Author , "Corrections for the Content of RACH Records", 3GPP TSG RAN WG2#109-e R2-2000106 Electronic meeting, Feb. 24-Mar. 6, 2020, 1-20.

Unknown, Author , "Email discussion report: [AT109e][804][SON/MDT]SON open issues (Ericsson)", 3GPP TSG-RAN WG2 #109-e, TDoc R2-2001992, Electronic meeting, Feb. 24-Mar. 6, 2020, 1-30.

Unknown, Author , "Feature summary for SON contributions in AI 6.12.4", 3GPP TSG-RAN WG2 #109-e, TDoc R2-2002025, Electronic meeting, Feb. 24-Mar. 6, 2020, 1-15.

Unknown, Author , "On the need of SCell indication in the RA-report", 3GPP TSG-RAN WG2 #111e Tdoc R2-2007657, Electronic meeting, Aug. 17-28, 2020, 1-14.

Unknown, Author, "Summary of AI 8.13.2-SON, RAN2 scope and requirements", Ericsson, 3GPP TSG RAN WG2 #111-e R2 2007662, Electronic meeting, Aug. 17-Aug. 28, 2020, pp. 1-24.

* cited by examiner a)

b)

a)

1701. Registering unit

1702. Providing unit

1703. Clearing unit

1704. Other units

1705. Processor

1707. Receiving port

1706. Memory

1708. Sending port

First node 101

1710 COMPUTER-READABLE MEDIUM

PROGRAM 1709 b)

1711. Radio circuitry

1705. Processing circuitry

1706. Memory

First node 101 a)

b)

UE, NETWORKS NODES, AND METHODS PERFORMED THEREBY, FOR HANDLING RACH-REPORTS

TECHNICAL FIELD

The present disclosure relates generally to a first node, and methods performed thereby, for providing one or more indications related to a random access procedure by the first node to a second cell, when served by a first cell, the second cell being a secondary cell. The present disclosure also relates generally to a second node, and methods performed thereby, for handling the one or more indications related to the random access procedure by the first node to the second cell, when served by the first cell. The present disclosure further relates generally to a third node, and methods performed thereby, for handling the one or more indications related to the random access procedure by the first node to the second cell, when served by the first cell.

BACKGROUND

Wireless devices within a wireless communications network may be e.g., User Equipments (UE), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, which may be an access node such as a radio network node, radio node or a base station, e.g., a Radio Base Station (RBS), which sometimes may be referred to as e.g., NR base station (gNB), evolved Node B or (EUTRAN) base station ("eNB"), "eNodeB", "NodeB", "B node", Transmission Point (TP), or Base Transceiver Station (BTS), depending on the technology and terminology used. The base stations may be of different classes such as e.g., Wide Area Base Stations, Medium Range Base Stations, Local Area Base Stations, Home Base Stations, pico base stations, etc. . . . , based on transmission power and thereby also cell size. A cell is the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

The standardization organization 3GPP is currently in the process of specifying a New Radio Interface called NR or 5G-Universal Terrestrial Radio Access (UTRA), as well as a Fifth Generation (5G) Packet Core Network, which may be referred to as Next Generation (NG) Core Network, abbreviated as NG-CN, NGC or 5G CN.

Dual Connectivity in LTE

Evolved Universal Terrestrial Radio Access Network (E-UTRAN) may support Dual Connectivity (DC) operation whereby a multiple Receive/Transmit (Rx/Tx) UE in RRC_CONNECTED may be configured to utilize radio resources provided by two distinct schedulers, located in two eNBs connected via a non-ideal backhaul over the X2 interface, see 3GPP 36.300, v. 15.3.0. eNBs involved in DC for a certain UE may assume two different roles: an eNB may either act as a Master node or Master eNB (MeNB) (either abbreviated as MN) or as an Secondary node or Secondary eNB (SeNB) (either abbreviated as SN). In DC, a UE may be connected to one Master Node (MN) and one SN.

In LTE DC, the radio protocol architecture that a particular bearer may use may depend on how the bearer may be setup. Three bearer types may exist: Master Cell Group (MCG) bearer, Secondary Cell Group (SCG) bearer and split bearers. Radio Resource Control (RRC) may be located in the MN and Signaling Radio Bearers (SRBs) may always be configured as MCG bearer type and may therefore only use the radio resources of the MN.

LTE-NR Dual Connectivity

LTE-New Radio (NR) DC, also referred to as LTE-NR tight interworking, is currently being discussed for rel-15. In this context, the major changes from LTE DC may be understood to be: the introduction of a split bearer from the SN, known as SCG split bearer, the introduction of a split bearer for RRC, and the introduction of a direct RRC from the SN, also referred to as SCG SRB.

The SN may sometimes be referred to as SgNB, where gNB may be understood to be an NR base station, and the MN as MeNB in case the LTE is the master node and NR is the secondary node. In the other case where NR is the master and LTE is the secondary node, the corresponding terms are SeNB and Master gNB (MgNB).

Split RRC messages may be mainly used for creating diversity, and the sender may decide to either choose one of the links for scheduling the RRC messages, or it may duplicate the message over both links. In the downlink, the path switching between the MCG or SCG legs or duplication on both may be left to network implementation. On the other hand, for the UL, the network may configure the UE to use the MCG, SCG or both legs. The terms "leg" and "path" are used interchangeably throughout this document.

The following terminologies are used throughout this text to differentiate different dual connectivity scenarios:

a) DC: which may be understood to refer to LTE DC, wherein both MN and SN may be understood to employ LTE;

b) EN-DC: which may be understood to refer to LTE-NR dual connectivity, where LTE is the master and NR is the secondary;

c) NE-DC: which may be understood to refer to LTE-NR dual connectivity where NR is the master and LTE is the secondary;

d) NR-DC or NR-NR DC: wherein both MN and SN which may be understood to employ NR; and e) multi-RAT DC (MR-DC): which may be understood as a generic term to describe where the MN and SN may employ different Radio Access Technologies (RATs). EN-DC and NE-DC are two different example cases of MR-DC.

Carrier Aggregation

When CA is configured, the UE may only have one RRC connection with the network. Further, at RRC connection establishment, re-establishment and/or handover, one serving cell may provide the Non-Access Stratum (NAS) mobility information, and at RRC connection re-establishment and/or handover, one serving cell may provide the security input. This cell may be referred to as the Primary Cell (PCell). In addition, depending on UE capabilities, Secondary Cells (SCells) may be configured to form together with the PCell a set of serving cells. The configured set of serving cells for a UE therefore may always consist of one PCell and one or more SCells. Further, when dual connectivity is configured, it may be the case that one carrier under the SCG may be used as the Primary SCell (PSCell). Hence, in this case there may be one PCell and one or more SCell(s) over the MCG and one PSCell and one or more SCell(s) over the SCG.

Log and Reporting of Random Access Channel (RACH) Information in LTE

In LTE, the report of RACH information when a random access procedure is performed may be requested by the network via the UE Information procedure in RRC, see 3GPP TS 36.331, v. 16.0.0, section 5.6.5, in the case where a RACH procedure was successful. That procedure is summarized in see 3GPP TS 36.331, v. 16.0.0, section 5.6.5, as described in RRC specifications.

FIG. 1 is a schematic diagram corresponding to FIG. 5.6.5.1-1 of see 3GPP TS 36.331, v. 16.0.0, depicting a UE information procedure.

The UE information procedure may be used by E-UTRAN to request the UE to report information.

RACH Optimization in NR

The UE information procedure may be used by the network to request the UE to report information. That procedure is summarized in see 3GPP TS 38.331, v. 16.0.0, section 5.7.10, as described in RRC specifications. Further details may be found in the cited specification.

FIG. 2 is a schematic diagram corresponding to FIG. 5.7.10.1-1 of 3GPP TS 38.331, v. 16.0.0, depicting a UE information procedure in NR.

Upon successfully performing 4 step random access procedure, the UE may be required to perform the actions described in section 5.7.10.4 of 3GPP TS 38.331, v. 16.0.0.

UEInformationResponse

The UEInformationResponse message may be used by the UE to transfer information requested by the network.

Below is a reproduction of the contents the UEInformationResponse message may have in NR according to 3GPP TS 38.331, v. 16.0.0.

UEInformationResponse message

```
-- ASN1START
-- TAG-UEINFORMATIONRESPONSE-START
UEInformationResponse-r16 ::=  SEQUENCE {
  rrc-TransactionIdentifier  RRC-TransactionIdentifier,
  criticalExtensions  CHOICE {
    ueInformationResponse-r16  UEInformationResponse-r16-IEs,
    criticalExtensionsFuture  SEQUENCE { }
  }
}
UEInformationResponse-r16-IEs ::=  SEQUENCE {
  measResultIdleEUTRA-r16  MeasResultIdleEUTRA-r16
  OPTIONAL,
  measResultIdleNR-r16  MeasResultIdleNR-r16  OPTIONAL,
  logMeasReport-r16  LogMeasReport-r16  OPTIONAL,
  connEstFailReport-r16  ConnEstFailReport-r16  OPTIONAL,
  ra-ReportList-r16  RA-ReportList-r16  OPTIONAL,
  rlf-Report-r16  RLF-Report-r16  OPTIONAL,
  mobilityHistoryReport-r16  MobilityHistoryReport-r16  OPTIONAL,
  lateNonCriticalExtension  OCTET STRING  OPTIONAL,
  nonCriticalExtension  SEQUENCE { }  OPTIONAL
}
LogMeasReport-r16 ::=  SEQUENCE {
  absoluteTimeStamp-r16  AbsoluteTimeInfo-r16,
  traceReference-r16  TraceReference-r16,
  traceRecordingSessionRef-r16  OCTET STRING (SIZE (2)),
  tce-Id-r16  OCTET STRING (SIZE (1)),
  logMeasInfoList-r16  LogMeasInfoList-r16,
  logMeasAvailable-r16  ENUMERATED {true}  OPTIONAL,
  logMeasAvailableBT-r16  ENUMERATED {true}  OPTIONAL,
  logMeasAvailableWLAN-r16  ENUMERATED {true}  OPTIONAL,
  ...
}
LogMeasInfoList-r16 ::=  SEQUENCE (SIZE
(1..maxLogMeasReport-r16)) OF LogMeasInfo-r16
LogMeasInfo-r16 ::=  SEQUENCE {
  locationInfo-r16  LocationInfo-r16  OPTIONAL,
  relativeTimeStamp-r16  INTEGER (0..7200),
  servCellIdentity-r16  CGI-Info-Logging-r16  OPTIONAL,
  measResultServingCell-r16  MeasResultServingCell-r16
  OPTIONAL,
  measResultNeighCells-r16  SEQUENCE {
    measResultNeighCellListNR  MeasResultListLogging2NR-r16
    OPTIONAL,
    measResultNeighCellListEUTRA  MeasResultList2EUTRA-r16
    OPTIONAL
  },
  anyCellSelectionDetected-r16  ENUMERATED {true}  OPTIONAL
}
ConnEstFailReport-r16 ::=  SEQUENCE {
  measResultFailedCell-r16  MeasResultFailedCell-r16,
  locationInfo-r16  LocationInfo-r16  OPTIONAL,
  measResultNeighCells-r16  SEQUENCE {
    measResultNeighCellListNR  MeasResultList2NR-r16
    OPTIONAL,
    measResultNeighCellListEUTRA  MeasResultList2EUTRA-r16
    OPTIONAL
  },
  numberOfConnFail-r16  INTEGER (1..8),
  perRAInfoList-r16  PerRAInfoList-r16,
  timeSinceFailure-r16  TimeSinceFailure-r16,
  ...
}
MeasResultServingCell-r16 ::=  SEQUENCE {
  resultsSSB-Cell  MeasQuantityResults,
  resultsSSB  SEQUENCE{
```

-continued

UEInformationResponse message

```
        best-ssb-Index    SSB-Index,
        best-ssb-Results    MeasQuantityResults,
        numberOfGoodSSB    INTEGER (1..maxNrofSSBs-r16)
    }    OPTIONAL
}
MeasResultFailedCell-r16 ::=    SEQUENCE {
    cgi-Info    CGI-Info-Logging-r16,
    measResult-r16    SEQUENCE {
        cellResults-r16    SEQUENCE{
            resultsSSB-Cell-r16    MeasQuantityResults
        },
        rsIndexResults-r16    SEQUENCE{
            resultsSSB-Indexes-r16    ResultsPerSSB-IndexList
        }
    }
}
RA-ReportList-r16 ::= SEQUENCE (SIZE (1..maxRAReport-r16)) OF
RA-Report-r16
RA-Report-r16 ::=    SEQUENCE {
    cellId-r16    CGI-Info-Logging-r16,
    ra-InformationCommon-r16    RA-InformationCommon-r16
    raPurpose-r16    ENUMERATED {accessRelated,
beamFailureRecovery, reconfigurationWithSync, ulUnSynchronized,
                schedulingRequestFailure, noPUCCHResourceAvailable,
requestForOtherSI,
                spare9, spare8, spare7, spare6, spare5, spare4, spare3,
spare2, spare1}
}
RA-InformationCommon-r16 ::=    SEQUENCE {
    absoluteFrequencyPointA-r16    ARFCN-ValueNR,
    locationAndBandwidth-r16    INTEGER (0..37949),
    subcarrierSpacing-r16    SubcarrierSpacing,
    msg1-FrequencyStart-r16    INTEGER
(0..maxNrofPhysicalResourceBlocks−1) OPTIONAL,
    msg1-FrequencyStartCFRA-r16    INTEGER
(0..maxNrofPhysicalResourceBlocks−1) OPTIONAL,
    msg1-SubcarrierSpacing-r16    SubcarrierSpacing    OPTIONAL,
    msg1-SubcarrierSpacingCFRA-r16    SubcarrierSpacing    OPTIONAL,
    msg1-FDM-r16    ENUMERATED {one, two, four, eight}
    OPTIONAL,
    msg1-FDMCFRA-r16    ENUMERATED {one, two, four, eight}
OPTIONAL,
    perRAInfoList-r16    PerRAInfoList-r16
}
PerRAInfoList-r16 ::= SEQUENCE (SIZE (1..200)) OF PerRAInfo-r16
PerRAInfo-r16 ::=    CHOICE {
    perRASSBInfoList-r16    PerRASSBInfo-r16,
    perRACSI-RSInfoList-r16    PerRACSI-RSInfo-r16
}
PerRASSBInfo-r16 ::=    SEQUENCE {
    ssb-Index-r16    SSB-Index,
    numberOfPreamblesSentOnSSB-r16    INTEGER (1..200),
    perRAAttemptInfoList-r16    PerRAAttemptInfoList-r16
}
PerRACSI-RSInfo-r16 ::=    SEQUENCE {
    csi-RS-Indec-r16    CSI-RS-Index,
    numberOfPreamblesSentOnCSI-RS-r16    INTEGER (1..200)
}
PerRAAttemptInfoList-R16 ::=    SEQUENCE (SIZE (1..200)) OF
PerRAAtemmptInfo-r16
PerRAAttemptInfo-r16 ::=    SEQUENCE {
    contentionDetected-r16    BOOLEAN    OPTIONAL,
    dlRSRPAboveThreshold-r16    BOOLEAN    OPTIONAL,
    ...
}
RLF-Report-r16 ::=    CHOICE {
    nr-RLF-Report-r16    SEQUENCE {
        measResultLastServCell-r16    MeasResultRLFNR-r16
        measResultNeighCells-r16    SEQUENCE {
            measResultListNR-r16    MeasResultList2NR-r16    OPTIONAL,
            measResultListEUTRA-r16    MeasResultList2EUTRA-r16
            OPTIONAL
        }
        c-RNTI-r16    RNTI-Value,
        previousPCellId-r16    CHOICE {
            nrPreviousCell-r16    CGI-Info-Logging-r16,
            eutraPreviousCell-r16    CGI-InfoEUTRALogging
```

-continued

UEInformationResponse message

```
        }    OPTIONAL,
        failedPCellId-r16    CHOICE {
            nrFailedPCellId-r16    CHOICE {
                cellGlobalId-r16    CGI-Info-Logging-r16,
                pci-arfcn-r16    SEQUENCE {
                    physCellId-r16    PhysCellId,
                    carrierFreq-r16    ARFCN-ValueNR
                }
            },
            eutraFailedPCellId-r16    CHOICE {
                cellGlobalID-r16    CGI-InfoEUTRALogging,
                pci-arfcn-r16    SEQUENCE {
                    physCellId-r16    EUTRA-PhysCellId,
                    carrierFreq-r16    ARFCN-ValueEUTRA
                }
            }
        },
        reconnectCellId-r16    CHOICE {
            nrReconnectCellId-r16    CGI-Info-Logging-r16,
            eutraReconnectCellId-r16    CGI-InfoEUTRALogging
        }    OPTIONAL,
        timeUntilReconnection-16    TimeUntilReconnection-16
        OPTIONAL,
        reestablishmentCellId-r16    CGI-Info-Logging-r16    OPTIONAL,
        timeConnFailure-r16    INTEGER (0..1023)    OPTIONAL,
        timeSinceFailure-r16    TimeSinceFailure-r16,
        connectionFailureType-r16    ENUMERATED {rlf, hof},
        rlf-Cause-r16    ENUMERATED {t310-Expiry,
randomAccessProblem, rlc- MaxNumRetx,
                    beamFailureRecoveryFailure, lbtFailure-r16,
                    bh-rlfRecoveryFailure, spare2, spare1},
        locationInfo-r16    LocationInfo-r16    OPTIONAL,
        noSuitableCellFound-r16    ENUMERATED {true}    OPTIONAL,
        ra-InfomrationCommon-r16    RA-InformationCommon-r16
OPTIONAL
    },
    eutra-RLF-Report-r16    SEQUENCE {
        failedPCellId-EUTRA    CGI-InfoEUTRALogging,
        measResult-RLF-Report-EUTRA-r16    OCTET STRING
    }
}
MeasResultList2NR-r16 ::=    SEQUENCE(SIZE (1..maxFreq)) OF
MeasResult2NR-r16
MeasResultList2EUTRA-r16 ::=    SEQUENCE(SIZE (1..maxFreq)) OF
MeasResult2EUTRA- r16
MeasResult2NR-r16 ::=    SEQUENCE {
    ssbFrequency-r16    ARFCN-ValueNR    OPTIONAL,
    refFreqCSI-RS-r16    ARFCN-ValueNR    OPTIONAL,
    measResultList-r16    MeasResultListNR
}
MeasResultListLogging2NR-r16 ::=    SEQUENCE(SIZE (1..maxFreq))
OF MeasResultListLoggingNR-r16
MeasResultLogging2NR-r16 ::=    SEQUENCE {
    carrierFreq-r16    ARFCN-ValueNR,
    measResultListLoggingNR-r16    MeasResultListLoggingNR-r16
}
MeasResultListLoggingNR-r16 ::=    SEQUENCE (SIZE
(1..maxCellReport)) OF MeasResultLoggingNR-r16
MeasResultLoggingNR-r16 ::=    SEQUENCE {
    physicCellId-r16    PhysCellId,
    resultsSSB-Cell-r16    MeasQuantityResults,
    numberOfGoodSSB-r16    INTEGER (1..maxNrofSSBs-r16)
    OPTIONAL
}
MeasResult2EUTRA-r16 ::=    SEQUENCE {
    carrierFreq-r16    ARFCN-ValueEUTRA,
    measResultList-r16    MeasResultListEUTRA
}
MeasResultRLFNR-r16 ::=    SEQUENCE {
    measResult-r16    SEQUENCE {
        cellResults-r16    SEQUENCE{
            resultsSSB-Cell-r16    MeasQuantityResults    OPTIONAL,
            resultsCSI-RS-Cell-r16    MeasQuantityResults    OPTIONAL
        },
        rsIndexResults-r16    SEQUENCE{
            resultsSSB-Indexes-r16    ResultsPerSSB-IndexList    OPTIONAL,
            ssbRLMConfigBitmap-r16    BIT STRING (SIZE (64))
```

-continued

| UEInformationResponse message |
|---|
| OPTIONAL,<br>resultsCSI-RS-Indexes-r16 ResultsPerCSI-RS-IndexList<br>OPTIONAL,<br>csi-rsRLMConfigBitmap-r16 BIT STRING (SIZE (96))<br>OPTIONAL<br>} OPTIONAL<br>}<br>}<br>TimeSinceFailure-r16 ::= INTEGER (0..172800)<br>MobilityHistoryReport-r16 ::= VisitedCellInfoList-r16<br>TimeUntilReconnection-16 ::= INTEGER (0..172800) |

RACH Report Signaling Between NG Radio Access Network (RAN) Nodes

Once a UE may have performed a RACH procedure, it may log a RACH report as part of a RACH report list and a network node may fetch it as part of a UE Information request and/or Response procedure. Once a network node, e.g., a Centralized Unit (CU), may have received the RACH report, it may decode the RACH report list and filter the RACH reports belonging to the Distributed Units (DUs) owned by that CU. Hence, the CU may use the ACCESS and MOBILITY INDICATION signal to send a list of up to 64 RACH reports to the related DUs.

Here is an excerpt from 3GPP TS 38.473, v. 16.2.0 indicating the use of ACCESS and MOBILITY INDICATION signal to convey the RACH report over the F1 interface.

8.11.1 Access and Mobility Indication

General

This procedure may be initiated by a gNB-CU to send the Access and Mobility related Information to a gNB-DU.

The procedure may use non-UE-associated signalling.

Successful Operation

FIG. 3A is a schematic diagram corresponding to FIG. 8.11.1.2-1 of 3GPP TS 38.473 V16.2.0, depicting an Access and Mobility Indication procedure in a Successful operation.

The Access and Mobility Indication procedure may be initiated by an ACCESS AND MOBILITY INDICATION message sent from a gNB-CU to a gNB-DU.

If the ACCESS AND MOBILITY INDICATION message contains the RACH Report Information List IE, the gNB-DU may be required to take it into account for optimisation of RACH access procedures.

If the ACCESS AND MOBILITY INDICATION message contains the Radio Link Failure (RLF) Report Information List IE, the gNB-DU may be required to take it into account for optimisation of mobility parameters.

Access and Mobility Indication

This message may be sent by a gNB-CU to a gNB-DU to provide access and mobility information to the gNB-DU.

Direction: gNB-CU→gNB-DU.

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Transaction ID | M | | 9.3.1.23 | | YES | reject |
| RACH Report Information List | | 0 . . . 1 | | | YES | ignore |
| >RACH Report Information Item | | 1 . . . <maxnoofRACHReports> | | | — | |
| >>RACH Report Container | M | | OCTET STRING | RACH-ReportList-r16 IE as defined in subclause 6.2.2 in TS 38.331 [8]. | — | |
| >>UE Assistant Identifier | O | | gNB-DU UE F1AP ID 9.3.1.5 | | — | |
| RLF Report Information List | | 0 . . . 1 | | | YES | ignore |
| >RLF Report Information Item | | 1 . . . <maxnoofRLFReports> | | | — | |
| >>NR UE RLF Report Container | M | | OCTET STRING | nr-RLF-Report-r16 IE contained in the UEInformation Response message defined in TS 38.331 [8]. | — | |
| >>UE Assistant Identifier | O | | gNB-DU UE F1AP ID 9.3.1.5 | | — | |

| Range bound | Explanation |
|---|---|
| maxnoofRACHReports | Maximum no. of RACH Reports, the maximum value is 64. |
| maxnoofRLFReports | Maximum no. of RLF Reports, the maximum value is 64. |

However, for the RACH reports in which the Cell ID may be associated to a cell belonging to another network node, the receiving CU may need to forward the RACH report to the network nodes owning the cell in which its associated Cell ID may be included in the RACH report. For this purpose, the network may currently use an ACCESS and MOBILITY INDICATION signal on the :Xn interface as shown in the following.

Access And Mobility Indication 8.4.12.1 General

The purpose of the Access and Mobility Indication procedure may be understood to be to transfer Access and Mobility related information between NG-RAN nodes.

8.4.12.2 Successful Operation

FIG. 3B is a schematic diagram corresponding to FIG. 8.2.12.2-1 of 3GPP TS 38.423 v. 16.2.0, depicting an Access And Mobility Indication in a Successful operation.

The Access And Mobility Indication procedure may be initiated by ACCESS AND MOBILITY INDICATION message sent from an NG-RAN $node_1$ to an NG-RAN $node_2$.

Access and Mobility Indication

This message may be sent by NG-RAN $node_1$ to transfer access and mobility related information to NG-RAN $node_2$.

Direction: NG-RAN $node_1 \rightarrow$ NG-RAN $node_2$.

If only MCG and split bearers are configured, there may be no S1-U termination in the SeNB.

FIG. 5 is a schematic diagram depicting an LTE DC User Plane (UP). The three bearer types are depicted in the Figure, as well as the PDCP, Radio Link Control (RLC) and Medium Access Control (MAC) entities in each of the MN and the SN.

In the control plane, signaling towards the Mobility Management Entity (MME) may be performed by means of S1 interface signaling. There may be only one S1-MME connection per DC UE, between the MeNB and the MME. Inter-eNB control plane signaling for DC may be performed by means of X2 interface signaling, that is, an interface between base stations. In the control plane, RRC may be located in MeNB and Signaling Radio Bearers (SRBs) may always be configured as MCG bearer type and therefore only use the radio resources of the MN.

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| RACH Report List | | 0 . . . 1 | | | YES | ignore |
| >RACH Report List Item | | 1 . . . <maxnoofRACHReports> | | | EACH | ignore |
| >>RACH Report Container | O | | OCTET STRING | RACH-ReportList-r16 IE as defined in subclause 6.2.2 in TS 38.331 [10]. | YES | ignore |

| Range bound | Explanation |
|---|---|
| maxnoofRACHReports | Maximum no. of RACH Reports, the maximum value is 64. |

For LTE DC, two different user plane architectures may be allowed, see 3GPP TS 36.300 v. 15.3.0, one in which the S1-U may only terminate in the MeNB and the user plane may be transferred from MeNB to SeNB using the X2-U, and a second architecture where the S1-U may terminate in the SeNB.

FIG. 4 is a schematic diagram illustrating a User Plane connectivity of eNBs involved in Dual Connectivity according to existing methods.

In LTE DC, the radio protocol architecture that a particular bearer may use may depend on how the bearer may be setup. Three bearer types may exist. The first type may be the Master Cell Group (MCG) bearer, wherein the S1-U connection for the corresponding bearer(s) to the Serving Gateway (S-GW) may be terminated in the MeNB. The SeNB may be not involved in the transport of user plane data for this type of bearer(s) over the Uu. The second type may be the Split bearer, wherein the S1-U connection to the S-GW may be terminated in the MeNB. Packet Data Convergence Protocol (PDCP) data may be transferred between the MeNB and the SeNB via X2-U. The SeNB and MeNB may be involved in transmitting data of this bearer type over the Uu. The third type may be the Secondary Cell Group (SCG) bearer: the SeNB may be directly connected with the S-GW via S1-U. The MeNB may be not involved in the transport of user plane data for this type of is a schematic diagram corresponding to bearer(s) over the Uu.

FIG. 6 is a schematic diagram depicting Control Plane connectivity of eNBs involved in Dual Connectivity, according to the foregoing.

Note that in Dual Connectivity, it may also be possible to support Carrier Aggregation (CA) in each cell group, e.g., MCG and SCG. That is, the MCG may be comprised of more than one cell working in CA, and the SCG may also be comprised of more than one cell working in CA. The primary cell in the MCG may be known as the PCell, while the primary cell of the SCG may be known as the PSCell.

Multi-Radio Dual Connectivity

Multi-Radio Dual Connectivity (MR-DC) may be understood as a generalization of the Intra-Evolved UTRA (E-UTRA) Dual Connectivity (DC) and it is described in 3GPP TS 37.340, v. 16.2.0.

For the case of MR-DC with the Evolved Packet Core (EPC), E-UTRAN may support MR-DC via E-UTRA-NR Dual Connectivity (EN-DC), in which a UE may be connected to one eNB that may act as Master Node (MN) and one en-gNB that may act as a Secondary Node (SN). FIG. 7 is a schematic diagram depicting a non-limiting example of the EN-DC Overall Architecture. In a E-UTRAN, the X2-U connections between two different en-gNBs are depicted, as well as the X2 connections between the en-gNBs and two different eNBs, and between the eNBs. FIG. 7 also depicts the S1 connections between the eNBs and two different MME/S-GWs in an EPC, and the S1-U connections between the MME/S-GWs and the en-gNBs.

For the case of MR-DC with the 5GC, the following options may be as standardized in 3GPP TS 37.340, v. 16.2.0.

E-UTRA-NR Dual Connectivity (NGEN-DC), wherein a UE may be connected to one ng-eNB that may act as a MN and one gNB that may act as a SN.

NR-EUTRA Dual Connectivity (NE-DC), wherein a UE may be connected to one gNB that may act as a MN and one ng-eNB that may act as a SN.

NR-NR Dual Connectivity (NR-DC), wherein a UE may be connected to one gNB that may act as a MN and one gNB that may act as a SN. In addition, NR-DC may also be used when a UE may be connected to two gNB-DUs, one serving the MCG and the other serving the SCG, connected to the same gNB-CU, acting both as a MN and as a SN.

FIG. 8 is a schematic diagram depicting a Control plane (CP) architecture for EN-DC (left) and MR-DC with 5GC (right).

In the Control Plane for MR-DC, the UE may have a single RRC state, based on the MN RRC and a single C-plane connection towards the Core Network, as shown in FIG. 8.

RRC PDUs generated by the SN may be transported via the MN to the UE. The MN may always send the initial SN RRC configuration via MCG SRB (SRB1), but subsequent reconfigurations may be transported via MN or SN. When transporting an RRC PDU from the SN, the MN may not modify the UE configuration provided by the SN.

In E-UTRA connected to EPC, at initial connection establishment, SRB1 may use E-UTRA PDCP. If the UE supports EN-DC, regardless of whether EN-DC is configured or not, after initial connection establishment, MCG SRBs, SRB1 and SRB2, may be configured by the network to use either E-UTRA PDCP or NR PDCP, either SRB1 and SRB2 may be both configured with E-UTRA PDCP, or they may be both configured with NR PDCP. Change from E-UTRA PDCP to NR PDCP, or vice-versa, may be supported via a handover procedure, reconfiguration with mobility, or, for the initial change of SRB1 from E-UTRA PDCP to NR PDCP, with a reconfiguration without mobility before the initial security activation.

If the SN is a gNB, e.g., for EN-DC, NGEN-DC and NR-DC, the UE may be configured to establish a SRB with the SN, e.g., SRB3, to enable RRC PDUs for the SN to be sent directly between the UE and the SN. RRC PDUs for the SN may only be transported directly to the UE for SN RRC reconfiguration not requiring any coordination with the MN. Measurement reporting for mobility within the SN may be done directly from the UE to the SN if SRB3 is configured.

Split SRB may be supported for all MR-DC options, allowing duplication of RRC PDUs generated by the MN, via the direct path and via the SN. Split SRB may use NR PDCP. This version of the specification does not support the duplication of RRC PDUs generated by the SN via the MN and SN paths.

In the User Plane (UP) for MR-DC, from a UE perspective, three bearer types may exist: an MCG bearer, an SCG bearer and split bearer. These bearer types are shown in FIG. 9 for MR-DC with EPC and in FIG. 10 for MR-DC with 5GC, NGEN-DC, NE-DC and NR-DC. The three bearer types are depicted in each of FIG. 9 and FIG. 10, as well as the PDCP, RLC and MAC entities in the UE.

FIG. 9 is a schematic diagram depicting a Radio Protocol Architecture for MCG, SCG and split bearers from a UE perspective in MR-DC with EPC (EN-DC).

FIG. 10 is a schematic diagram depicting a Radio Protocol Architecture for MCG, SCG and split bearers from a UE perspective in MR-DC with 5GC, NGEN-DC, NE-DC and NR-DC. FIG. 10 also depicts the Service Data Adaptation Protocol (SDAP) entity receiving Quality of Service (QOS) flows.

From a network perspective, each bearer, MCG, SCG and split bearer, may be terminated either in MN or in SN. Network side protocol termination options are shown in FIG. 11 for MR-DC with EPC (EN-DC) and in FIG. 12 for MR-DC with 5GC, NGEN-DC, NE-DC and NR-DC. The three bearer types are depicted in each of FIG. 11 and FIG. 12, as well as the PDCP, RLC and MAC entities in each of the MN and the SN, as well as the X2 connections between both.

FIG. 11 is a schematic diagram depicting a Network side protocol termination options for MCG, SCG and split bearers in MR-DC with EPC (EN-DC).

FIG. 12 is a schematic diagram depicting a Network side protocol termination options for MCG, SCG and split bearers in MR-DC with 5GC, NGEN-DC, NE-DC and NR-DC). FIG. 12 also depicts the SDAP entities receiving Quality of Service (QoS) flows in each of the MN and the Sn.

RACH report content in UE information response

In RAN WG2 e-meeting #111, it has been agreed to extend the cell Identity (ID) by including the Physical cell identity (PCI) and Absolute Radio-Frequency Channel Number (ARFCN) value of the cells towards which the UE may perform RACH. In fact, this extension, the underlined part in the reproduction of the UEInformationResponse message below, has been done to enable to loggin the RACH report for the SCells in which the UE may not necessarily be reading their Cell Global Identity (CGI) when accessing to them. Having this solution in place, the UE may log the PCI and ARFCN of the SCells beside other RACH related information when performing the RACH on SCells.

UEInformationResponse message

```
-- ASN1START
-- TAG-UEINFORMATIONRESPONSE-START
RA-ReportList-r16 ::= SEQUENCE (SIZE (1..maxRAReport-r16)) OF
RA-Report-r16
RA-Report-r16 ::=  SEQUENCE {
  cellId-r16  CHOICE {
       cellGlobalId-r16  CGI-Info-Logging-r16,
       pci-arfcn  SEQUENCE {
       physCellId-r16  PhysCellId,
       carrierFreq-r16  ARFCN-ValueNR
       }
    }
  ra-InformationCommon-r16  RA-InformationCommon-r16,
  raPurpose-r16  ENUMERATED {accessRelated,
beamFailureRecovery, reconfigurationWithSync, ulUnSynchronized,
          schedulingRequestFailure, noPUCCHResourceAvailable,
requestForOtherSI,
          spare9, spare8, spare7, spare6, spare5, spare4, spare3,
spare2, spare1}
  }
  RA-InformationCommon-r16 ::=  SEQUENCE {
  absoluteFrequencyPointA-r16  ARFCN-ValueNR,
  locationAndBandwidth-r16  INTEGER (0..37949),
subcarrierSpacing-r16  SubcarrierSpacing,
  msg1-FrequencyStart-r16  INTEGER
(0..maxNrofPhysicalResourceBlocks-1) OPTIONAL,
  msg1-FrequencyStartCFRA-r16  INTEGER
(0..maxNrofPhysicalResourceBlocks-1) OPTIONAL,
  msg1-SubcarrierSpacing-r16  SubcarrierSpacing  OPTIONAL,
  msg1-SubcarrierSpacingCFRA-r16  SubcarrierSpacing  OPTIONAL,
msg1-FDM-r16  ENUMERATED {one, two, four, eight}  OPTIONAL,
  msg1-FDMCFRA-r16  ENUMERATED {one, two, four, eight}
OPTIONAL,
perRAInfoList-r16  PerRAInfoList-r16
```

-continued

```
UEInformationResponse message
}
  PerRAInfoList-r16 ::= SEQUENCE (SIZE (1..200)) OF PerRAInfo-r16
  PerRAInfo-r16 ::=   CHOICE {
perRASSBInfoList-r16   PerRASSBInfo-r16,
perRACSI-RSInfoList-r16   PerRACSI-RSInfo-r16
  }
  PerRASSBInfo-r16 ::=   SEQUENCE {
  ssb-Index-r16   SSB-Index,
numberOfPreamblesSentOnSSB-r16   INTEGER (1..200),
perRAAttemptInfoList-r16   PerRAAttemptInfoList-r16
  }
  PerRACSI-RSInfo-r16 ::=   SEQUENCE {
csi-RS-Index-r16   CSI-RS-Index,
numberOfPreamblesSentOnCSI-RS-r16   INTEGER (1..200)
}
  PerRAAttemptInfoList-r16 ::=   SEQUENCE (SIZE (1..200)) OF
  PerRAAttemptInfo-r16
  PerRAAttemptInfo-r16 ::=   SEQUENCE {
  contentionDetected-r16   BOOLEAN   OPTIONAL,
dlRSRPAboveThreshold-r16   BOOLEAN   OPTIONAL,
    ...
}
    -
-- TAG-UEINFORMATIONRESPONSE-STOP
-- ASN1STOP
```

In spite of all the advancements, existing methods to perform RACH procedures may result in wasted resources, increased latencies, and wasted energy resources, which may become particularly relevant for wireless devices, which may rely on battery power.

SUMMARY

As part of the development of embodiments herein, one or more challenges with the existing technology will first be identified and discussed.

The current solution on the inclusion of cell ID according to the agreement made in the RAN WG2 e-meeting #111 may look problematic in some scenarios explained in the following. Considering that UE may be able to collect 8 RACH reports, the UE may perform 8 consecutive RACH procedure on or multiple SCells which may lead to inclusion of 8 RACH reports in a RACH report list with cell ID only logged as a combination of PCI and ARFCN. If the UE moves to the IDLE mode and returns back to the connected mode in a different cell, upon indication of the RA-ReportList to the new serving cell and fetching the RA-ReportList by the new cell, it may not be possible to detect to which cells the RACH reports in the RA-ReportList belong to. This may be understood to be because the PCI, or the cell ID, are locally unique identifiers of a cell, as opposed to global identifiers in the network. This may be understood to mean that, while the original PCell may be able to identify which SCells correspond to these local identifiers, another PCell in the network, relying solely on these identifiers, may not be able to identify them. Hence, it will not be possible to forward the RACH reports to the SCell in which the RACH procedures may be performed. This may cause sub-optimal performance of the RACH procedure in the secondary cells. In addition, RACH reports may be wrongly used by the cell to which the RACH report did not belong, which may lead to wrong configuration of the RA procedure parameters.

It is an object of embodiments herein to improve the handling of a random access procedure in a wireless communications network.

According to a first aspect of embodiments herein, the object is achieved by a method, performed by a first node. The method is for providing one or more indications related to a random access procedure by the first node to a second cell, when served by a first cell. The second cell is a secondary cell. The first node operates in a wireless communications network. The first node registers, in a register, a first identifier of the second cell and one or more first indications. The one or more first indications indicate at least one of: i) a second identifier of the first cell, ii) a third identifier of a primary secondary cell, iii) a fourth identifier of a first network node owning the first cell, iv) a fifth identifier of a second network node owning the primary secondary cell, and v) an indicator of a cell group the second cell belongs to. The first node also provides to at least one of: the first node, and a second node, one or more second indications based on the registered first identifier and the one or more first indications.

According to a second aspect of embodiments herein, the object is achieved by a method performed by the second node. The method is for handling the one or more indications related to the random access procedure by the first node to the second cell, when served by the first cell. The second cell is a secondary cell. The second node and the first node operate in the communications network. The second node receives, from the first node, the one or more second indications. The one or more second indications indicate the first identifier of the second cell and the one or more first indications registered by the first node. The one or more first indications indicate at least one of: i) the second identifier of the first cell, ii) the third identifier of the primary secondary cell, iii) the fourth identifier of the first network node owning the first cell, iv) the fifth identifier of the second network node owning the primary secondary cell, and v) the indicator of the cell group the second cell belongs to. The second node also sends to a third node, one or more third indications based on the received one or more second indications.

According to a third aspect of embodiments herein, the object is achieved by a method performed by the third node. The method is for handling the one or more indications related to the random access procedure by the first node to the second cell, when served by the first cell. The second cell is a secondary cell. The third node serves or has served the first node in a configuration supporting simultaneous connectivity to more than one cell The third node and the first node operate in the communications network. The third node receives, from the second node, the one or more third indications. The one or more third indications indicate the first identifier of the second cell and the one or more first indications registered by the first node. The one or more first indications indicate at least one of: i) the second identifier of the first cell, ii) the third identifier of the primary secondary cell, iii) the fourth identifier of the first network node owning the first cell, iv) the fifth identifier of the second network node owning the primary secondary cell, and v) the indicator of the cell group the second cell belongs to. The second node also adapts a configuration of one or more cells controlled by the third node based on the received one or more third indications.

According to a fourth aspect of embodiments herein, the object is achieved by the first node. The first node is for providing the one or more indications related to the random access procedure by the first node to the second cell, when served by the first cell. The second cell is configured to be a secondary cell. The first node is configured to operate in the wireless communications network. The first node is further configured to register, in a register, the first identifier of the second cell and one or more first indications. The one or more first indications are configured to indicate at least one of: i) the second identifier of the first cell, ii) the third identifier of the primary secondary cell, iii) the fourth identifier of the first network node configured to own the first cell, iv) the fifth identifier of the second network node configured to own the primary secondary cell, and v) the indicator of the cell group the second cell is configured to belong to. The first node is also configured to provide to at least one of: the first node, and the second node, the one or more second indications configured to be based on the first identifier and the one or more first indications configured to be registered.

According to a fifth aspect of embodiments herein, the object is achieved by the second node. The second node is for handling the one or more indications related to the random access procedure by the first node to the second cell, when served by the first cell. The second cell is configured to be a secondary cell. The second node and the first node are configured to operate in the wireless communications network. The second node is further configured to receive, from the first node, the one or more second indications. The one or more second indications are configured to indicate the first identifier of the second cell and the one or more first indications configured to be registered by the first node. The one or more first indications are configured to indicate at least one of: i) the second identifier of the first cell, ii) the third identifier of the primary secondary cell, iii) the fourth identifier of the first network node configured to own the first cell, iv) the fifth identifier of the second network node configured to own the primary secondary cell, and v) the indicator of the cell group the second cell is configured to belong to. The second node is also configured to send to the third node, the one or more third indications configured to be based on the one or more second indications configured to be received.

According to a sixth aspect of embodiments herein, the object is achieved by the third node. The third node is for handling the one or more indications related to the random access procedure by the first node to the second cell, when served by the first cell. The second cell is configured to be a secondary cell. The third node is configured to serve or have served the first node in the configuration supporting simultaneous connectivity to more than one cell. The third node and the first node are configured to operate in the wireless communications network. The third node is further configured to receive, from the second node, the one or more third indications. The one or more third indications are configured to indicate the first identifier of the second cell and the one or more first indications configured to be registered by the first node. The one or more first indications are configured to indicate at least one of: i) the second identifier of the first cell, ii) the third identifier of the primary secondary cell, iii) the fourth identifier of the first network node configured to own the first cell, iv) the fifth identifier of the second network node configured to own the primary secondary cell, and v) the indicator of the cell group the second cell is configured to belong to. The third node is also configured to adapt the configuration of the one or more cells configured to be controlled by the third node based on the one or more third indications configured to be received.

By registering the first identifier of the second cell, and the one or more first indications, the first node may then be enabled to indicate the registered first identifier and the one or more first indications to the second node. This may thereby enable the second node to identify the second cell, even when the second node may not be the serving node. For example, the random access procedure may be performed at a first time period. The one or more first indications may enable to identify the second cell at a second time period, e.g., a different time period than the first time period. At the second time period, the first node may be served by a network node, e.g., the second node, other than that controlling the second cell. The random access procedure performed according to embodiments herein may enable to identify the second cell by a network node, e.g., the second node, serving the first node other than that controlling the second cell, e.g., during the second time period. This may be understood to be because the registered first identifier and the one or more first indications may enable to identify the second cell globally, e.g., with a global identity, and not only locally, e.g., with a local identity.

According to the foregoing, the second node, may be enabled to then forward the received indications to the node serving the cells the random access procedures have been attempted on, e.g., the third node, and to enable the third node to, in turn, perform mobility robustness optimization, RACH optimization and/or Coverage and capacity optimization (CCO) by adapting the configuration of the one or more cells configured to be controlled by the third node. As a consequence, the random access procedure may be improved, and the resources in the wireless communications network may be more efficiently used. Moreover, since embodiments herein may enable to avoid to wrongly use the RACH reports by a cell to which the RACH report did not belong, wrong configuration of the RA procedure parameters may be avoided.

BRIEF DESCRIPTION OF THE DRAWINGS

Examples of embodiments herein are described in more detail with reference to the accompanying drawings, according to the following description.

DETAILED DESCRIPTION

Certain aspects of the present disclosure and their embodiments may provide solutions to the challenges described in the Summary section or other challenges. Embodiments herein may be generally understood to relate to different aspects of a method for to enable a network node receiving one or more RACH reports, e.g., in a RACH-ReportList, to identify which cells the RACH reports in the RA-ReportList belong to.

Particularly, embodiments herein may be understood to relate to different aspects of a method for including the PCell and Primary Secondary Cell Identity (PSCell ID) in a RACH Report.

According to some embodiments herein, a UE may log beam selection information in RACH attempts in a RACH report, to be reported to the network, e.g., for mobility robustness optimization and/or RACH optimization and/or Coverage and capacity optimization (CCO).

Particular embodiments herein may be to relate to a method at a wireless terminal, also called User Equipment, and referred as a UE in the description of embodiments and examples herein, the method comprising, after or during the performing a RACH procedure, upon performing a RACH procedure on a secondary cell (SCell), that the UE may log: a) Physical cell identity (PCI) of the secondary cell, b) ARFCN of the secondary cell, c) Global Cell ID (CGI) and tracking area code (TAC) of the PCell, d) Global Cell ID (CGI) and Tracking Area Code of PSCell, if the UE is in DC scenario, e) Global Node ID of the RAN node owning the cell in which UE performed the RACH, f) Global Node ID of the RAN node owning the Pcell, g) Global Node ID of the RAN node owning the PScell, and/or h) an indication on whether the RACH procedure is performed on SCell belonging to MCG or SCG.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Figure 1:
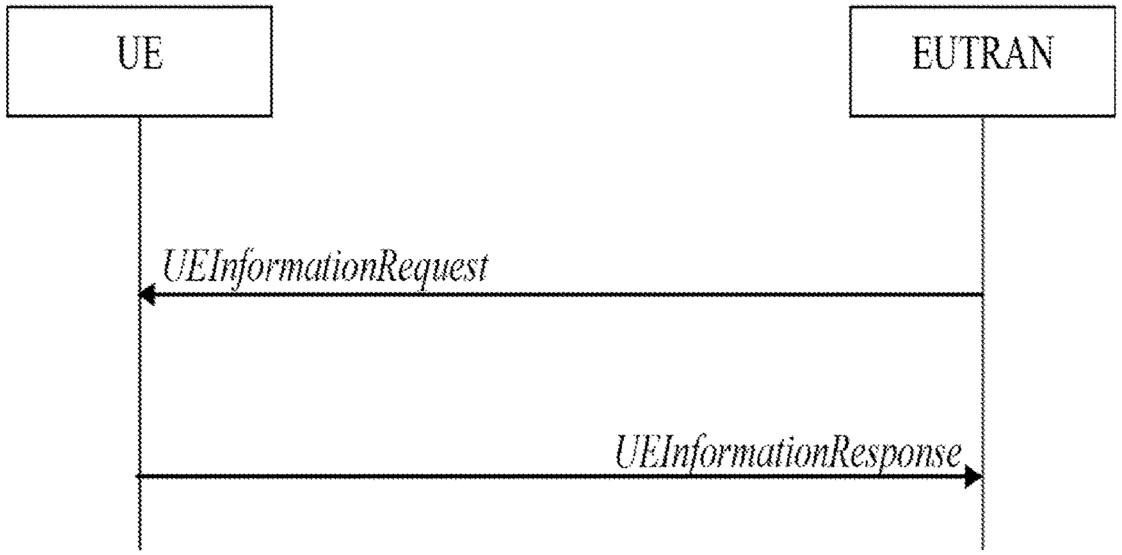
FIG. 1 is a schematic diagram illustrating an exemplary UE information procedure corresponding to FIG. 5.6.5.1-1 of 3GPP TS 36.331, v. 16.0.0.
Figure 2:
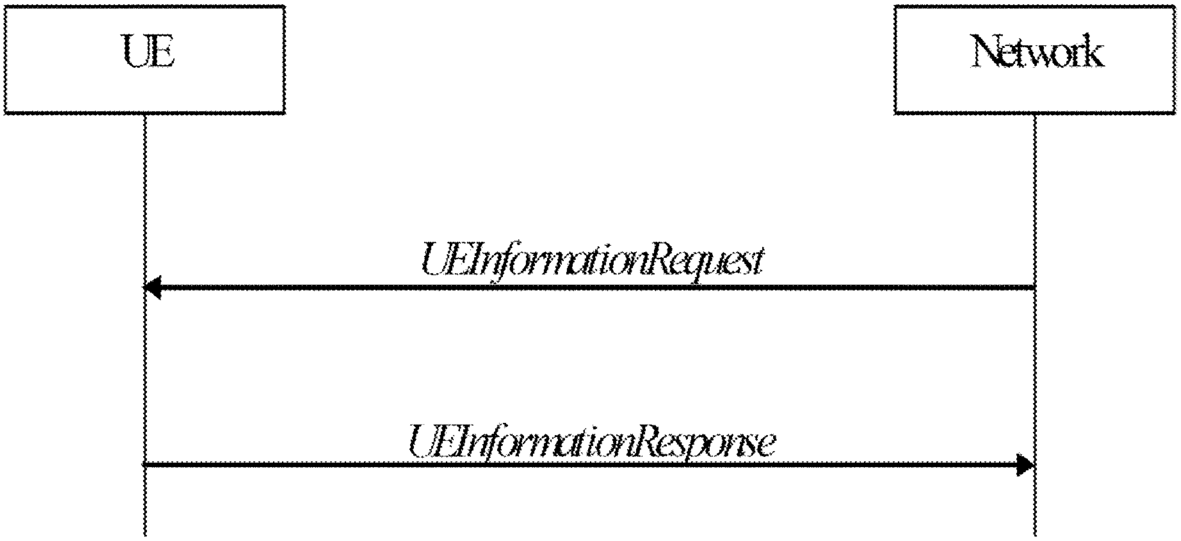
FIG. 2 is a schematic diagram illustrating an exemplary UE information procedure corresponding to FIG. 5.7.10.1-1 of 3GPP TS 38.331, v. 16.0.0.
Figure 3A:
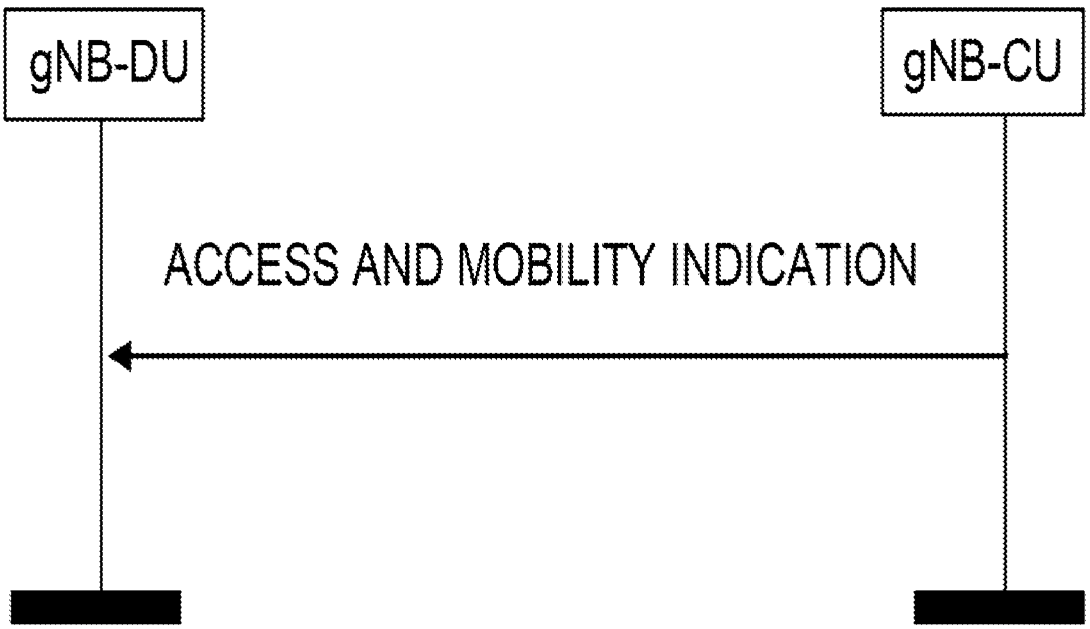
FIG. 3A is a schematic diagram illustrating an exemplary Access and Mobility Indication procedure, in a successful operation corresponding to FIG. 8.11.1.2-1 of 3GPP TS 38.473, v. 16.2.0.
Figure 3B:
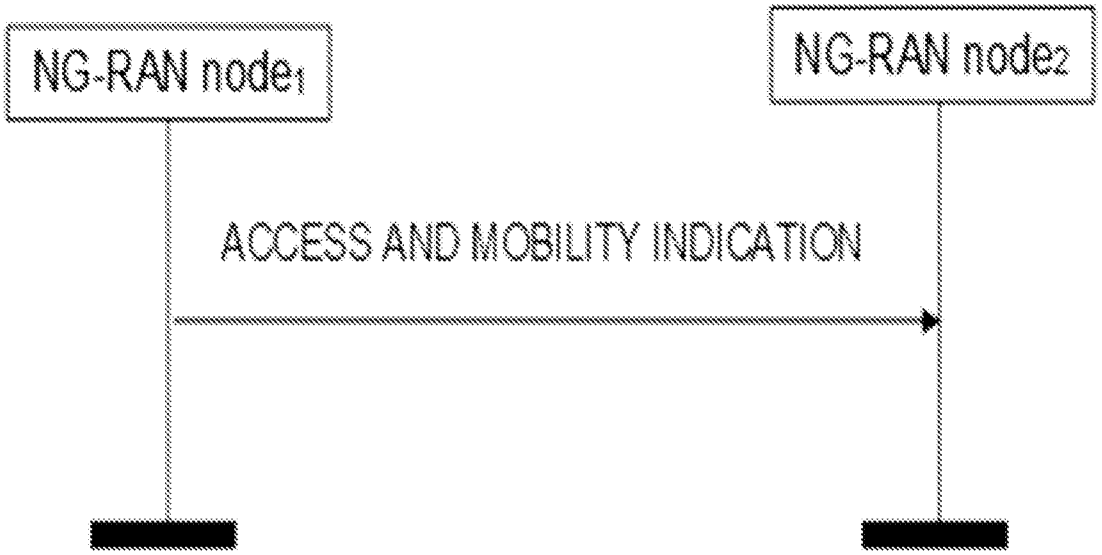
FIG. 3B is a schematic diagram illustrating an exemplary Access and Mobility Indication procedure, in a successful operation corresponding to FIG. 8.2.12.2-1 of 3GPP TS 38.423, v. 16.2.0.
Figure 4:
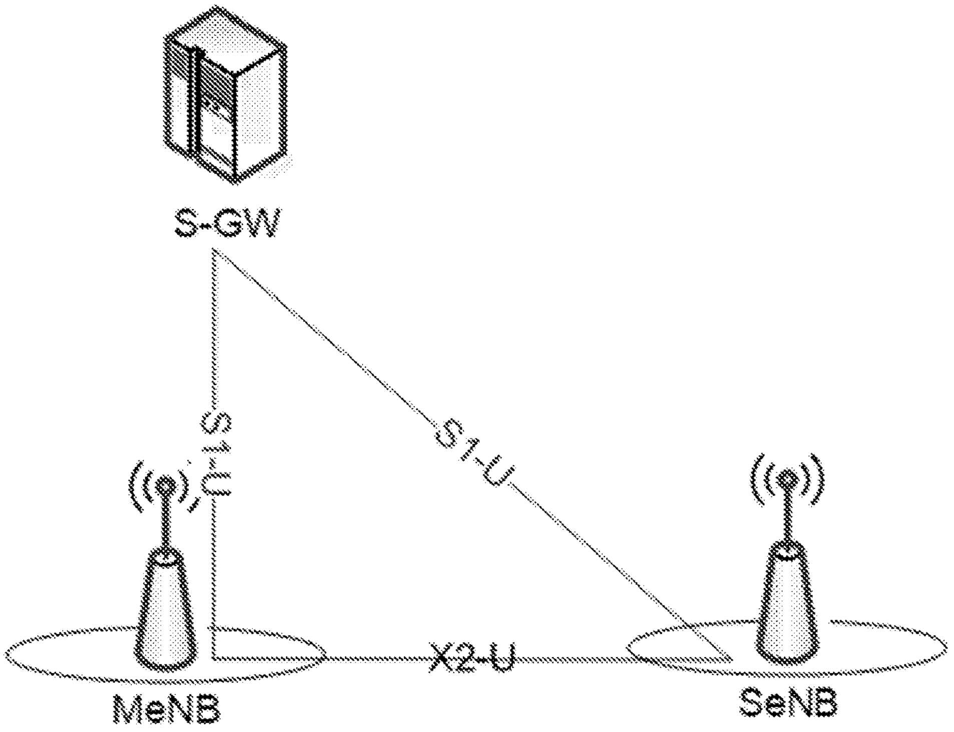
FIG. 4 is a schematic diagram illustrating an example of User Plane connectivity of eNBs involved in Dual Connectivity, according to existing methods.
Figure 5:
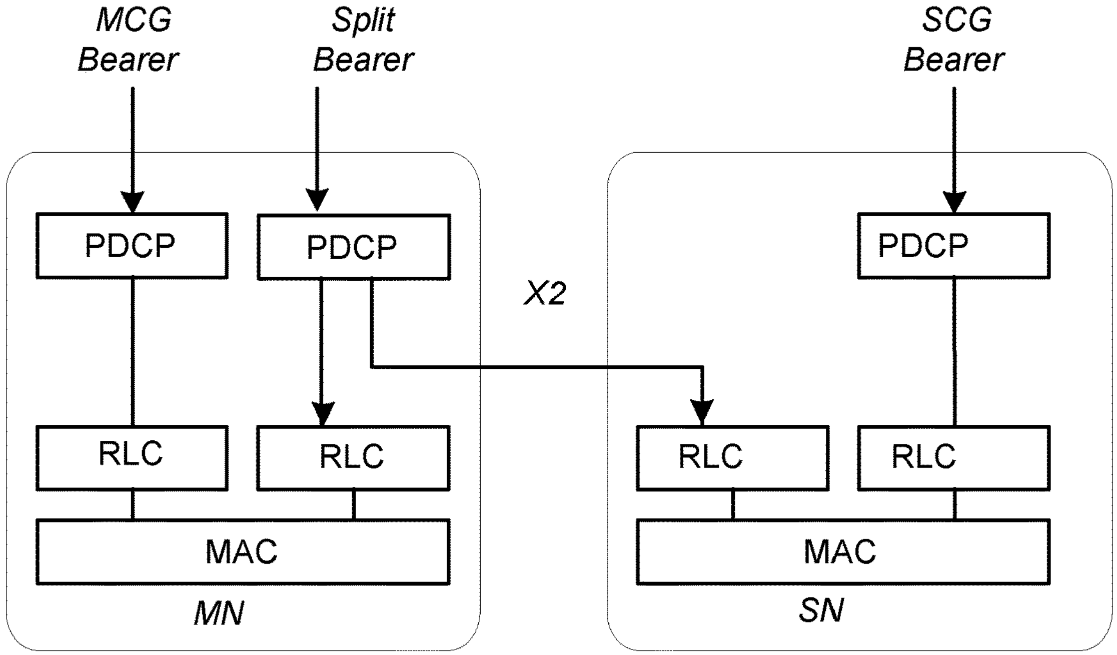
FIG. 5 is a schematic diagram illustrating an example of LTE DC User Plane (UP), according to existing methods.
Figure 6:
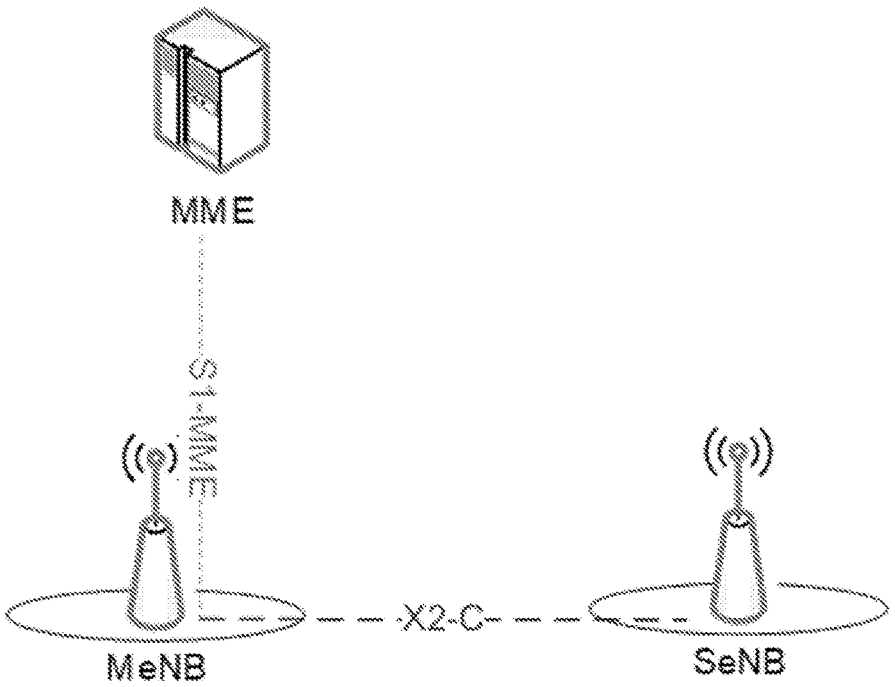
FIG. 6 is a schematic diagram illustrating an example of Control Plane connectivity of eNBs involved in Dual Connectivity, according to existing methods.
Figure 7:
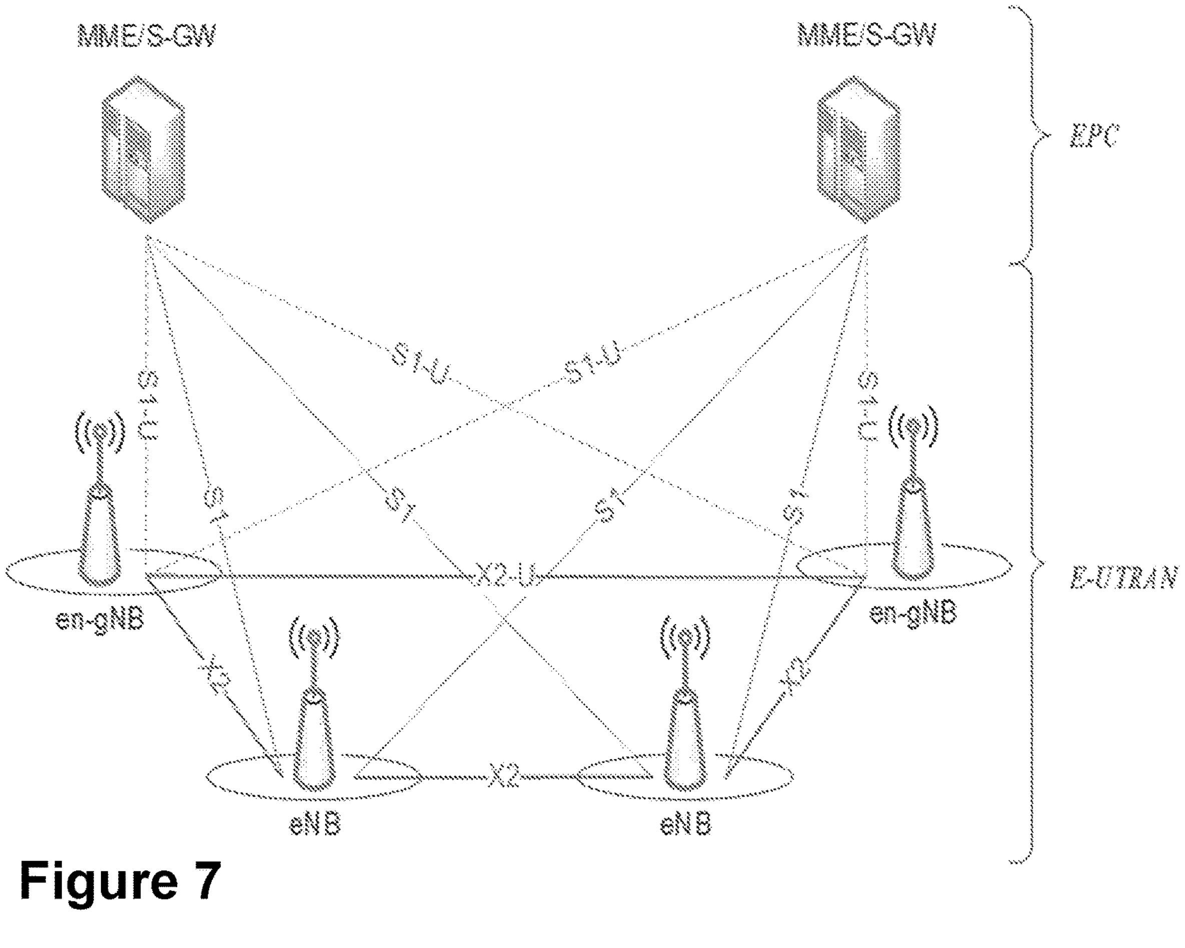
FIG. 7 is a schematic diagram illustrating an example of EN-DC Overall Architecture, according to existing methods.
Figure 8:
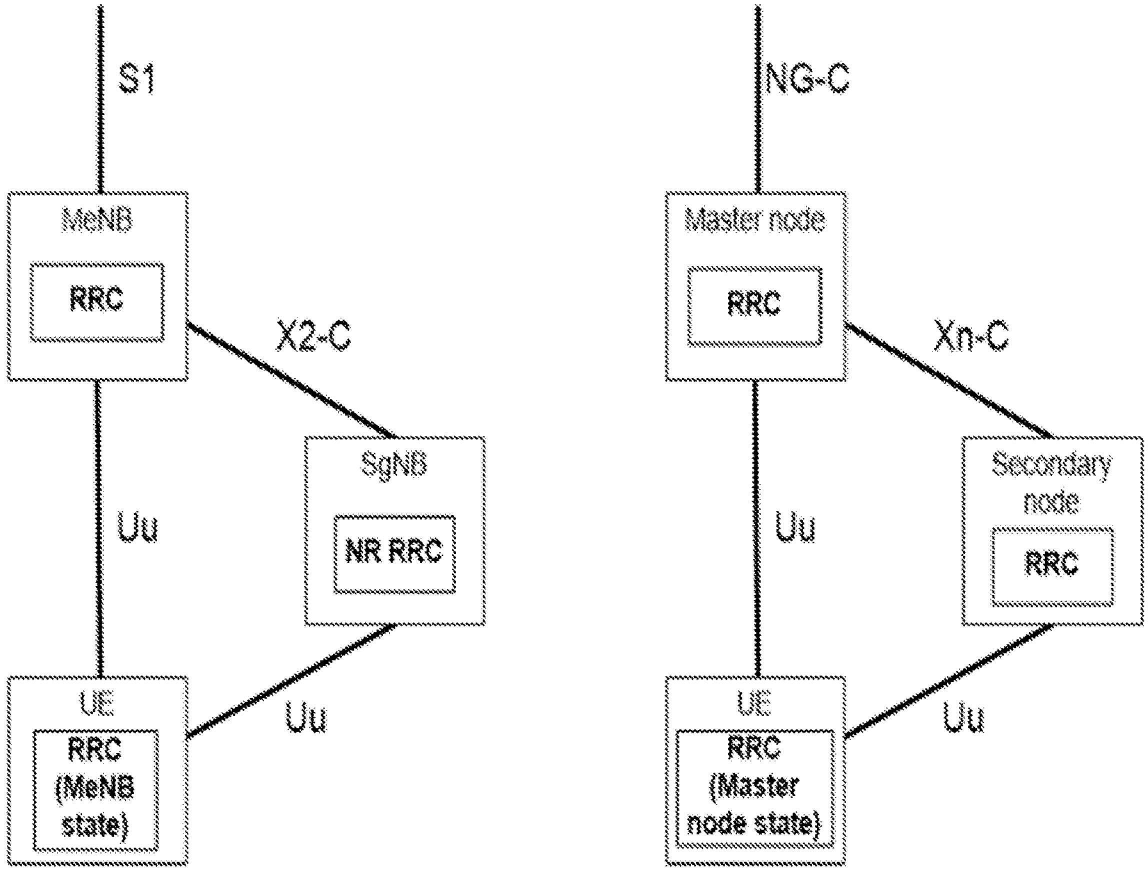
FIG. 8 is a schematic diagram illustrating an example of Control plane architecture for EN-DC (left) and MR-DC with 5GC (right), according to existing methods.
Figure 9:
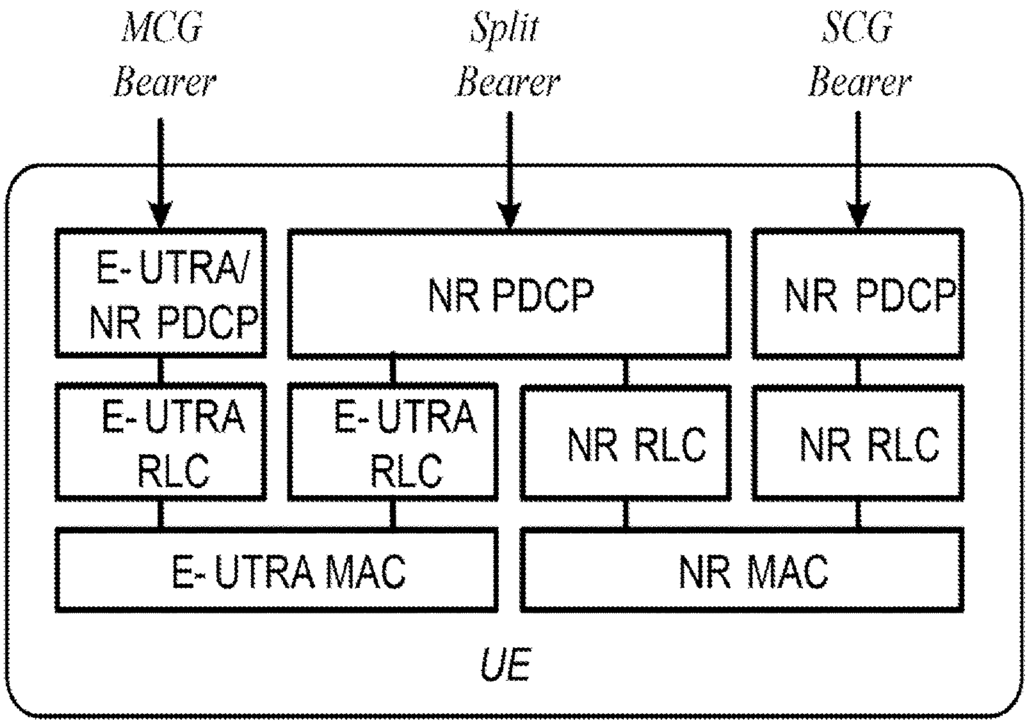
FIG. 9 is a schematic diagram illustrating an example of Radio Protocol Architecture for MCG, SCG and split bearers from a UE perspective in MR-DC with EPC (EN-DC), according to existing methods.
Figure 10:
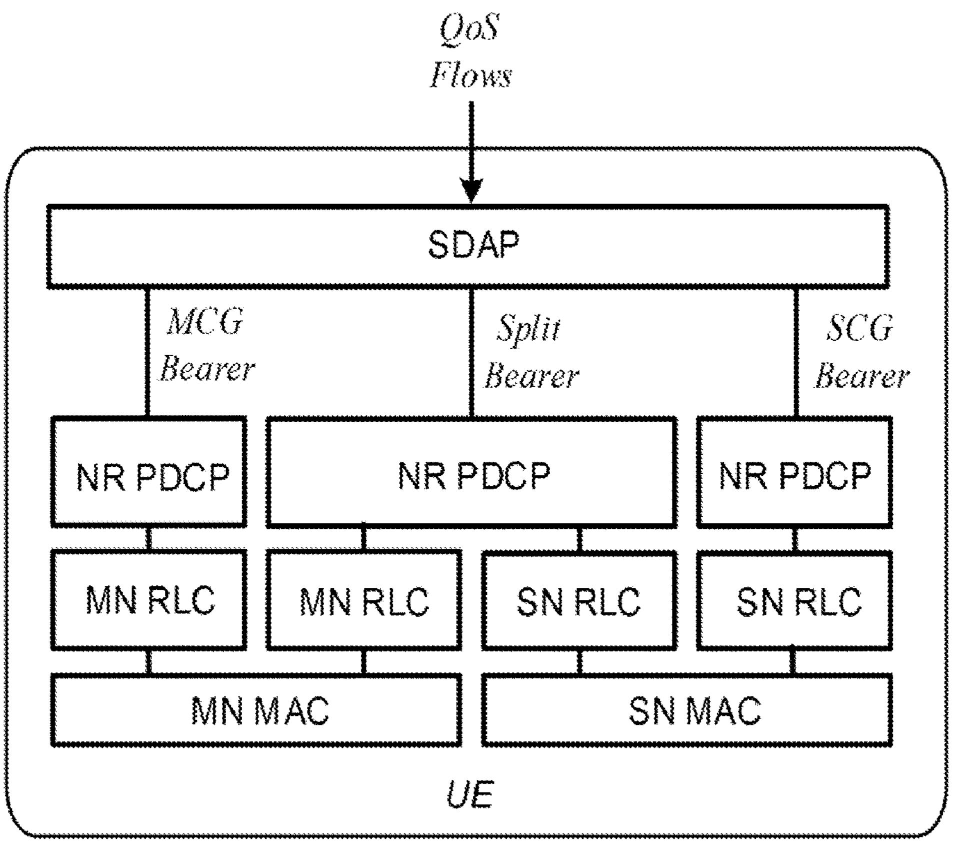
FIG. 10 is a schematic diagram illustrating an example of Radio Protocol Architecture for MCG, SCG and split bearers from a UE perspective in MR-DC with 5GC (NGEN-DC, NE-DC and NR-DC), according to existing methods.
Figure 11:
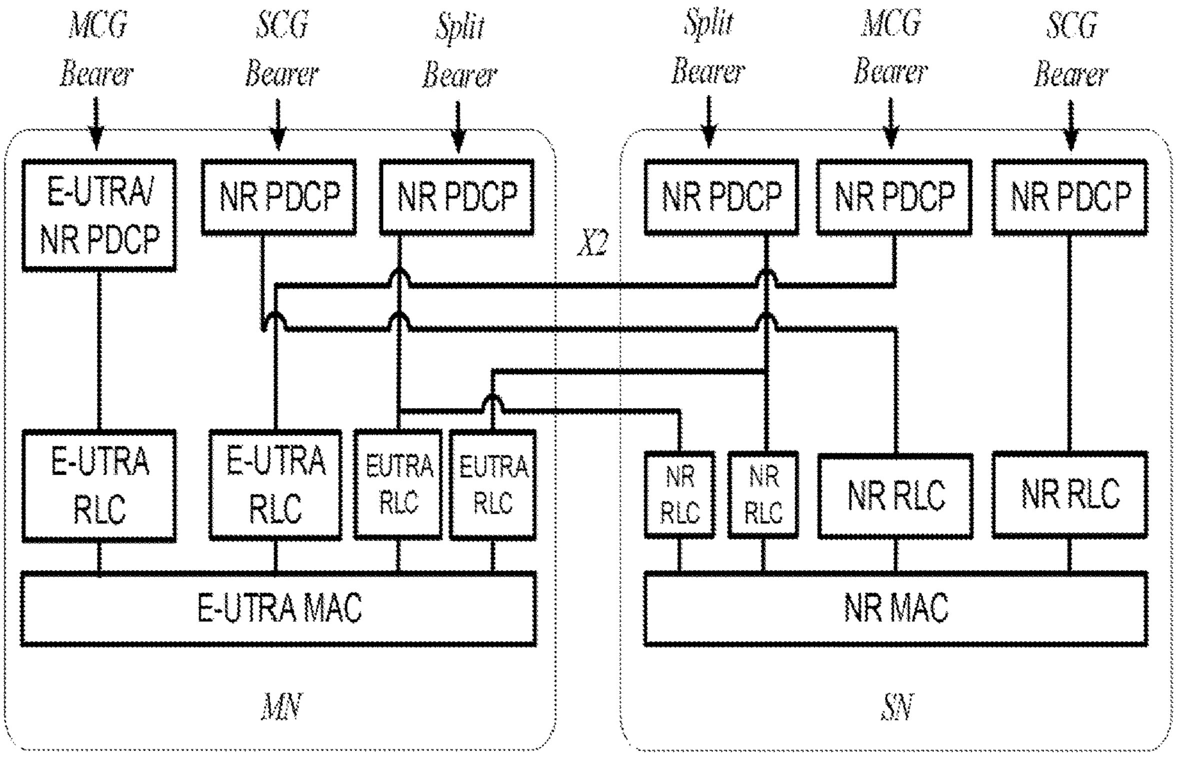
FIG. 11 is a schematic diagram illustrating an example of Network side protocol termination options for MCG, SCG and split bearers in MR-DC with EPC (EN-DC), according to existing methods.
Figure 12:
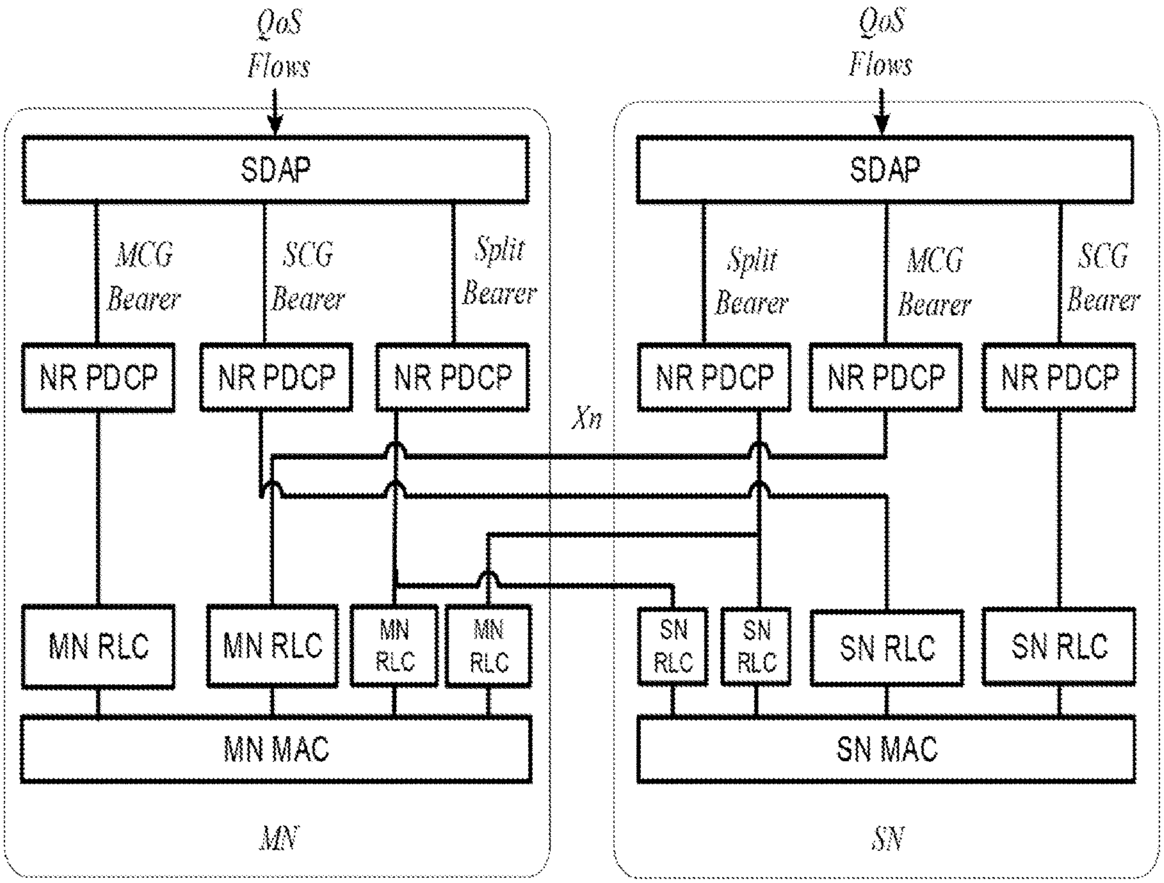
FIG. 12 is a schematic diagram illustrating an example of Network side protocol termination options for MCG, SCG and split bearers in MR-DC with 5GC (NGEN-DC, NE-DC and NR-DC), according to existing methods.
Figure 13:
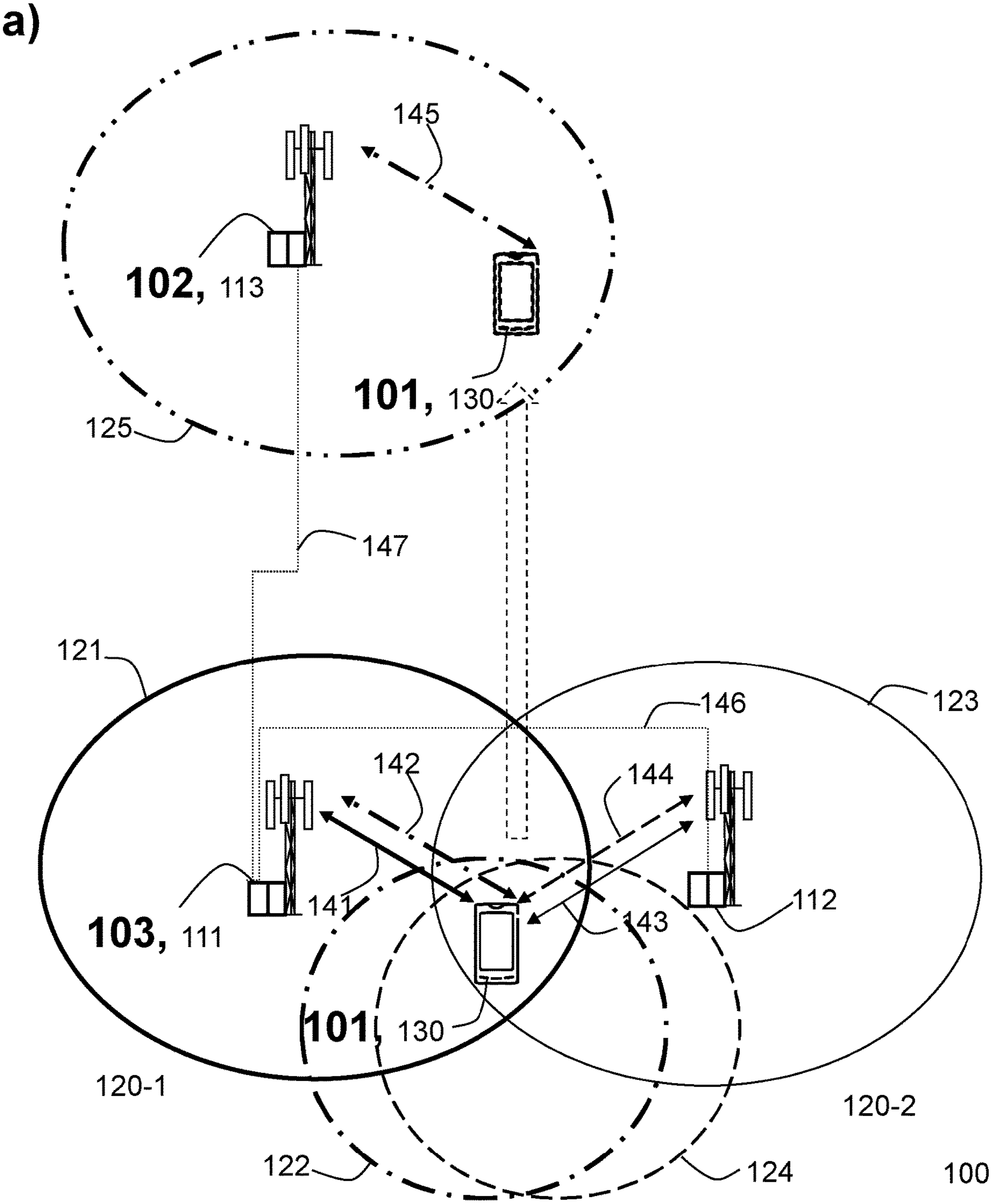
FIG. 13 is a schematic diagram illustrating two non-limiting examples, in panels a) and b), respectively, of embodiments of a wireless communications network, according to embodiments herein.
Figure 13:
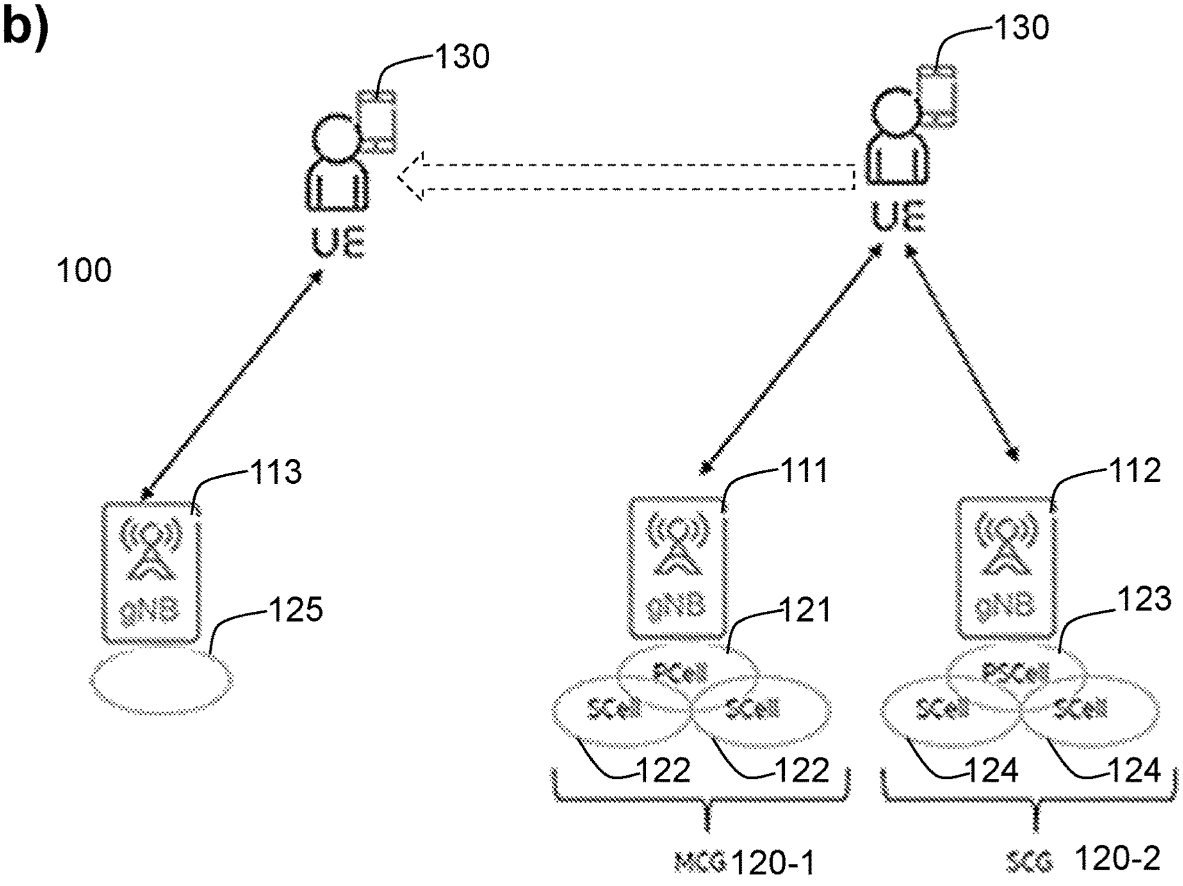

FIG. 13 depicts two non-limiting examples, in FIGS. 4*a* and 4*b*, respectively, of a wireless communications network 100, sometimes also referred to as a wireless communications system, cellular radio system, or cellular network, in which embodiments herein may be implemented. The wireless communications network 100 may typically be a 5G system, 5G network, or Next Gen System or network. The wireless communications network 100 may also support other technologies such as, for example, Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wide Code Division Multiplexing Access (WCDMA), Universal Terrestrial Radio Access (UTRA) TDD, Global System for Mobile communication (GSM) network, GSM EDGE Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned system. The wireless communications network may also be understood as comprising network nodes which may serve receiving nodes, such as wireless devices, with serving beams. This may be a typical case, e.g., a in a 5G network.

The wireless communications network 100 comprises a plurality of nodes, whereof a first node 101, a second node 102 and a third node 103 are depicted in the non-limiting examples of FIG. 13. In embodiments herein, the first node 101 is a wireless device, wireless terminal, or user equipment, as the wireless device 130 described below. In embodiments herein, the second node 102 is a network node such as the third network node 113 described below. In embodiments herein, the third node 103 is another network node, such as any of the first network node 111 and the second network node 112 described below, or a core network node e.g., Access and Mobility Management Function (AMF) or MME, which is not depicted, to simplify FIG. 13. In some examples, the first node 101 may be wireless device 130, the second node 102 may be the third network node 113, and the third node 103 may be one of the first network node 111, or the second network node 112. In some examples, the first node 101 may be wireless device 130, the second node 102 may be the third network node 113, and the third node 103 may be the core network node. The second node 102 may also be referred to herein as the network node 102. To facilitate the reference to the third node 103 being any of the first network node 111 and the second network node 112, the third node 103 may also be referred to herein as the another network node 103. In particular embodiments herein, the first node 101 may have moved from the coverage are of the first network node 111 and/or the second network node 112, to that of the third network node 113, as is schematically represented in FIG. 13 by a thick arrow with discontinued line.

The wireless communications network 100 comprises a plurality of network nodes, whereof a first network node 111, a second network node 112 and a third network node 113 are depicted in the non-limiting examples of FIG. 13. In other examples, which are not depicted in FIG. 13, any of the first network node 111, the second network node 112 and the third network node 113 may be a distributed node, such as a virtual node in the cloud, and may perform its functions entirely on the cloud, or partially, in collaboration with a radio network node.

Any of the first network node 111, the second network node 112 and the third network node 113 may be a radio network node. That is, a transmission point such as a radio base station, for example a gNB, an eNB, or any other network node with similar features capable of serving a wireless device, such as a user equipment or a machine type communication device, in the wireless communications network 100.

The wireless communications network 100 covers a geographical area which may be divided into cell areas, wherein each cell area may be served by a network node, although, one radio network node may serve one or several cells. The wireless communications network 100 may comprise at least one of: a first group of cells 120-1 and a second group of cells 120-2. The first group of cells 120-1 may be, for example, a MCG. The second group of cells 120-2 may be, for example, a SCG. The first group of cells 120-1 may comprise a first cell 121, and one or more first second cells 122. In the non-limiting examples depicted in panels a) and b) of FIG. 13, only one first second cell 122 is depicted to simplify the Figure. However, it will be understood that more first second cells may be comprised in the one or more first second cells 122. The first cell 121 maybe a primary cell (PCell) and each of the one or more first second cells 122 may be a secondary cell (SCell). In the non-limiting example depicted in FIG. 13, the first network node 111 is a radio network node that serves the first cell 121, and the one or more first second cells 122. Any of the first network node 111, the second network node 112 and the third network node 113 may serve receiving nodes, such as wireless devices, with serving beams, the areas of coverage of the beams may still be referred to as cells.

The second group of cells 120-2 may comprise a third cell 123, and one or more fourth cells 124, also referred to herein as the one or more second cells 124. In the non-limiting examples depicted in panels a) and b) of FIG. 13, only one fourth cell 124 is depicted to simplify the Figure. However, it will be understood that more fourth cells may be comprised in the one or more fourth cells 124. The third cell 123 maybe a primary secondary cell (PSCell) and each of the one or more fourth cells 124 may be a secondary cell (SCell). In the non-limiting example depicted in FIG. 13, the second network node 112 is a radio network node that serves the third cell 123, and the one or more second cells 124.

The first network node 111, in some examples, may be a MN.

The second network node 112, in some examples, may be a SN.

The wireless communications network 100 may comprise a fifth cell 125. The fifth cell 125 may be any of: a primary cell (PCell), a secondary cell (SCell), or a primary secondary cell (PSCell) at a different time point than any of the first cell 121, the one or more first second cells 122, the third cell 123, and/or the one or more fourth cells 124. In the non-limiting example depicted in FIG. 13, the third network node 113 is a radio network node that serves the fifth cell 125.

Since any of the one or more first second cells 122 or the one or more fourth cells 124 may be a secondary cell, the wireless communications network 100 may be understood to comprise a secondary cell 122, 124. Any of the one or more first second cells 122 and the one or more fourth cells 124 may be referred to herein as a second cell 122, 124.

Panel b) of FIG. 13 depicts a further particular example of the wireless communications network 100 from that depicted in panel a). In the non-limiting example of the wireless communications network 100 depicted in panel b), first network node 111 is a gNB serving the wireless device 130, which is a UE, with the first group of cells 120-1 is a MCG comprising the first cell 121, which is a PCell, and two first second cells 122, each of which being a SCell. Also in the non-limiting example of the wireless communications network 100 depicted in panel b), the wireless communications network 100 further comprises the second network node 112. The second network node 112, in this example, is a gNB serving the wireless device 130, with the second group of cells 120-2, which is a SCG comprising the third cell 123, which is a PSCell, and two fourth cells 124, each of which being a SCell. The third network node 113, in this example, is a gNB serving the wireless device 130 at another time point, represented with the thick arrow with discontinued line, with the fifth cell 125.

In other examples, the first network node 111 may be an eNB as MN, and the second network node 112 may be a gNB as SN. It may be noted embodiments herein may be understood to also be applicable to other DC cases, such as LTE-NR DC, where NR is the master and LTE is the secondary node (NE-DC), NR-NR DC, where both the master and secondary nodes are NR nodes, or even between LTE/NR and other RATs.

Any of the first network node 111, the second network node 112 and the third network node 113 may be of different classes, such as, e.g., macro base station, home base station or pico base station, based on transmission power and thereby also cell size. Any of the first network node 111, the second network node 112 and the third network node 113 may support one or several communication technologies, and its name may depend on the technology and terminology used. In 5G/NR, any of the first network node 111, the second network node 112 and the third network node 113 may be referred to as a gNB and may be directly connected to one or more core networks, which are not depicted in FIG. 13. In LTE, any of the first network node 111, the second network node 112 and the third network node 113 may be referred to as an eNB.

A plurality of wireless devices are located in the wireless communication network 100, whereof a wireless device 130, is depicted in the non-limiting examples of FIG. 13. The wireless device 130 comprised in the wireless communications network 100 may be a wireless communication device such as a 5G UE, or a UE, which may also be known as e.g., user equipment, mobile terminal, wireless terminal and/or mobile station, a mobile telephone, cellular telephone, or laptop with wireless capability, just to mention some further examples. Any of the wireless devices comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a tablet with wireless capability, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks, which may comprised within the wireless communications network 100.

The wireless device 130 may be configured to communicate within the wireless communications network 100 with the first network node 111 in the first cell 121 over a first link 141, e.g., a radio link. The wireless device 130 may be configured to communicate within the wireless communications network 100 with the first network node 111 in each of the one or more first second cells 122 over a respective second link 142, e.g., a radio link. The wireless device 130 may be configured to communicate within the wireless communications network 100 with the second network node 112 in the third cell 123 over a third link 143, e.g., a radio link. The wireless device 130 may be configured to communicate within the wireless communications network 100 with the second network node 112 in each of the one or more fourth cells 124 over a respective fourth link 144, e.g., a radio link. The wireless device 130 may be configured to communicate within the wireless communications network 100 with the third network node 113 in the fifth cell 125 over a fifth link 145, e.g., a radio link.

The first network node 111 and the second network node 112 may be configured to communicate within the wireless communications network 100 over a sixth link 146, e.g., a wired link or an X2 interface. The second node 102 and the third node 103 may be configured to communicate within the wireless communications network 100 over a seventh link 147, e.g., a wired link or an X2 interface.

In general, the usage of "first", "second", "third", "fourth", "fifth", "sixth" and/or "seventh" herein may be understood to be an arbitrary way to denote different elements or entities, and may be understood to not confer a cumulative or chronological character to the nouns they modify.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some embodiments herein will be further described with some non-limiting examples.

In the following description, any reference to a/the "UE", a/the "wireless terminal", a/the "user equipment", or simply "UE", "wireless terminal", or "user equipment" may be understood to equally refer the first node 101; any reference to a/the "secondary cell", or simply "secondary cell", a/the "SCell", or simply "SCell" may be understood to equally refer the second cell 122, 124; any reference to a/the "PCell cell", or simply "PCell" may be understood to equally refer the first cell 121; any reference to a/the "PSCell", or simply "PSCell" may be understood to equally refer the third cell 123; any reference to a/the RAN node owning the Pcell may be understood to equally refer to the first network node 111, e.g., as an example of the third node 103; any reference to a/the RAN node owning the PScell may be understood to equally refer to the second network node 112, e.g., as an example of the third node 103; any reference to a/the network node, a/the NW, a/the network, and/or a/the "node receiving the RACH report" may be understood to equally refer to the second node 102; any reference to a/the core network, a/the MME, a/the AMF, may be understood to equally refer to an example of the third node 103.

Embodiments of a method, performed by the first node 101, e.g., a wireless device 130, wireless terminal or user equipment, will now be described with reference to the flowchart depicted in FIG. 14. The method may be understood to be for providing one or more indications related to a random access (RA) procedure, e.g., a RACH procedure, by the first node 101 to a second cell 122, 124, when served by a first cell 121, e.g., primary cell, or cell serving/having served the first node 101 during the random access procedure. The second cell 122, 124 is a secondary cell. The first node 101 operates in the wireless communications network 100. The method may be understood to be computer-implemented.

A random access procedure by the first node to the second cell may be understood as a random access procedure performed toward the second cell. A RACH procedure may be also referred to as, e.g., a RA procedure.

In some embodiments, the wireless communications network 100 may support at least one of: New Radio (NR), Long Term Evolution (LTE), LTE for Machines (LTE-M), enhanced Machine Type Communication (eMTC), and Narrow Band Internet of Things (NB-IoT).

The first node 101 may support simultaneous connectivity to more than one cell.

Several embodiments are comprised herein. In some embodiments all the actions may be performed. In some embodiments, one or more actions may be performed. It should be noted that the examples herein may be not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the first node 101 is depicted in FIG. 14. FIG. 14, optional actions are represented with dashed lines. The method may comprise one or more of the following actions.

Figure 14:
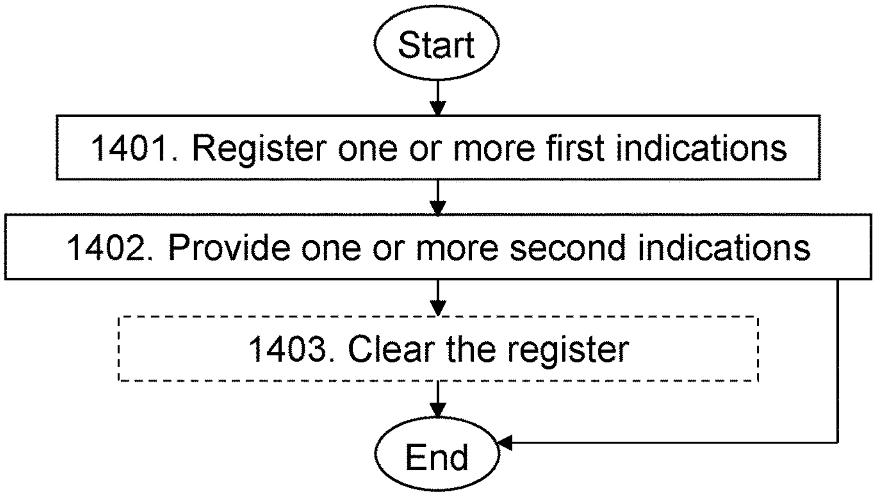
FIG. 14 is a flowchart depicting a method in a first node, according to embodiments herein.

In FIG. 14, optional units are indicated with dashed boxes.

Action 1401

During the course of communications in the wireless communications network 100, the first node 101 may attempt to perform a random access procedure, e.g., a RACH procedure, towards the second cell 122, 124, that is, the secondary cell, when served by the first cell 121, e.g., the primary cell, or cell serving/having served the first node 101 during the random access procedure. The second cell 122, 124 may be, for, example, a beam, e.g., a beamforming beam. Beamforming beams may be narrow, and therefore, random access attempts on beams other than a serving beam may happen often.

The random access procedure may be, e.g., a RACH procedure. The random access procedure may be one of: a two step procedure and a four step procedure.

In order to perform mobility robustness optimization and/or RACH optimization, and/or Coverage and capacity optimization (CCO), the first node 101 may report the information gathered during the random access attempts to the network, e.g., to a network node within radio coverage, such as the first network node 111 and/or the second network node 112, or the third network node 113.

In order to identify the cell on which the information on the random access procedure has been collected, in this Action 1401, the first node 101 registers, in a register, a first identifier of the second cell 122, 124, e.g., PCI, ARFCN, and one or more first indications. Registering in a register in this Action 1401 may be understood as, e.g., creating a register or log, or adding to a register or log.

The one or more first indications indicate at least one of: i) a second identifier, e.g., CGI and TAC, of the first cell 121, ii) a third identifier, e.g., CGI and TAC, of a primary secondary cell 123, e.g., Primary SCG cell or PSCell, iii) a fourth identifier, e.g., Global Node ID, of the first network node 111 owning the first cell 121, iv) a fifth identifier, e.g., Global Node ID, of the second network node 112 owning the primary secondary cell 123, and v) an indicator of a cell group, e.g., cell group type e.g., MCG, SCG, the second cell 122, 124 belongs to.

According to the foregoing, the first node 101 may log a local identifier of the second cell 122, 124, e.g., the PCI or the ARFCN, and at least one of the global identities that may enable to identify the second cell 122, 124. The second identifier may be understood as a global identifier of the first cell 121. The third identifier may be understood as a global identifier of the primary secondary cell 123. The fourth identifier may be understood as a global identifier of the first network node 111 owning the first cell 121. The fifth identifier may be understood as a global identifier of the second network node 112 owning the primary secondary cell 123.

Additionally, the first node 101 may register the indicator of the cell group the second cell 122, 124 may belong to.

In some embodiments, the one or more first indications may indicate Primary Cell Identity (PCell ID), and its associated TAC.

In some examples, the cell group type the second cell 122 belongs to may be a Master Cell Group.

In some examples of embodiments herein, the first node 101, e.g., a UE, may log the PCell ID and its associated TAC if the SCell that the first node 101 performed the RACH toward to, belongs to MCG cells. In these examples of embodiments herein, the first node 101, e.g., UE, may be already required to read the CGI and TAC of the PCell and upon performing RCH toward a cell belonging to the MCG cells, it may log the PCell ID as part of a RACH report performed toward the SCell belonging to the MCG cells.

In particular embodiments, the one or more first indications may comprise the indicator of the cell group, and the indicator may indicate the cell group type the second cell 122 belongs to is an MCG.

In some examples, the cell group type the second cell 122 belongs to may be a Secondary Cell Group.

In another example of embodiments herein, the first node 101, e.g., a UE, may log the PSCell ID and its associated TAC if the SCell that the first node 101 performed the RACH procedure toward to, belongs to the SCG cells. In this example of embodiments herein, the first node 101 may be already required to read the CGI and TAC of the PSCell, and upon performing RCH toward a cell belonging to the SCG cells, it may log the PSCell ID as part of a RACH report performed toward the SCell belonging to the SCG cells.

In particular embodiments, the one or more first indications may comprise the indicator of the cell group, and the indicator may indicate the cell group type the second cell 122 belongs to is an SCG.

In yet another example of embodiments herein, the first node 101 may log the PCell ID and PSCell ID and their associated Tracking Area Codes (TACs) if the SCell that the first node 101 performed the RACH toward belongs to SCG cells or MCG cells.

In case the first node 101 may have the global cell identity of both PCell and PSCell it may log and report the global cell ID and TAC of both PCell and PSCell.

In all the above examples of embodiments herein the first node 101, if available, may log the Global Node ID of the PCell or the PSCell, beside the cell global Identity and TAC.

In particular embodiments, the first node 101 may register at least one of: a) the first identifier, the second identifier and the indicator, and b) the first identifier, and another identifier of the second network node 112 owning the second cell 122, 124.

In some embodiments, the one or more first indications may indicate at least one of: a) at least one of a PCell ID, and a PSCell ID, and their associated TACs, b) at least one of a global cell identity of the first cell 121, wherein the first cell 121 is a primary cell, and a global cell identity of the primary secondary cell 123, and c) at least one of the identity of the first cell 121, wherein the first cell 121 is the primary cell, and the global cell identity of the primary secondary cell 123, and their associated TACs.

The one or more first indications may indicate the Global Node Identity (ID) of the first cell 121 or the primary secondary cell 122, e.g., Primary SCG cell of PSCell, the cell global Identity and TAC.

In some embodiments, at least one of the following may apply: a) the random access procedure may be one of: a two step procedure and a four step procedure, and b) the registering in this Action 1401 may be performed upon performing the random access procedure to the second cell 122, 124.

Examples of embodiments herein may comprise a method at a wireless terminal, also called User Equipment, and referred as a UE in the description of embodiments and examples herein, the method comprising the following non-limiting examples of embodiments herein.

In some particular examples, upon performing a 4-step RACH procedure on the second cell 122, 124, a secondary cell (SCell), the first node 101, e.g., a UE, may log: a) Physical cell identity (PCI) of the secondary cell, b) ARFCN of the secondary cell, c) Global Cell ID (CGI) and TAC (TAC) of the PCell, d) Global Cell ID (CGI) and TAC (TAC) of PSCell, if the UE is in DC scenario, e) Global Node ID of the RAN node owning the cell in which UE performed the RACH, f) Global Node ID of the RAN node owning the Pcell, g) Global Node ID of the RAN node owning the PScell, and/or h) an indication on whether the RACH procedure is performed on SCell belonging to MCG or SCG. According to the foregoing, the first node 101 may log the PCI and the ARFCN of the second cell 122, 124, and at least one of the global identities that may enable to identify the second cell 122, 124. Additionally, the first node 101 may register the indicator of the cell group.

In other particular examples, upon performing a 2-step RACH procedure on the second cell 122, 124, a secondary cell (SCell), the first node 101, e.g., a UE, may log: a) Physical cell identity (PCI) of the secondary cell, b) ARFCN of the secondary cell, c) Global Cell ID (CGI) and TAC (TAC) of the PCell, d) Global Cell ID (CGI) and TAC (TAC) of PSCell, if UE is in DC scenario, e) Global Node ID of the RAN node owning the cell in which UE performed the RACH, f) Global Node ID of the RAN node owning the Pcell, g) Global Node ID of the RAN node owning the PScell, and/or h) an indication on whether the RACH procedure is performed on SCell belonging to MCG or SCG. According to the foregoing, the first node 101 may log the PCI and the ARFCN of the second cell 122, 124, and at least one of the global identities that may enable to identify the second cell 122, 124. Additionally, the first node 101 may register the indicator of the cell group.

By registering the first identifier of the second cell 122, 124, and the one or more first indications in this Action 1401, the first node 101 may then be enabled to indicate the registered first identifier and the one or more first indications to another node different than the serving node, as will be described in the next Action 1402. This may thereby enable the another node to identify the second cell 122, 124, even when it may not be the serving node. For example, the random access procedure may be performed at a first time period. The one or more first indications may enable to identify the second cell 122, 124 at a second time period, e.g., a different time period than the first time period At the second time period, the first node 101 may be served by a network node, e.g., the second node 102, other than that controlling the second cell 122. The random access procedure performed according to embodiments herein may enable to identify the second cell 122, 124 by a network node, e.g., the second node 102, serving the first node 101 other than that controlling the second cell 122, e.g., during the second time period.

According to the foregoing, the another node, e.g., the second node 102, may be enabled to forward the received indications to the third node 103, e.g., the node serving the cells the random access procedures have been attempted on, and to enable those nodes to, in turn, perform mobility robustness optimization, RACH optimization and/or CCO. As a consequence, the random access procedure may be improved, and the resources in the wireless communications network 100 may be more efficiently used.

Action 1402

After having registered the identifiers and the one or more first indications, in this Action 1402, the first node 101 provides, to at least one of: the first node 101, and the second node 102, one or more second indications based on the registered first identifier and the one or more first indications.

Providing may be understood as sending, or outputting.

The one or more second indications may be based on, e.g., comprising, indicating, the registered one or more first indications. In some embodiments, the one or more first indications may be the one or more second indications.

The one or more second indications may be provided, e.g., comprised in a report, such as a RACH report, e.g., a RACH report list. In some embodiments wherein the report may be a RACH report, the RACH report may be comprised in a message, e.g., a UEInformationResponse. A non-limiting example implementation in the RRC specifications of the message is provided at the end of this Action 1402.

In some examples, the second node 102 may be a network node such as the first network node 111, e.g., the Pcell or the second network node 112, e.g., the PSCell. In other examples, the second node 102 may be different than the first network node 111 and the second network node 112, such as a third network node 113.

In some embodiments, the one or more second indications may indicate at least one of the second identifier and the third identifier.

In particular embodiments, the one or more second indications may indicate the second identifier.

In yet another example of embodiments herein, the first node 101 may provide PCell ID and PSCell ID and their associated TACs if the SCell that the first node 101 performed the RACH toward belongs to SCG cells or MCG cells.

If the second cell 122, 124 was configured as part of a secondary cell group, then first node 101 may need to provide the indicator of the cell group.

By providing the one or more second indications based on the registered first identifier and the one or more first indications to the second node 102 in this Action 1402, the first node 101 may then enable the second node 102 to identify the second cell 122, 124, even when it may not be the serving node. Hence, the second node 102 may be enabled to forward the received indications to the node serving the second cell 122, 124 the random access procedures have been attempted on, and to enable those nodes to, in turn, perform mobility robustness optimization, RACH optimization and/or CCO. As a consequence, the random access procedure may be improved, and the resources in the wireless communications network 100 may be more efficiently used.

Non-limiting Example Implementation in the RRC Specifications

One way to implement the proposed method in the RRC specifications may be to create a RACH report containing at least some of the proposed information. The RACH report may be included in an UEInformationResponse message, as follows. In this example, the first node 101 is a UE.

5.7.10.4 Actions Upon Successful Completion of Random-Access Procedure

Upon successfully performing 4 step random access procedure, the UE may be required to:

1> if the number of RA-Report stored in the RA-ReportList is less than 8 and if the number of Public Land Mobile Network (PLMN) entries in plmn-IdentityList stored in VarRA-Report is less than maxPLMN, then append the following contents associated to the successfully completed random-access procedure as a new entry in the VarRA-Report.

2> if the list of EPLMNs has been stored by the UE:

3> if the RPLMN is included in plmn-IdentityList stored in VarRA-Report.

4> set the plmn-IdentityList to include the list of EPLMNs stored by the UE (i.e. includes the RPLMN) without exceeding the limit of maxPLMN;

3> else:

4> clear the information included in VarRA-Report,

4> set the plmn-IdentityList to the list of EPLMNs stored by the UE (i.e. includes the RPLMN);

2> else:

3> set the plmn-Identity, in plmn-IdentityList, to the PLMN selected by upper layers from the PLMN(s) included in the plmn-IdentityList in SIB1;

2> if the global cell identity of the cell in which RACH is performed is available:

3> set the cellId to the global cell identity and the tracking area code of the cell in which the random-access procedure was performed;

2> else:

3> set the cellId to the physical cell identity and carrier frequency of that cell;

2> if the RACH procedure is performed toward an SCell

3> set the PcellId to the global cell identity and the tracking area code of the PCell.

3> set the PScellId to the global cell identity and the tracking area code of the PSCell, if available 2> if available, set the globalNodeIdPcell to the global node ID of the RAN node owning the PCell, 2> if available, set the globalNodeIdPScell to the global node ID of the RAN node owning the PSCell, 2> set the raPurpose to include the purpose of triggering the random-access procedure;

2> if the RACH procedure is performed on a SCell include the

2> set the ra-InformationCommon-r16 as specified in subclause 5.7.10.5.

UEInformationResponse

The UEInformationResponse message is used by the UE to transfer the information requested by the NG-RAN.

Signalling radio bearer: SRB1 or SRB2 (when logged measurement information is included)

RLC-SAP: AM

Logical channel: DCCH

Direction: UE to NG-RAN

UEInformationResponse message

```
RA-ReportList-r16 := SEQUENCE (SIZE (1..maxRAReport-r16)) OF
RA-Report-r16
RA-Report-r16 ::=  SEQUENCE {
  cellId-r16  CHOICE {
      cellGlobalId-r16  CGI-Info-Logging-r16,
      pci-arfcn  SEQUENCE {
      physCellId-r16  PhysCellId,
    carrierFreq-r16  ARFCN-ValueNR
      }
    }
    PCellId  CGI-Info-Logging-r16  OPTIONAL,
    PSCellId  CGI-Info-Logging-r16  OPTIONAL,
    globalNodeIdPCel  BIT STRING (SIZE(22..32))  OPTIONAL,
    globalNodeIdPSCel  BIT STRING (SIZE(22..32))  OPTIONAL,
  ra-InformationCommon-r16  RA-InformationCommon-r16,
  raPurpose-r16  ENUMERATED {accessRelated,
beamFailureRecovery, reconfigurationWithSync, ulUnSynchronized,
          schedulingRequestFailure, noPUCCHResourceAvailable,
requestForOtherSI,
          spare9, spare8, spare7, spare6, spare5, spare4, spare3,
spare2, spare1}
}
RA-InformationCommon-r16 ::=  SEQUENCE {
  absoluteFrequencyPointA-r16  ARFCN-ValueNR,
  locationAndBandwidth-r16  INTEGER (0..37949),
  subcarrierSpacing-r16  SubcarrierSpacing,
  msg1-FrequencyStart-r16  INTEGER
(0..maxNrofPhysicalResourceBlocks-1) OPTIONAL,
  msg1-FrequencyStartCFRA-r16  INTEGER
(0..maxNrofPhysicalResourceBlocks-1) OPTIONAL,
  msg1-SubcarrierSpacing-r16  SubcarrierSpacing  OPTIONAL,
  msg1-SubcarrierSpacingCFRA-r16  SubcarrierSpacing  OPTIONAL,
  msg1-FDM-r16  ENUMERATED {one, two, four, eight}
  OPTIONAL,
  msg1-FDMCFRA-r16  ENUMERATED {one, two, four, eight}
OPTIONAL,
  perRAInfoList-r16  PerRAInfoList-r16
}
PerRAInfoList-r16 ::= SEQUENCE (SIZE (1..200)) OF PerRAInfo-r16
PerRAInfo-r16 ::=  CHOICE {
  perRASSBInfoList-r16  PerRASSBInfo-r16,
  perRACSI-RSInfoList-r16  PerRACSI-RSInfo-r16
}
PerRASSBInfo-r16 ::=  SEQUENCE {
  ssb-Index-r16  SSB-Index,
  numberOfPreamblesSentOnSSB-r16  INTEGER (1..200),
  perRAAttemptInfoList-r16  PerRAAttemptInfoList-r16
}
PerRACSI-RSInfo-r16 ::=  SEQUENCE {
  csi-RS-Index-r16  CSI-RS-Index,
  numberOfPreamblesSentOnCSI-RS-r16  INTEGER (1..200)
}
PerRAAttemptInfoList-r16 ::=  SEQUENCE (SIZE (1..200)) OF
PerRAAttemptInfo-r16
PerRAAttemptInfo-r16 ::=  SEQUENCE {
  contentionDetected-r16  BOOLEAN  OPTIONAL,
  dlRSRPAboveThreshold-r16  BOOLEAN  OPTIONAL,
  ...
}
```

| RA-Report field descriptions |
|---|
| absoluteFrequencyPointA<br>This field indicates the absolute frequency position of the reference resource block (Common RB 0). |
| cellID<br>This field indicates the CGI of the cell in which the associated random access procedure was performed. |
| contentionDetected<br>This field is used to indicate that contention was detected for the transmitted preamble in the given random access attempt or not. This field is not included when the UE performs random access attempt is using contention free random-access resources or when the ra-Purpose is set to requestForOtherSI. |
| csi-RS-Index<br>This field is used to indicate the Channel State Information (CSI)-Reference Signal (RS) index corresponding to the random access attempt. |
| dlRSRPAboveThreshold<br>This field is used to indicate whether the Downlink (DL) beam (SSB) quality associated to the random access attempt was above or below the threshold (rsrp-ThresholdSSB in beamFailureRecoveryConfig in UL BWP configuration of UL BWP selected for random access procedure initiated for beam failure recovery; Otherwise, rsrp-ThresholdSSB in rach-ConfigCommon in UL BWP configuration of UL BWP selected for random access procedure. |
| globalNodeIdPCel<br>This field indicates the global node ID owning the PCell when UE performs a random access |
| globalNodeIdPSCel<br>This field indicates the global node ID owning the PSCell when UE performs a random access |
| locationAndBandwidth<br>Frequency domain location and bandwidth of the bandwidth part associated to the random-accessresources used by the UE. |
| numberOfPreamblesSentOnCSI-RS<br>This field is used to indicate the total number of successive RA preambles that were transmitted on the corresponding CSI-RS. |
| numberOfPreamblesSentOnSSB<br>This field is used to indicate the total number of successive RA preambles that were transmitted on the corresponding SSB/Physical Broadcast Channel (PBCH) block. |
| PCellId<br>This field indicates the CGI of the PCell of MCG in which the random access procedure was performed toward an SCell belonging to the MCG. |
| PSCellId<br>This field indicates the CGI of the PSCell of SCG in which the random access procedure was performed toward an SCell belonging to the SCG. |
| perRAAttemptInfoList<br>This field provides detailed information about a random access attempt. |
| perRAInfoList<br>This field provides detailed information about each of the random access attempts in the chronological order of the random access attempts. |
| perRACSI-RSInfoList<br>This field provides detailed information about the successive random acess attempts associated to the same CSI-RS. |
| perRASSBInfoList<br>This field provides detailed information about the successive random access attempts associated to the same SS/PBCH block. |
| raPurpose<br>This field is used to indicate the RA scenario for which the RA report entry is triggered. The RA accesses associated to Initial access from RRC_IDLE, transition from RRC-INACTIVE and the MSG3 based SI request are indicated using the indicator 'accessRelated'. The indicator beamFailureRecovery is used in case of beam failure recovery failure in the SpCell [3]. The indicator reconfigurationWithSync is used if the UE executes a reconfiguration with sync. The indicator ulUnSynchronized is used if the random access procedure is initiated in a serving cell by Downlink (DL) or UL data arrival during RRC_CONNECTED when the timeAlignmentTimer is not running in the TAG of the concerned serving cell or by a Physical Downlink Control Channel (PDCCH) order [3]. The indicator schedulingRequestFailure is used in case of Scheduling Request (SR) failures [3]. The indicator noSRPUCCHResourceAvailable is used when the UE has no valid SR Physical Uplink Control Channel (PUCCH) resources configured [3]. The indicator requestForOtherSI is used for MSG1 based on demand SI request. |
| ra-InformationCommon<br>This field is used to indicate the common random-access related information between RA-report and RLF-report. For RA report, this field is mandatory presented. For RLF-report, this field is optionally included when connectionFailureType is set to 'hof' or when connectionFailureType is set to 'rlf' and the rlf-Cause equals to 'randomAccessProblem' or 'beamRecoveryFailure'; otherwise this field is absent. |
| ssb-Index<br>This field is used to indicate the SS/PBCH index of the SS/PBCH block corresponding to the random access attempt. |
| ssbRSRPQualityIndicator<br>This field is used to indicate the SS/PBCH RSRP of the SS/PBCH block corresponding to the random access attempt is above rsrp-ThresholdSSB or not. |
| subcarrierSpacing<br>Subcarrier spacing used in the BWP associated to the random-access resources used by the UE. |

Action 1403

In some embodiments, the method may further comprise that, in this Action 1403, the first node 101 may clear the register after sending the one or more second indications in Action 1402, e.g., upon successful delivery of the report.

By clearing the register after having sent the one or more second indications in this Action 1403, the first node 101 may be enabled to fill the register with the information and measurement of the next performed random access procedure.

Embodiments of a method, performed by the second node 102, e.g., the third network node 113, will now be described with reference to the flowchart depicted in FIG. 15. The method may be understood to be for handling the one or more indications related to the random access procedure, e.g., RACH procedure, by the first node 101 to the second cell 122, 124, when served by the first cell 121, e.g., the primary cell, or the cell serving/having served the first node 101 during the random access procedure. The second cell 122, 124 is a secondary cell. The second node 102 and the first node 101 operate in the wireless communications network 100. The method may be understood to be computer-implemented.

The second node 102 may serve the first node 101 in a configuration supporting simultaneous connectivity to more than one cell.

The method may comprise one or more of the following actions. Several embodiments are comprised herein. In some embodiments all the actions may be performed. In some embodiments, one or more actions may be performed. It should be noted that the examples herein may be not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the second node 102 is depicted in FIG. 15. In FIG. 15, optional actions are represented with dashed lines.

The detailed description of some of the following corresponds to the same references provided above, in relation to the actions described for the first node 101 and will thus not be repeated here. For example, in some embodiments, the wireless communications network 100 may support at least one of: NR, LTE, LTE-M, eMTC, and NB-IoT.

Action 1501

In this Action 1501, the second node 102 receives, from the first node 101, the one or more second indications. The one or more second indications indicate the first identifier of the second cell 122, 124, e.g., PCI, ARFCN, and the one or more first indications registered by the first node 101. The one or more first indications indicate at least one of: i) the second identifier, e.g., CGI and TAC, of the first cell 121, ii) the third identifier, e.g., CGI and TAC, of the primary secondary cell 123, e.g., Primary SCG cell of PSCell, iii) the fourth identifier, e.g., Global Node ID, of the first network node 111 owning the first cell 121, iv) the fifth identifier, e.g., Global Node ID, of the second network node 112 owning the primary secondary cell 123, and v) the indicator of the cell group, e.g., cell group type e.g., MCG, SCG, the second cell 122, 124 belongs to.

In some examples, the one or more second indications may indicate the second identifier.

In some examples, the one or more second indications may indicate the second identifier and/or the third identifier.

In some examples, at least one of the following may apply: a) the random access procedure may be one of: a two step procedure and a four step procedure, and b) the registering in Action 1401 may have been performed upon performing the random access procedure to the second cell 122, 124.

In some embodiments, the one or more first indications may indicate at least one of: a) the first identifier, the second identifier and the indicator, and b) the first identifier, and another identifier of the second network node 112 owning the second cell 122, 124.

In some embodiments, the one or more first indications may indicate PCell ID and its associated TAC.

In some examples, the one or more first indications may indicate PCell ID and/or PSCell ID and their associated Tracking area codes.

In particular embodiments, the one or more first indications may indicate at least one of: a) at least one of the PCell ID and the PSCell ID, and their associated TACs, b) at least one of the global cell identity of the first cell 121, wherein the first cell 121 is the primary cell, and the global cell identity of the primary secondary cell 123, and c) at least one of the identity of the first cell 121, wherein the first cell 121 is the primary cell, and the global cell identity of the primary secondary cell 123, and their associated TACs.

In some embodiments, the one or more first indications may indicate the Global Node ID of the first cell 121 or the primary secondary cell 122, e.g., Primary SCG cell of PSCell, the cell global Identity and the TAC.

In some examples, the cell group type the second cell 122 belongs to may be a Master Cell Group.

In some embodiments, the one or more first indications may comprise the indicator of the cell group, and the indicator may indicate the cell group type the second cell 122 belongs to is an MCG.

In some examples, the cell group type the second cell 122 belongs to may be a Secondary Cell Group.

In some embodiments, the one or more first indications may comprise the indicator of the cell group, and the indicator may indicate the cell group type the second cell 122 belongs to is an SCG.

In some embodiments, the one or more second indications may indicate at least one of the second identifier and the third identifier.

The one or more second indications may be based on, e.g., may be comprising, indicating, the registered one or more first indications. In some embodiments, the one or more first indications may be the one or more second indications.

The one or more second indications may be comprised in the report. The report may the a RACH report, e.g., a RACH report list. The RACH report may be comprised in a message, e.g., the UEInformationResponse.

Action 1502

In this Action 1502, the second node 102 sends to the third node 103, one or more third indications based on the received one or more second indications.

The third node 103 may be, e.g., at least one of: the first cell 121, the primary secondary cell 123, the first network node 111 and the second network node 112.

Sending may be understood as e.g., forwarding, transmitting. The sending in this Action 1502 may be performed according to any of the following options.

According to a first option, the sending in this Action 1502 may be performed over Xn interface. If there is an Xn interface between the second node 102, that is, the RAN node receiving the RACH report, and any of RAN nodes owning the PCell, that is, the first network node 111, or the PScell, that is, the second network node 112, forwarding the RACH report toward the PCell or the PSCell may be done over the Xn interface e.g., using Access And Mobility Indication Signal.

According to a second option, the sending in this Action 1502 may be performed over NG interface. The RAN node receiving the RACH report may forward the RACH report over NG interface to the core network, and the core network, e.g., AMF or MME, may be required to forward the report to the PCell or the PSCell, using the CGI and the TAC that may have been reported by the first node 101, e.g., a UE, as part of RACH report.

In yet another example of embodiments herein, the RAN node receiving the RACH report may forward the RACH report over NG interface to the core network, and the core network, e.g., AMF or MME, may be required to forward the report to the PCell or the PSCell using the global RAN Node ID reported by the first node 101 as part of RACH report.

Uplink RAN Configuration Transfer and Downlink RAN Configuration Transfer specified in 3GPP TS 38.413 v. 16.2.0 may be used as an example signal to convey the RACH report using the global RAN node ID.

According to a third option, the sending in this Action 1502 may be performed in an EN-DC, that is, LTE-NR Dual Connectivity, scenario.

In a non-standalone scenario, in which there may be no control plane connection between SCell and MME, the node receiving the RACH report, that is, the second node 102, may forward the RACH report to the MME and the MME may send the RACH report to the RAN node owning the PCell or the PScell.

In a sub-example of embodiments herein, if the RACH report is associated to an SCell belonging to the en-gNB, the RACH report may be forwarded from the MME to the eNB that the en-gNB is connected to, and the eNB may forward the RACH report to the en-gNB owning the SCell.

In a sub-example of embodiments herein, if the RACH report is associated to an SCell belonging to the eNB, the RACH report may be forwarded from MME to the eNB owning the SCell.

In some embodiments, the one or more second indications may indicate the second identifier.

EXAMPLE

To illustrate the method performed by the second node 102, a non-limiting example of the network side embodiments will now be provided. Upon receiving the list of RACH reports by a RAN node such as the second node 102, if the global cell ID and TAC associated to the cell in which the RACH is performed toward to is missing, e.g., in case of performing a RACH toward an SCell, the node receiving the RACH report may forward the RACH report to the PCell or toward the PSCell, if the PCell ID or the PSCell ID is included in the RACH report. Example of embodiments herein may be performed according to the sending options just described for this Action 1502.

In yet another example of embodiments herein, it may be assumed that the RA-Report related to each serving cell may be logged in separate RA-reports, that is, the PCell/PSCell RA may be stored in one RA-report and the SCell RA may be stored in another RA-report. In such a case, the RA-report list received by the second node 102, e.g., a gNB, may contain a mixture of SCells-related RACH reports and PCell/PScell-related RACH reports. In this case, the second node 102, e.g., the gNB, receiving the RA-report list may send the RACH report associated to an SCell to the PCell closer to the SCell in the list of RA-reports.

For example, a RACH report associated to an SCell, e.g., RACH report 2, may need to be sent to the PCell or the PSCell in which the first node 101 has performed a RACH and logged a RACH report for them right before or after the RACH report 2, which may be the PCell ID or PSCell ID logged in RACH report 1 or RACH report 3 in the list of RACH reports.

Embodiments of a method, performed by the third node 103, e.g., the first network node 111 or the second network node 112, will now be described with reference to the flowchart depicted in FIG. 16. The method may be understood to be for handling the one or more indications related to the random access procedure, e.g., RACH procedure, by the first node 101 to the second cell 122, 124, when served by the first cell 121, e.g., the primary cell, or the cell serving/having served the first node 101 during the random access procedure. The second cell 122, 124 is a secondary cell. The third node 103 and the first node 101 operate in the wireless communications network 100. The method may be understood to be computer-implemented.

The third node 103 may serve, or have served, the first node 101 in a configuration supporting simultaneous connectivity to more than one cell.

Several embodiments are comprised herein. In some embodiments all the actions may be performed. In some embodiments, one or more actions may be performed. It should be noted that the examples herein may be not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the third node 103 is depicted in FIG. 16. In FIG. 16, optional actions are represented with dashed lines.

The detailed description of some of the following corresponds to the same references provided above, in relation to the actions described for the first node 101 and will thus not be repeated here. For example, in some embodiments, the wireless communications network 100 may support at least one of: NR, LTE, LTE-M, eMTC, and NB-IoT.

Action 1601

In this Action 1601, the third node 103 receives, from the second node 102, the one or more third indications. The one or more third indications indicate the first identifier of the second cell 122, 124, e.g., PCI, ARFCN, and the one or more first indications registered by the first node 101. The one or more first indications indicate at least one of: i) the second identifier, e.g., CGI and TAC, of the first cell 121, ii) the third identifier, e.g., CGI and TAC, of the primary secondary cell 123, e.g., Primary SCG cell of PSCell, iii) the fourth identifier, e.g., Global Node ID, of the first network node 111 owning the first cell 121, iv) the fifth identifier, e.g., Global Node ID, of the second network node 112 owning the primary secondary cell 123, and v) the indicator of the cell group, e.g., cell group type e.g., MSC, SCG, the second cell 122, 124 belongs to.

In some examples, the one or more first indications may be the one or more second indications.

In some embodiments, the one or more first indications may indicate at least one of: a) the first identifier, the second identifier and the indicator, and b) the first identifier, and another identifier of the second network node 112 owning the second cell 122, 124.

In some embodiments, the one or more first indications may indicate PCell ID and its associated TAC.

In some examples, the one or more first indications may indicate PCell ID and/or PSCell ID and their associated Tracking area codes.

In particular embodiments, the one or more first indications may indicate at least one of: a) at least one of the PCell ID and the PSCell ID, and their associated TACs, b) at least one of the global cell identity of the first cell 121, wherein the first cell 121 is the primary cell, and the global cell identity of the primary secondary cell 123, and c) at least one of the identity of the first cell 121, wherein the first cell 121 is the primary cell, and the global cell identity of the primary secondary cell 123, and their associated TACs.

In some embodiments, the one or more first indications may indicate the Global Node ID of the first cell 121 or the primary secondary cell 122, e.g., Primary SCG cell of PSCell, the cell global Identity and the TAC.

In some examples, the cell group type the second cell 122 belongs to may be a Master Cell Group.

In some embodiments, the one or more first indications may comprise the indicator of the cell group, and the indicator may indicate the cell group type the second cell 122 belongs to is an MCG.

In some embodiments, such as some of the embodiments in the preceding paragraph, the one or more first indications may indicate the second identifier.

In some examples, the cell group type the second cell 122 belongs to may be a Secondary Cell Group.

In some embodiments, the one or more first indications may comprise the indicator of the cell group, and the indicator may indicate the cell group type the second cell 122 belongs to is an SCG.

In some embodiments, such as some of the embodiments in the preceding paragraph, the one or more first indications may indicate at least one of the second identifier and the third identifier.

The one or more third indications may be based on one or more second indications.

The one or more third indications may be based on, e.g., may be comprising, indicating, the registered one or more first indications. In some embodiments, the one or more first indications may be the one or more third indications.

The one or more third indications may be comprised in the report. The report may the a RACH report, e.g., a RACH report list. The RACH report may be comprised in a message, e.g., the UEInformationResponse.

The receiving in this Action 1601 may be performed according to any of the options discussed earlier in relation to the sending of Action 1502.

Action 1602

In this Action 1602, the third node 103 adapts a configuration of one or more cells controlled by the third node 103 based on the received one or more third indications.

The third node 103 may control, e.g., at least one of: the first cell 121, the primary secondary cell 123, the first network node 111 and the second network node 112.

Certain embodiments disclosed herein may provide one or more of the following technical advantage(s), which may be summarized as follows. Embodiments herein may be understood to introduce the possibility that, upon receiving the RACH report in which the RACH may have been performed on SCells, in which their CGI may not be known to the RAN node receiving the RACH report, the RAN node may be able to forward the RACH report to the PSCell and the PCell at the time of performing the RACH. Therefore, the PCell or the PSCell, at the time of performing the RACH, may be able to forward the RACH report to the Scell.

Having this solution in place, the SCell in carrier aggregation scenarios may be able to receive the RACH report and optimize and/or tune the RACH parameters.

Figure 17:
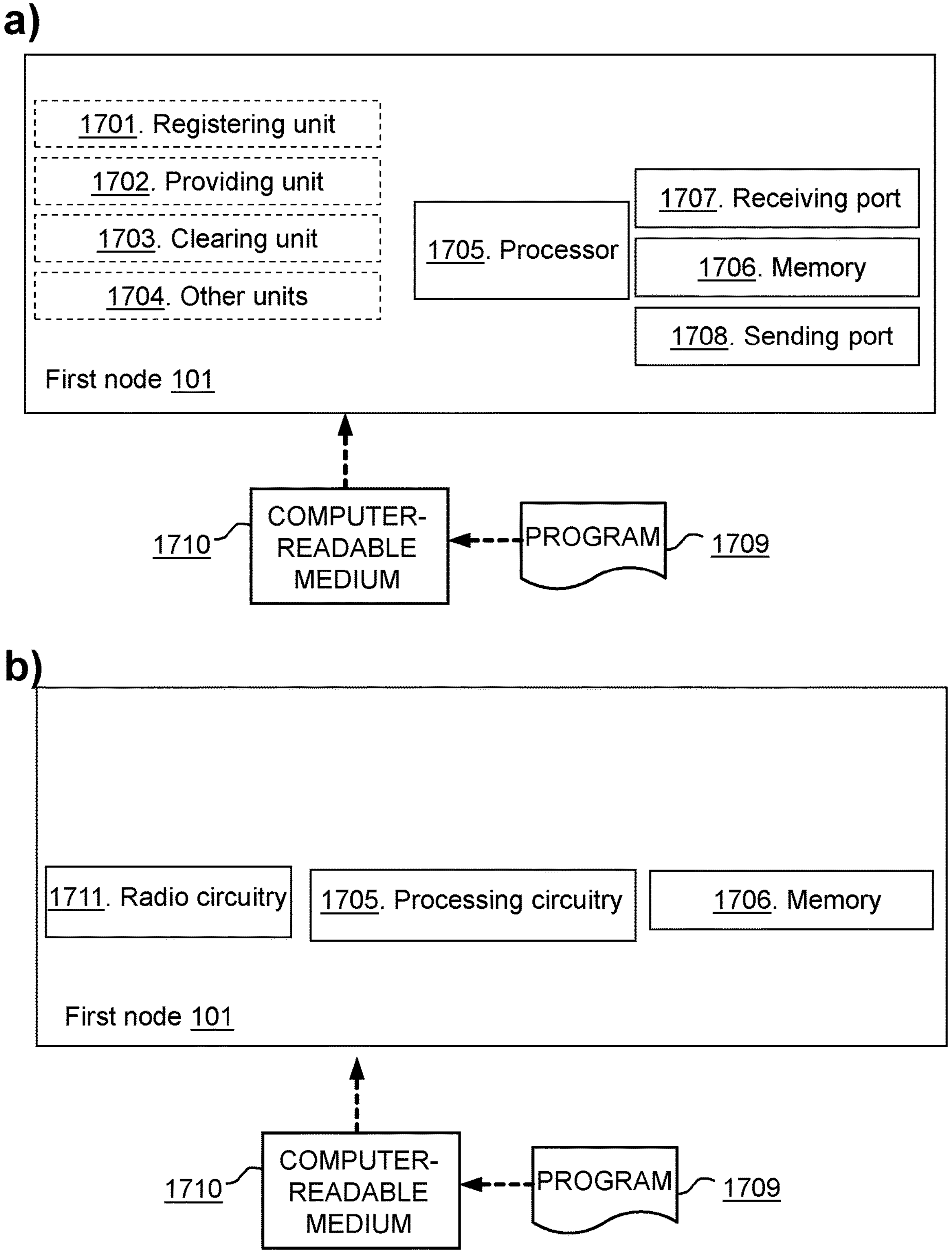
FIG. 17 is a schematic block diagram illustrating two embodiments, in panel a) and panel b), of a first node, according to embodiments herein.

FIG. 17 depicts two different examples in panels a) and b), respectively, of the arrangement that the first node 101 may comprise to perform the method actions described above in relation to FIG. 14. In some embodiments, the first node 101 may comprise the following arrangement depicted in FIG. 17*a*. The first node 101 may be understood to be for providing the one or more indications related to the random access procedure by the first node 101 to the second cell 122, 124, when served by the first cell 121. The second cell 122, 124 is configured to be a secondary cell. The first node 101 is configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first node 101 and will thus not be repeated here. For example, in some embodiments, the wireless communications network 100 may support at least one of: NR, LTE, LTE-M, eMTC, and NB-IoT.

In FIG. 17, optional units are indicated with dashed boxes.

The first node 101 is configured to perform the registering of Action 1401, e.g. by means of a registering unit 1701 within the first node 101, configured to register, in the register, the first identifier of the second cell 122, 124 and one or more first indications. The one or more first indications are configured to indicate at least one of: i) the second identifier of the first cell 121, ii) the third identifier of the primary secondary cell 123, iii) the fourth identifier of the first network node 111 configured to own the first cell 121, iv) the fifth identifier of the second network node 112 configured to own the primary secondary cell 123, and v) the indicator of the cell group the second cell 122, 124 is configured to belong to.

The first node 101 is configured to perform the providing of Action 1402, e.g. by means of a providing unit 1702 within the first node 101, configured to provide to at least one of: the first node 101, and the second node 102, the one or more second indications configured to be based on the first identifier and the one or more first indications configured to be registered.

In some embodiments, at least one of the following options may apply: a) the random access procedure may be configured to be one of: a two step procedure and a four step procedure, and b) the registering may be configured to be performed upon performing the random access procedure to the second cell 122, 124.

In some embodiments, the one or more first indications may be configured to indicate PCell ID and its associated TAC.

In some embodiments, the one or more first indications may be configured to comprise the indicator of the cell group, and the indicator may be configured to indicate the cell group type the second cell 122 is configured to belong to is a Master Cell Group.

In some embodiments, such as some of the embodiments in the preceding paragraph, the one or more second indications may be configured to indicate the second identifier.

In some embodiments, the one or more first indications may be configured to comprise the indicator of the cell group, and the indicator may be configured to indicate the cell group type the second cell 122 is configured to belong to is a Secondary Cell Group.

In some embodiments, such as some of the embodiments in the preceding paragraph, the one or more second indications may be configured to indicate at least one of the second identifier and the third identifier.

In some embodiments, the one or more first indications may be configured to indicate at least one of: a) at least one of the PCell ID and the PSCell ID, and their associated TACs, b) at least one of the global cell identity of the first cell 121, wherein the first cell 121 is configured to be a primary cell, and the global cell identity of the primary secondary cell 123, and c) at least one of the identity of the first cell 121, wherein the first cell 121 is configured to be the primary cell, and the global cell identity of the primary secondary cell 123, and their associated TACs.

In some embodiments, the one or more first indications may be configured to indicate the Global Node ID of the first cell 121 or the primary secondary cell 122, the cell global Identity and TAC.

In some embodiments, the one or more first indications may be configured to be the one or more second indications.

In some embodiments, the one or more second indications may be configured to be comprised in a report.

In some embodiments, the report may be configured to be a RACH report, and the RACH report may be configured to be comprised in a message.

In some embodiments, the first node 101 may be further configured to perform the clearing of Action 1403, e.g. by means of a clearing unit 1703 within the first node 101, configured to clear the register after sending the one or more second indications.

In some embodiments, the first node 101 may be configured to register at least one of a) the first identifier, the second identifier and the indicator, and b) the first identifier, and another identifier of the second network node 112 configured to own the second cell 122, 124.

Other units 1705 may be comprised in the first node 101.

The embodiments herein in the first node 101 may be implemented through one or more processors, such as a processor 1705 in the first node 101 depicted in FIG. 17*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first node 101. One such carrier may be in the form of a CD ROM disc. It is however feasible with other data carriers such as a memory stick. The computer program code may furthermore be provided as pure program code on a server and downloaded to the first node 101.

The first node 101 may further comprise a memory 1706 comprising one or more memory units. The memory 1706 is arranged to be used to store obtained information, store data, configurations, schedulings, and applications etc. to perform the methods herein when being executed in the first node 101.

In some embodiments, the first node 101 may receive information from, e.g., the second node 102 and/or the third node 103, through a receiving port 1707. In some embodiments, the receiving port 1707 may be, for example, connected to one or more antennas in first node 101. In other embodiments, the first node 101 may receive information from another structure in the wireless communications network 100 through the receiving port 1707. Since the receiving port 1707 may be in communication with the processor 1705, the receiving port 1707 may then send the received information to the processor 1705. The receiving port 1707 may also be configured to receive other information.

The processor 1705 in the first node 101 may be further configured to transmit or send information to e.g., the second node 102, the third node 103, and/or another structure in the wireless communications network 100, through a sending port 1708, which may be in communication with the processor 1705, and the memory 1706.

Those skilled in the art will also appreciate that the different units 1701-1704 described above may refer to a combination of analog and digital modules, and/or one or more processors configured with software and/or firmware, e.g., stored in memory, that, when executed by the one or more processors such as the processor 1705, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1701-1704 described above may be implemented as one or more applications running on one or more processors such as the processor 1705.

Thus, the methods according to the embodiments described herein for the first node 101 may be respectively implemented by means of a computer program 1709 product, comprising instructions, i.e., software code portions, which, when executed on at least one processor 1705, cause the at least one processor 1705 to carry out the actions described herein, as performed by the first node 101. The computer program 1709 product may be stored on a computer-readable storage medium 1710. The computer-readable storage medium 1710, having stored thereon the computer program 1709, may comprise instructions which, when executed on at least one processor 1705, cause the at least one processor 1705 to carry out the actions described herein, as performed by the first node 101. In some embodiments, the computer-readable storage medium 1710 may be a non-transitory computer-readable storage medium, such as a CD ROM disc, or a memory stick. In other embodiments, the computer program 1709 product may be stored on a carrier containing the computer program 1709 just described, wherein the carrier is one of an electronic signal, optical signal, radio signal, or the computer-readable storage medium 1710, as described above.

The first node 101 may comprise a communication interface configured to facilitate communications between the first node 101 and other nodes or devices, e.g., the network node 110 and/or the another network node 111. The interface may, for example, include a transceiver configured to transmit and receive radio signals over an air interface in accordance with a suitable standard.

In other embodiments, the first node 101 may comprise the following arrangement depicted in FIG. 17*b*. The first node 101 may comprise a processing circuitry 1705, e.g., one or more processors such as the processor 1705, in the first node 101 and the memory 1706. The first node 101 may also comprise a radio circuitry 1711, which may comprise e.g., the receiving port 1707 and the sending port 1708. The processing circuitry 1711 may be configured to, or operable to, perform the method actions according to FIG. 14 and/or FIGS. 24-28, in a similar manner as that described in relation to FIG. 17*a*. The radio circuitry 1711 may be configured to set up and maintain at least a wireless connection with the second node 102, the third node 103 and/or the another network node 111. Circuitry may be understood herein as a hardware component.

Hence, embodiments herein also relate to the first node 101 comprising the processing circuitry 1705 and the memory 1706, said memory 1706 containing instructions executable by said processing circuitry 1705, whereby the first node 101 is operative to perform the actions described herein in relation to the first node 101, e.g., in FIG. 14 and/or FIGS. 24-28.

Figure 18:
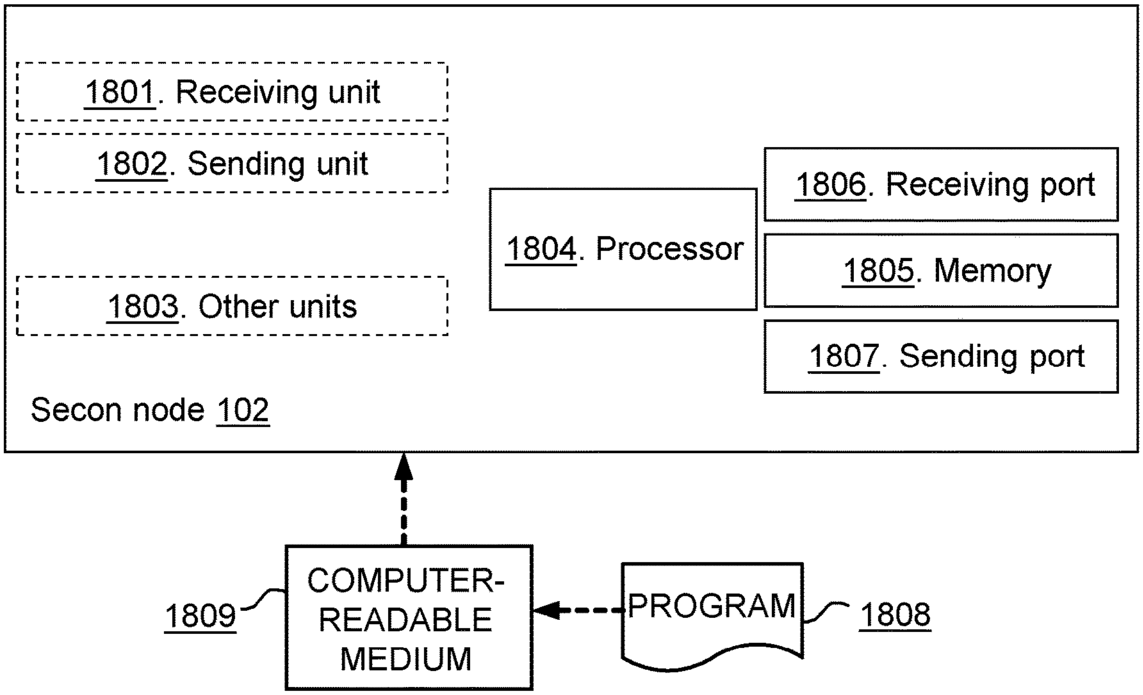
FIG. 18 is a schematic block diagram illustrating two embodiments, in panel a) and panel b), of a second node, according to embodiments herein.
Figure 18:
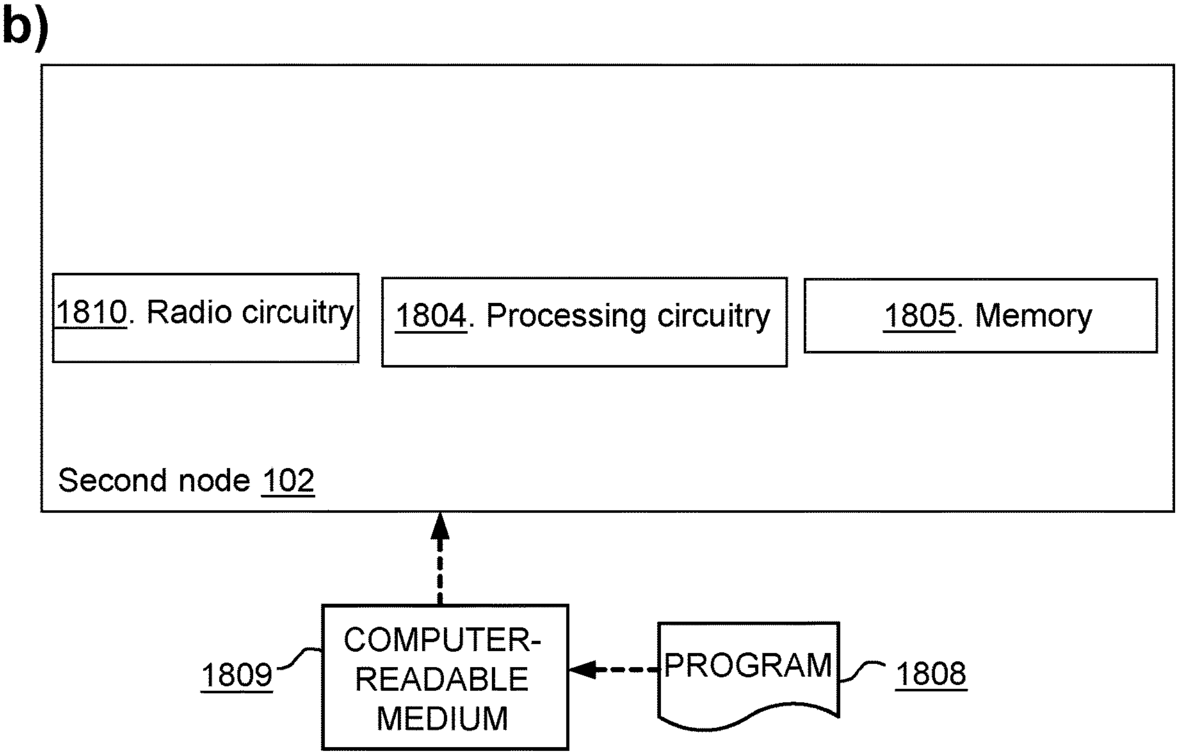

FIG. 18 depicts two different examples in panels a) and b), respectively, of the arrangement that the second node 102 may comprise to perform the method actions described above in relation to FIG. 15. In some embodiments, the second node 102 may comprise the following arrangement depicted in FIG. 18*a*. The second node 102 may be understood to be for handling the one or more indications related to the random access procedure by the first node 101 to the second cell 122, 124, when served by the first cell 121. The second cell 122, 124 is configured to be a secondary cell. The second node 102 and the first node 101 are configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the second node 102, and will thus not be repeated here. For example, in some embodiments, the wireless communications network 100 may support at least one of: NR, LTE, LTE-M, eMTC, and NB-IoT.

In FIG. 18, optional units are indicated with dashed boxes.

The second node 102 is configured to perform the receiving of Action 1501, e.g. by means of a receiving unit 1801 within the second node 102, configured to receive, from the first node 101, the one or more second indications. The one or more second indications are configured to indicate the first identifier of the second cell 122, 124 and the one or more first indications configured to be registered by the first node 101. The one or more first indications are configured to indicate at least one of: i) the second identifier of the first cell 121, ii) the third identifier of the primary secondary cell 123, iii) the fourth identifier of the first network node 111 configured to own the first cell 121, iv) the fifth identifier of the second network node 112 configured to own the primary secondary cell 123, and v) the indicator of the cell group the second cell 122, 124 is configured to belong to.

The second node 102 is configured to perform the sending of Action 1502, e.g. by means of a sending unit 1802 within the second node 102, configured to send to the third node 103, the one or more third indications configured to be based on the one or more second indications configured to be received.

In some embodiments, the one or more first indications may be configured to indicate PCell ID and its associated TAC.

In some embodiments, the one or more first indications may be configured to comprise the indicator of the cell group, and the indicator may be configured to indicate the cell group type the second cell 122 is configured to belong to is a Master Cell Group.

In some embodiments, such as some of the embodiments in the preceding paragraph, the one or more second indications may be configured to indicate the second identifier.

In some embodiments, the one or more first indications may be configured to comprise the indicator of the cell group, and the indicator may be configured to indicate the cell group type the second cell 122 is configured to belong to is a Secondary Cell Group.

In some embodiments, such as some of the embodiments in the preceding paragraph, the one or more second indications may be configured to indicate at least one of the second identifier and the third identifier.

In some embodiments, the one or more first indications may be configured to indicate at least one of: a) at least one of the PCell ID and the PSCell ID, and their associated TACs, b) at least one of the global cell identity of the first cell 121, wherein the first cell 121 is configured to be a primary cell, and the global cell identity of the primary secondary cell 123, and c) at least one of the identity of the first cell 121, wherein the first cell 121 is configured to be the primary cell, and the global cell identity of the primary secondary cell 123, and their associated TACs.

In some embodiments, the one or more first indications may be configured to indicate the Global Node ID of the first cell 121 or the primary secondary cell 122, the cell global Identity and TAC.

In some embodiments, the one or more first indications may be configured to be the one or more second indications.

In some embodiments, the one or more second indications may be configured to be comprised in a report.

In some embodiments, the report may be configured to be a RACH report, and the RACH report may be configured to be comprised in a message.

In some embodiments, the one or more first indications may be configured to indicate at least one of: a) the first identifier, the second identifier and the indicator, and b) the first identifier, and another identifier of the second network node 112 configured to own the second cell 122, 124.

Other units 1803 may be comprised in the second node 102.

The embodiments herein in the second node 102 may be implemented through one or more processors, such as a processor 1804 in the second node 102 depicted in FIG. 18*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second node 102. One such carrier may be in the form of a CD ROM disc. It is however feasible with other data carriers such as a memory stick. The computer program code may furthermore be provided as pure program code on a server and downloaded to the second node 102.

The second node 102 may further comprise a memory 1805 comprising one or more memory units. The memory 1805 is arranged to be used to store obtained information, store data, configurations, schedulings, and applications etc. to perform the methods herein when being executed in the second node 102.

In some embodiments, the second node 102 may receive information from, e.g., the first node 101 and/or the third node 103 through a receiving port 1806. In some embodiments, the receiving port 1806 may be, for example, connected to one or more antennas in second node 102. In other embodiments, the second node 102 may receive information from another structure in the wireless communications network 100 through the receiving port 1806. Since the receiving port 1806 may be in communication with the processor 1804, the receiving port 1806 may then send the received information to the processor 1804. The receiving port 1806 may also be configured to receive other information.

The processor 1804 in the second node 102 may be further configured to transmit or send information to e.g., the first node 101, the third node 103, and/or another structure in the wireless communications network 100, through a sending port 1807, which may be in communication with the processor 1804, and the memory 1805.

Those skilled in the art will also appreciate that the different units 1801-1803 described above may refer to a combination of analog and digital modules, and/or one or more processors configured with software and/or firmware, e.g., stored in memory, that, when executed by the one or more processors such as the processor 1804, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1801-1803 described above may be implemented as one or more applications running on one or more processors such as the processor 1804.

Thus, the methods according to the embodiments described herein for the second node 102 may be respectively implemented by means of a computer program 1808 product, comprising instructions, i.e., software code portions, which, when executed on at least one processor 1804, cause the at least one processor 1804 to carry out the actions described herein, as performed by the second node 102. The computer program 1808 product may be stored on a computer-readable storage medium 1809. The computer-readable storage medium 1809, having stored thereon the computer program 1808, may comprise instructions which, when executed on at least one processor 1804, cause the at least one processor 1804 to carry out the actions described herein, as performed by the second node 102. In some embodiments, the computer-readable storage medium 1809 may be a non-transitory computer-readable storage medium, such as a CD ROM disc, or a memory stick. In other embodiments, the computer program 1808 product may be stored on a carrier containing the computer program 1808 just described, wherein the carrier is one of an electronic signal, optical signal, radio signal, or the computer-readable storage medium 1809, as described above.

The second node 102 may comprise a communication interface configured to facilitate communications between the second node 102 and other nodes or devices, e.g., the first node 101 and/or the third node 103. The interface may, for example, include a transceiver configured to transmit and receive radio signals over an air interface in accordance with a suitable standard.

In other embodiments, the second node 102 may comprise the following arrangement depicted in FIG. 18*b*. The second node 102 may comprise a processing circuitry 1804, e.g., one or more processors such as the processor 1804, in the second node 102 and the memory 1805. The second node 102 may also comprise a radio circuitry 1810, which may comprise e.g., the receiving port 1806 and the sending port 1807. The processing circuitry 1804 may be configured to, or operable to, perform the method actions according to FIG. 15 and/or FIGS. 24-28, in a similar manner as that described in relation to FIG. 18*a*. The radio circuitry 1810 may be configured to set up and maintain at least a wireless connection with the first node 101 and/or the third node 103. Circuitry may be understood herein as a hardware component.

Figure 15:
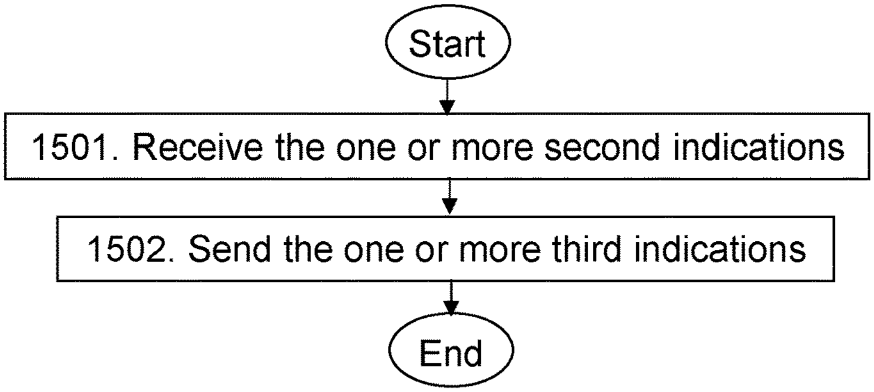
FIG. 15 is a flowchart depicting a method in a second node, according to embodiments herein.

Hence, embodiments herein also relate to the second node 102 comprising the processing circuitry 1804 and the memory 1805, said memory 1805 containing instructions executable by said processing circuitry 1804, whereby the second node 102 is operative to perform the actions described herein in relation to the second node 102, e.g., in FIG. 15, and/or FIGS. 24-28.

Figure 19:
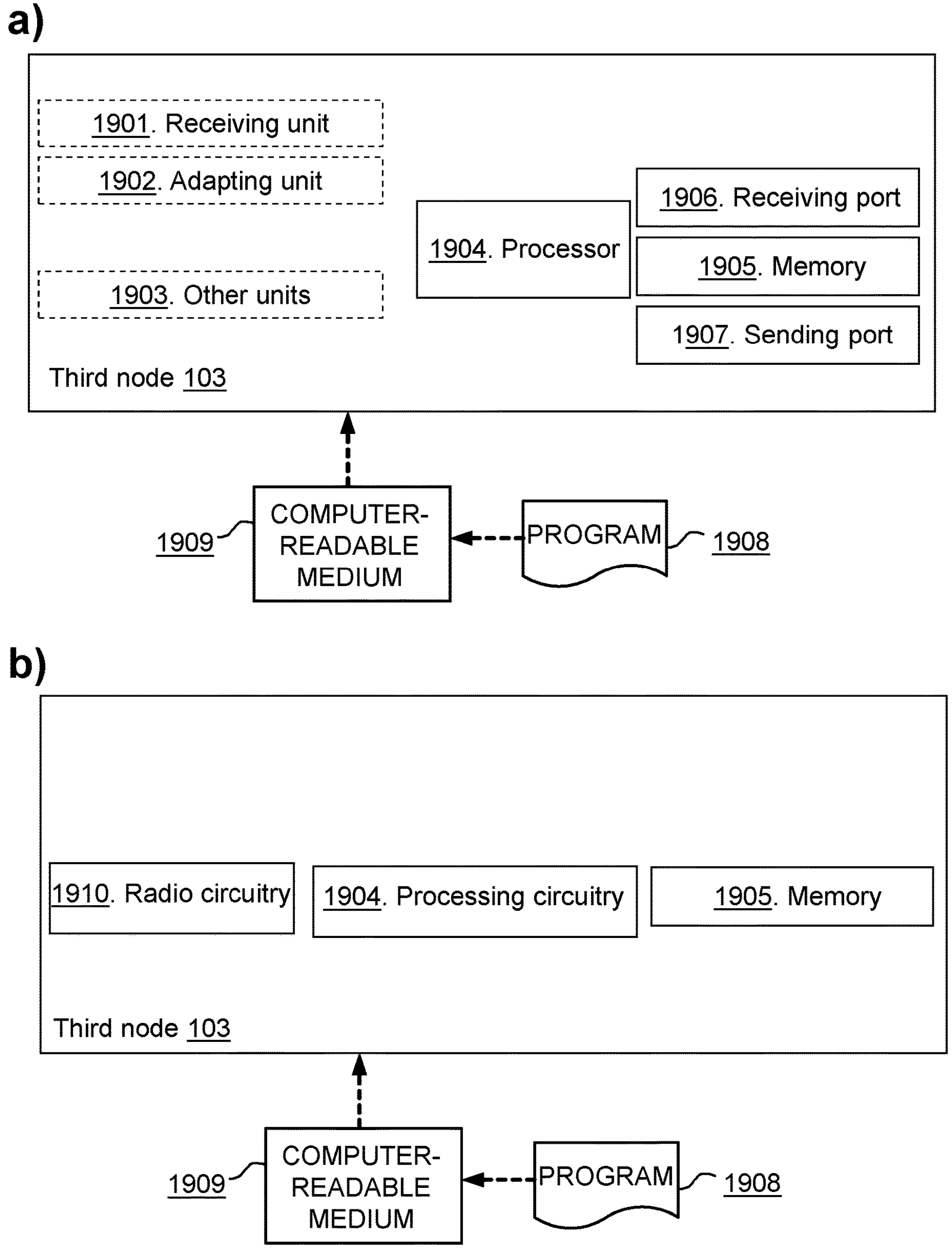
FIG. 19 is a schematic block diagram illustrating two embodiments, in panel a) and panel b), of a third node, according to embodiments herein.

FIG. 19 depicts two different examples in panels a) and b), respectively, of the arrangement that the third node 103, e.g., any of the first network node 111 and the second network node 112, may comprise to perform the method actions described above in relation to FIG. 16. In some embodiments, the third node 103 may comprise the following arrangement depicted in FIG. 19*a*. The third node 103 may be understood to be for handling the one or more indications related to the random access procedure by the first node 101 to the second cell 122, 124, when served by the first cell 121. The second cell 122, 124 is configured to be a secondary cell. The third node 103 is configured to serve or have served the first node 101 in a configuration supporting simultaneous connectivity to more than one cell. The third node 103 and the first node 101 are configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the third node 103, and will thus not be repeated here. For example, in some embodiments, the wireless communications network 100 may support at least one of: NR, LTE, LTE-M, eMTC, and NB-IoT.

In FIG. 19, optional units are indicated with dashed boxes.

The third node 103 is configured to perform the receiving of Action 1601, e.g. by means of a receiving unit 1901 within the third node 103, configured to receive, from the second node 102, one or more third indications. The one or more third indications are configured to indicate the first identifier of the second cell 122, 124 and one or more first indications configured to be registered by the first node 101. The one or more first indications are configured to indicate at least one of: i) the second identifier of the first cell 121, ii) the third identifier of the primary secondary cell 123, iii) the fourth identifier of the first network node 111 configured to own the first cell 121, iv) the fifth identifier of the second network node 112 configured to own the primary secondary cell 123, and v) the indicator of the cell group the second cell 122, 124 is configured to belong to.

The third node 103 is configured to perform the adapting of Action 1602, e.g. by means of an adapting unit 1602 within the third node 103, configured to adapt the configuration of one or more cells configured to be controlled by the third node 103 based on the one or more third indications configured to be received.

In some embodiments, the one or more first indications may be configured to indicate PCell ID and its associated TAC.

In some embodiments, the one or more first indications may be configured to comprise the indicator of the cell group, and the indicator may be configured to indicate the cell group type the second cell 122 is configured to belong to is a Master Cell Group.

In some embodiments, such as some of the embodiments in the preceding paragraph, the one or more first indications may be configured to indicate the second identifier.

In some embodiments, the one or more first indications may be configured to comprise the indicator of the cell group, and the indicator may be configured to indicate the cell group type the second cell 122 is configured to belong to is a Secondary Cell Group.

In some embodiments, such as some of the embodiments in the preceding paragraph, the one or more first indications may be configured to indicate at least one of the second identifier and the third identifier.

In some embodiments, the one or more first indications may be configured to indicate at least one of: a) at least one of the PCell ID and the PSCell ID, and their associated TACs, b) at least one of the global cell identity of the first cell 121, wherein the first cell 121 is configured to be a primary cell, and the global cell identity of the primary secondary cell 123, and c) at least one of the identity of the first cell 121, wherein the first cell 121 is configured to be the primary cell, and the global cell identity of the primary secondary cell 123, and their associated TACs.

In some embodiments, the one or more first indications may be configured to indicate the Global Node ID of the first cell 121 or the primary secondary cell 122, the cell global Identity and TAC.

In some embodiments, the one or more first indications may be configured to be configured to be the one or more third indications.

In some embodiments, the one or more third indications may be configured to be comprised in a report.

In some embodiments, the report may be configured to be a RACH report, and the RACH report may be configured to be comprised in a message.

In some embodiments, the one or more first indications may be configured to indicate at least one of: a) the first identifier, the second identifier and the indicator, and b) the first identifier, and another identifier of the second network node 112 configured to own the second cell 122, 124.

Other units 1903 may be comprised in the third node 103.

The embodiments herein in the third node 103 may be implemented through one or more processors, such as a processor 1904 in the third node 103 depicted in FIG. 19*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the third node 103. One such carrier may be in the form of a CD ROM disc. It is however feasible with other data carriers such as a memory stick. The computer program code may furthermore be provided as pure program code on a server and downloaded to the third node 103.

The third node 103 may further comprise a memory 1905 comprising one or more memory units. The memory 1905 is arranged to be used to store obtained information, store data, configurations, schedulings, and applications etc. to perform the methods herein when being executed in the third node 103.

In some embodiments, the third node 103 may receive information from, e.g., the first node 101 and/or the second node 102 through a receiving port 1906. In some embodiments, the receiving port 1906 may be, for example, connected to one or more antennas in third node 103. In other embodiments, the third node 103 may receive information from another structure in the wireless communications network 100 through the receiving port 1906. Since the receiving port 1906 may be in communication with the processor 1904, the receiving port 1906 may then send the received information to the processor 1904. The receiving port 1906 may also be configured to receive other information.

The processor 1904 in the third node 103 may be further configured to transmit or send information to e.g., the first node 101, the second node 102, and/or another structure in the wireless communications network 100, through a sending port 1907, which may be in communication with the processor 1904, and the memory 1905.

Those skilled in the art will also appreciate that the different units 1901-1903 described above may refer to a combination of analog and digital modules, and/or one or more processors configured with software and/or firmware, e.g., stored in memory, that, when executed by the one or more processors such as the processor 1904, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1901-1903 described above may be implemented as one or more applications running on one or more processors such as the processor 1904.

Thus, the methods according to the embodiments described herein for the third node 103 may be respectively implemented by means of a computer program 1908 product, comprising instructions, i.e., software code portions, which, when executed on at least one processor 1904, cause the at least one processor 1904 to carry out the actions described herein, as performed by the third node 103. The computer program 1908 product may be stored on a computer-readable storage medium 1909. The computer-readable storage medium 1909, having stored thereon the computer program 1908, may comprise instructions which, when executed on at least one processor 1904, cause the at least one processor 1904 to carry out the actions described herein, as performed by the third node 103. In some embodiments, the computer-readable storage medium 1909 may be a non-transitory computer-readable storage medium, such as a CD ROM disc, or a memory stick. In other embodiments, the computer program 1908 product may be stored on a carrier containing the computer program 1908 just described, wherein the carrier is one of an electronic signal, optical signal, radio signal, or the computer-readable storage medium 1909, as described above.

The third node 103 may comprise a communication interface configured to facilitate communications between the third node 103 and other nodes or devices, e.g., the first node 101 and/or the second node 102. The interface may, for example, include a transceiver configured to transmit and receive radio signals over an air interface in accordance with a suitable standard.

In other embodiments, the third node 103 may comprise the following arrangement depicted in FIG. 19*b*. The third node 103 may comprise a processing circuitry 1904, e.g., one or more processors such as the processor 1904, in the third node 103 and the memory 1905. The third node 103 may also comprise a radio circuitry 1910, which may comprise e.g., the receiving port 1906 and the sending port 1907. The processing circuitry 1904 may be configured to, or operable to, perform the method actions according to FIG. 16 and/or FIGS. 24-28, in a similar manner as that described in relation to FIG. 19*a*. The radio circuitry 1910 may be configured to set up and maintain at least a wireless connection with the first node 101 and/or the second node 102. Circuitry may be understood herein as a hardware component.

Figure 16:
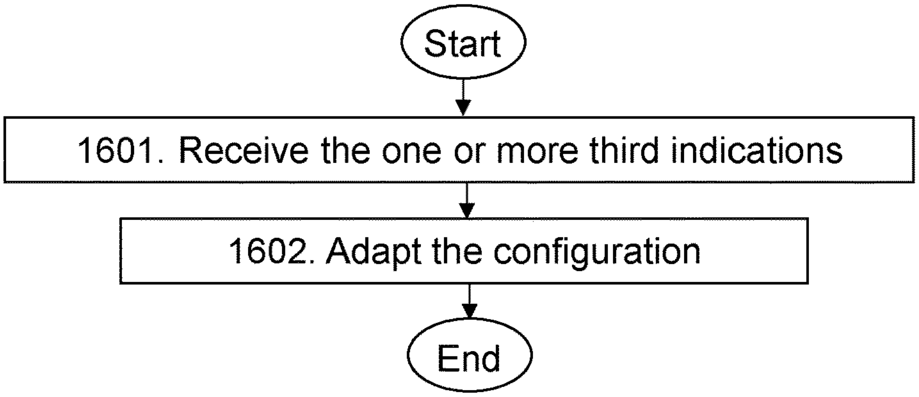
FIG. 16 is a flowchart depicting a method in a third node, according to embodiments herein.

Hence, embodiments herein also relate to the third node 103 comprising the processing circuitry 1904 and the memory 1905, said memory 1905 containing instructions executable by said processing circuitry 1904, whereby the third node 103 is operative to perform the actions described herein in relation to the third node 103, e.g., in FIG. 16, and/or FIGS. 24-28.

Embodiments herein may be related to 5G; NR; RRC; MAC; Self Optimized Network (SON); RACH optimization; and/or beam selection.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Examples related to, embodiments herein:

More specifically, the following are: a) embodiments related to a first node, which may be also referred to as a wireless terminal, user equipment or wireless device, such as the wireless device 130, e.g., a 5G UE; b) embodiments related to a second node, which may also be referred to as a network node, such as the third network node 113; and c) embodiments related to a third node, which may also be referred to as another network node, such as the first network node 111 and/or the second network node 112. The second node 102 may be different than the third node 103.

The first node 101 embodiments relate to FIG. 13, FIG. 14, FIG. 17, FIG. 20 and FIGS. 23-28.

Figure 20:
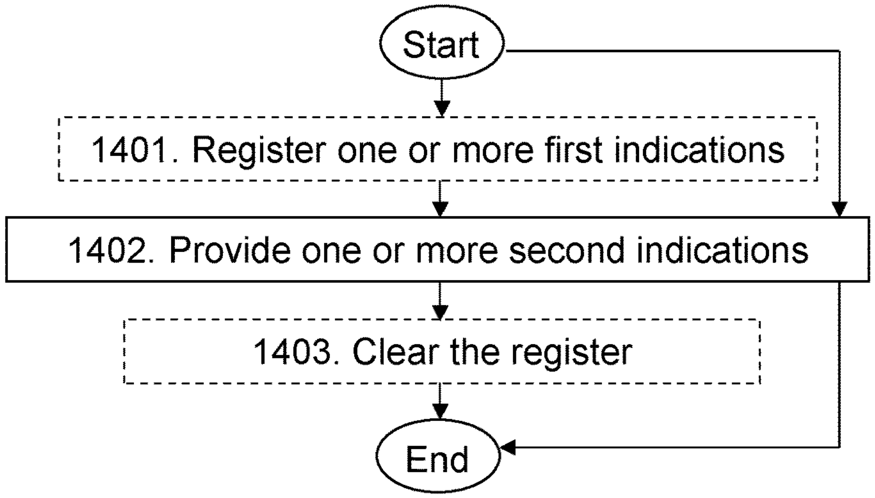
FIG. 20 is a flowchart depicting a method in a first node, according to examples related to embodiments herein.

A method, performed by a first node, such as the first node 101, e.g., a wireless device 130, wireless terminal or user equipment, is described herein in relation to FIG. 20. The first node 101 may support simultaneous connectivity to more than one cell. The method may be understood to be for providing one or more indications related to a random access procedure, e.g., a RACH procedure, by the first node 101 to a second cell 122, 124, e.g., a secondary cell, for example, the random access procedure being performed when served by a first cell 121, e.g., primary cell, or cell serving/having served the first node 101 during the random access procedure. The first node 101 may be operating in a wireless communications network, such as the wireless communications network 100.

The method may comprise one or more of the following actions.

Several embodiments are comprised herein. In some embodiments all the actions may be performed. In some embodiments, one or more actions may be performed. It should be noted that the examples herein may be not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the first node 101 is depicted in FIG. 14. FIG. 14, optional actions are represented with dashed lines.

Registering 1401 in a register one or more first indications. The first node 101 may be configured to perform this obtaining action 1401, e.g. by means of a registering unit 1701 within the first node 101, configured to perform this action.

Registering in a register in this Action 1401 may be understood as, e.g., creating a register or log comprising, or adding to a register or log.

The one or more first indications may indicate at least one of:

i. a first identifier of the second cell 122, 124, e.g., PCI, ARFCN
ii. a second identifier e.g., CGI and TAC of the first cell 121,
iii. a third identifier e.g., CGI and TAC of a primary secondary cell 123 e.g., Primary SCG cell of PSCell,
iv. a fourth identifier e.g., Global Node ID of a first network node 111 owning the first cell 121,
v. a fifth identifier e.g., Global Node ID of a second network node 112 owning the primary secondary cell 123, and
vi. an indicator of a cell group, e.g., cell group type e.g., MSC, SCG, the second cell 122, 124 belongs to.

Providing 1402 one or more second indications. The first node 101 may be configured to perform this providing action 1402, e.g. by means of a providing unit 1702 within the first node 101, configured to perform this action.

The first node 101 may provide the one or more indications to at least one of: the first node 101, and the second node 102, such as a third network node 113. The second node 102 may be different than the first network node 111 and the second network node 112. The one or more second indications may be provided, e.g., comprised in a report, such as a RACH report.

The one or more second indications may be based on, e.g., comprising, indicating, the registered one or more first indications Providing may be understood as sending, or outputting.

In some examples, at least one of:

a. the random access procedure may be one of: a two step procedure and a four step procedure, and
b. the registering 1401 may be performed upon performing the random access procedure to the second cell 122, 124.

In some examples, the one or more first indications may indicate PCell ID and its associated Tracking Area Code.

In some examples, the cell group type the second cell 122 belongs to may be a Master Cell Group.

In some examples, the one or more second indications may indicate the second identifier.

In some examples, the cell group type the second cell 122 belongs to may be a Secondary Cell Group.

In some examples, the one or more second indications may indicate the second identifier and/or the third identifier.

In some examples, the one or more first indications may indicate PCell ID and/or PSCell ID and their associated Tracking area codes.

In some examples, the one or more first indications may indicate the Global Node ID of the first cell 121 or the primary secondary cell 122 e.g., Primary SCG cell of PSCell, the cell global Identity and tracking area code.

In some examples, the one or more first indications may be the one or more second indications.

In some examples, the one or more second indications may be comprised in a report e.g., a RACH report list.

In some examples, the RACH report may be comprised in a message e.g., a UEInformationResponse.

The random access procedure may be performed at a first time period. The one or more first indications may enable to identify the second cell 122, 124 at a second time period, e.g., a different time period than the first time period At the second time period, the first node 101 may be served by a network node, e.g., the second node 102, other than that controlling the second cell 122.

The random access procedure may enable to identify the second cell 122, 124 by a network node, e.g., the second node 102, serving the first node 101 other than that controlling the second cell 122, e.g., during the second time period.

In some embodiments, the method may further comprise one or more of the following actions:

Clearing 1403 the register. The first node 101 may be configured to perform this clearing action 1403, e.g. by means of a clearing unit 1703 within the first node 101, configured to perform this action.

In some embodiments, the wireless communications network 100 may support at least one of: New Radio (NR), Long Term Evolution (LTE), LTE for Machines (LTE-M), enhanced Machine Type Communication (eMTC), and Narrow Band Internet of Things (NB-IoT).

Other units 1705 may be comprised in the first node 101.

The first node 101 may also be configured to communicate user data with a host application unit in a host computer 2410, e.g., via another link such as 2460.

In FIG. 17, optional units are indicated with dashed boxes.

The first node 101 may comprise an interface unit to facilitate communications between the first node 101 and other nodes or devices, e.g., the second node 102, the third node 103, the host computer 2410, or any of the other nodes. In some particular examples, the interface may, for example, include a transceiver configured to transmit and receive radio signals over an air interface in accordance with a suitable standard.

Figure 24:
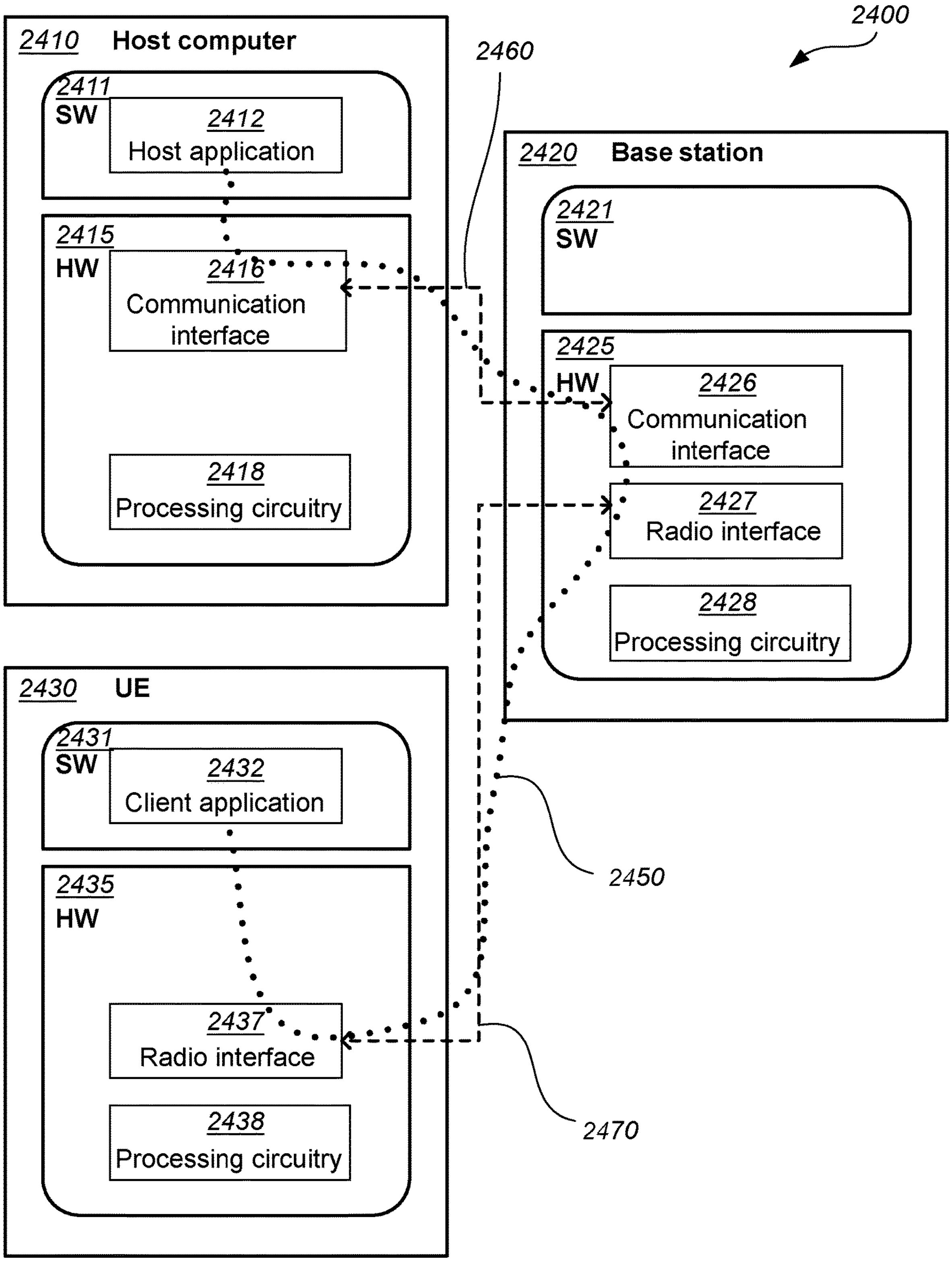
FIG. 24 is a generalized block diagram of a host computer communicating via a base station with a user equipment over a partially wireless connection, according to embodiments herein.

The first node 101 may comprise an arrangement as shown in FIG. 17 or in FIG. 24.

The second node 102 embodiments relate to FIG. 13, FIG. 15, FIG. 18, FIG. 21 and FIGS. 23-28.

Figure 21:
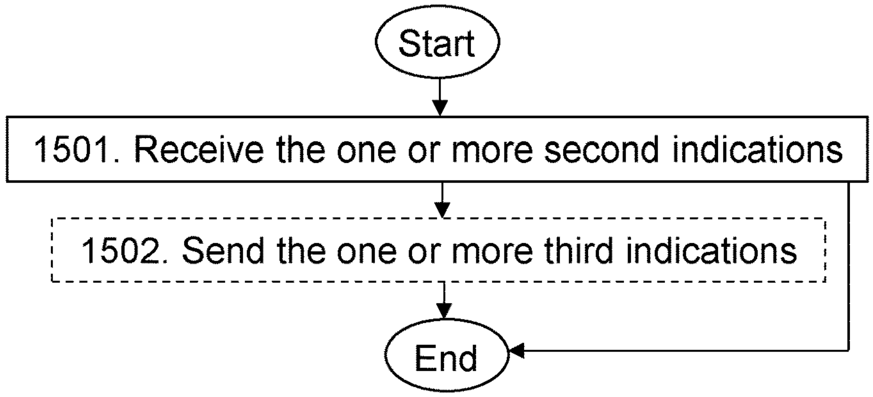
FIG. 21 is a flowchart depicting a method in a second node, according to examples related to embodiments herein.

A method, performed by a second node, such as the second node 102, e.g., the third network node 113, is described herein in relation to FIG. 21. The method may be understood to be for handling a one or more indications related to a random access procedure, e.g., RACH procedure, by a first node 101 to a second cell 122, 124 e.g., secondary cell, e.g., when served by a first cell 121 e.g., primary cell, or cell serving/having served the first node 101 during the random access procedure. The second node 102 may serve the first node 101 in a configuration supporting simultaneous connectivity to more than one cell. The second node 102 and the first node 101 may be operating in a wireless communications network, such as the wireless communications network 100.

The method may comprise one or more of the following actions.

Several embodiments are comprised herein. In some embodiments all the actions may be performed. In some embodiments, one or more actions may be performed. It should be noted that the examples herein may be not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the second node 102 is depicted in FIG. 15. In FIG. 15, optional actions are represented with dashed lines.

Receiving 1501 one or more second indications. The second node 102 may be configured to perform this receiving action 1501, e.g. by means of a receiving unit 1801 within the second node 102, configured to perform this action.

The second node 102 may receive the one or more second indications from the first node 101.

The one or more second indications may indicate one or more first indications registered by the first node 101. The one or more first indications may indicate at least one of:

i. a first identifier of the second cell 122, 124, e.g., PCI, ARFCN
ii. a second identifier e.g., CGI and TAC of the first cell 121,
iii. a third identifier e.g., CGI and TAC of a primary secondary cell 123 e.g., Primary SCG cell of PSCell,
iv. a fourth identifier e.g., Global Node ID of a first network node 111 owning the first cell 121,
v. a fifth identifier e.g., Global Node ID of a second network node 112 owning the primary secondary cell 123, and
vi. an indicator of a cell group, e.g., cell group type e.g., MSC, SCG, the second cell 122, 124 belongs to.

In some embodiments, the method may further comprise the following action:

Sending 1502 one or more third indications. The second node 102 may be configured to perform this sending action 1502, e.g. by means of a sending unit 1802 within the second node 102, configured to perform this action.

The sending in this Action 1502 may be to the third node 103, e.g., at least one of: the first cell 121, the primary secondary cell 123, the first network node 111 and the second network node 112.

The one or more third indications may be based on the received one or more second indications.

The one or more second indications may be based on, e.g., comprising, indicating, the registered one or more first indications Sending may be understood as e.g., forwarding, transmitting.

In some examples, at least one of:

a. the random access procedure may be one of: a two step procedure and a four step procedure, and
b. the registering 1401 may be performed upon performing the random access procedure to the second cell 122, 124.

In some examples, the one or more first indications may indicate PCell ID and its associated Tracking Area Code.

In some examples, the cell group type the second cell 122 belongs to may be a Master Cell Group.

In some examples, the one or more second indications may indicate the second identifier.

In some examples, the cell group type the second cell 122 belongs to may be a Secondary Cell Group.

In some examples, the one or more second indications may indicate the second identifier and/or the third identifier.

In some examples, the one or more first indications may indicate PCell ID and/or PSCell ID and their associated Tracking area codes.

In some examples, the one or more first indications may indicate the Global Node ID of the first cell 121 or the primary secondary cell 122 e.g., Primary SCG cell of PSCell, the cell global Identity and tracking area code.

In some examples, the one or more first indications may be the one or more second indications.

In some examples, the one or more second indications may be comprised in a report e.g., a RACH report list.

In some examples, the RACH report may be comprised in a message e.g., a UEInformationResponse.

In some embodiments, the wireless communications network 100 may support at least one of: New Radio (NR), Long Term Evolution (LTE), LTE for Machines (LTE-M), enhanced Machine Type Communication (eMTC), and Narrow Band Internet of Things (NB-IoT).

Other units 1803 may be comprised in the second node 102.

The second node 102 may also be configured to communicate user data with a host application unit in a host computer 2410, e.g., via another link such as 2460.

In FIG. 18, optional units are indicated with dashed boxes.

The second node 102 may comprise an interface unit to facilitate communications between the second node 102 and other nodes or devices, e.g., the first node 101, the third node 103, the host computer 2410, or any of the other nodes. In some particular examples, the interface may, for example, include a transceiver configured to transmit and receive radio signals over an air interface in accordance with a suitable standard.

The second node 102 may comprise an arrangement as shown in FIG. 18 or in FIG. 24.

The third node 103 embodiments relate to FIG. 13, FIG. 16, FIG. 19, FIG. 22 and FIGS. 23-28.

Figure 22:
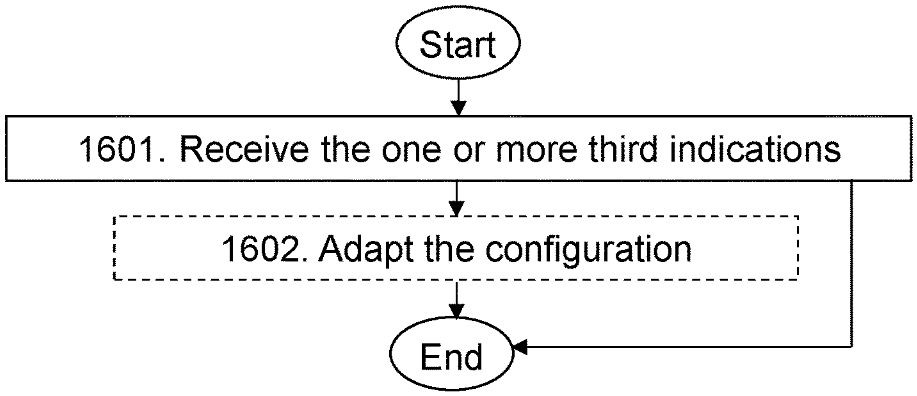
FIG. 22 is a flowchart depicting a method in a third node, according to examples related to embodiments herein.

A method, performed by a third node, such as the third node 103, e.g., the first network node 111 or the second network node 112, is described herein in relation to FIG. 22. The method may be understood to be for handling one or more indications related to a random access procedure, e.g., RACH procedure, by a first node 101 to a second cell 122, 124 e.g., secondary cell, e.g., when served by a first cell 121 e.g., primary cell, or cell serving/having served the first node 101 during the random access procedure. The third node 103 may serve, or have served, the first node 101 in a configuration supporting simultaneous connectivity to more than one cell. The third node 103 and the first node 101 may be operating in a wireless communications network, such as the wireless communications network 100.

The method may comprise one or more of the following actions.

Several embodiments are comprised herein. In some embodiments all the actions may be performed. In some embodiments, one or more actions may be performed. It should be noted that the examples herein may be not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the third node 103 is depicted in FIG. 16. In FIG. 16, optional actions are represented with dashed lines.

Receiving 1601 one or more third indications. The third node 103 may be configured to perform this receiving action 1601, e.g. by means of a receiving unit 1901 within the third node 103, configured to perform this action.

The third node 103 may receive the one or more third indications from the second node 102.

The one or more third indications may indicate one or more first indications registered by the first node 101. The one or more first indications may indicate at least one of:

vii. a first identifier of the second cell 122, 124, e.g., PCI, ARFCN viii. a second identifier e.g., CGI and TAC of the first cell 121, ix. a third identifier e.g., CGI and TAC of a primary secondary cell 123 e.g., Primary SCG cell of PSCell, x. a fourth identifier e.g., Global Node ID of a first network node 111 owning the first cell 121, xi. a fifth identifier e.g., Global Node ID of a second network node 112 owning the primary secondary cell 123, and xii. an indicator of a cell group, e.g., cell group type e.g., MSC, SCG, the second cell 122, 124 belongs to.

In some embodiments, the method may further comprise the following action:

Adapting 1602 a configuration. The third node 103 may be configured to perform this adapting action 1602, e.g. by means of an adapting unit 1602 within the third node 103, configured to perform this action.

The configuration may be of one or more cells controlled by the third node 103.

The adapting in this Action 1602 may be based on the received one or more third configurations.

The third node 103 may control, e.g., at least one of: the first cell 121, the primary secondary cell 123, the first network node 111 and the second network node 112.

The one or more third indications may be based on one or more second indications.

The one or more second indications may be based on, e.g., comprising, indicating, the registered one or more first indications In some examples, the one or more first indications may indicate PCell ID and its associated Tracking Area Code.

In some examples, the cell group type the second cell 122 belongs to may be a Master Cell Group.

In some examples, the one or more second indications may indicate the second identifier.

In some examples, the cell group type the second cell 122 belongs to may be a Secondary Cell Group.

In some examples, the one or more second indications may indicate the second identifier and/or the third identifier.

In some examples, the one or more first indications may indicate PCell ID and/or PSCell ID and their associated Tracking area codes.

In some examples, the one or more first indications may indicate the Global Node ID of the first cell 121 or the primary secondary cell 122 e.g., Primary SCG cell of PSCell, the cell global Identity and tracking area code.

In some examples, the one or more first indications may be the one or more second indications.

In some examples, the one or more second indications may be comprised in a report e.g., a RACH report list.

In some examples, the RACH report may be comprised in a message e.g., a UEInformationResponse.

In some embodiments, the wireless communications network 100 may support at least one of: New Radio (NR), Long Term Evolution (LTE), LTE for Machines (LTE-M), enhanced Machine Type Communication (eMTC), and Narrow Band Internet of Things (NB-IoT).

Other units 1803 may be comprised in the third node 103.

The third node 103 may also be configured to communicate user data with a host application unit in a host computer 2410, e.g., via another link such as 2460.

In FIG. 19, optional units are indicated with dashed boxes.

The third node 103 may comprise an interface unit to facilitate communications between the third node 103 and other nodes or devices, e.g., the first node 101, the second node 102, the host computer 2410, or any of the other nodes. In some particular examples, the interface may, for example, include a transceiver configured to transmit and receive radio signals over an air interface in accordance with a suitable standard.

The third node 103 may comprise an arrangement as shown in FIG. 19 or in FIG. 24.

Selected Examples Related to Embodiments Herein

Example 1. A method, performed by a first node (101) (e.g., a wireless device (130), wireless terminal or user equipment), the first node (101) supporting simultaneous connectivity to more than one cell, the method being for providing one or more indications related to a random access procedure (e.g., RACH) procedure by the first node (101) to a second cell (122, 124) (e.g., secondary cell), e.g., when served by a first cell (121) (e.g., primary cell, or cell serving/having served the first node (101) during the random access procedure), the first node (101) operating in a wireless communications network (100), the method comprising:

registering (1401) in a register (that is, creating a register or log comprising/adding to a register or log) one or more first indications, the one or more first indications indicating at least one of:

i. a first identifier of the second cell (122, 124), (e.g., PCI, ARFCN)

ii. a second identifier (e.g., CGI and TAC) of the first cell (121), iii. a third identifier (e.g., CGI and TAC) of a primary secondary cell (123) (e.g., Primary SCG cell of PSCell), iv. a fourth identifier (e.g., Global Node ID) of a first network node (111) owning the first cell (121), v. a fifth identifier (e.g., Global Node ID) of a second network node (112) owning the primary secondary cell (123), vi. an indicator of a cell group, e.g., cell group type (e.g., MSC, SCG), the second cell (122, 124) belongs to, and providing (1402) to at least one of: the first node (101), a second node (102), (such as a third network node (113), e.g., being different than the first network node (111) and the second network node (112)), one or more second indications (e.g., a report, such as a RACH report) based on (e.g., comprising, indicating) the registered one or more first indications.

Example 2. The method according to example 1, wherein at least one of:

a. the random access procedure is one of: a two step procedure and a four step procedure, and b. the registering (1401) is performed upon performing the random access procedure to the second cell (122, 124).

Example 3. The method according to any of examples 1-2, wherein the one or more first indications indicate PCell ID and its associated Tracking Area Code.

Example 4. The method according to any of examples 1-3, wherein the cell group type the second cell (122) belongs to is a Master Cell Group.

Example 5. The method according to example 4, wherein the one or more second indications indicate the second identifier.

Example 6. The method according to any of examples 1-3, wherein the cell group type the second cell (122) belongs to is a Secondary Cell Group.

Example 7. The method according to example 6, wherein the one or more second indications indicate the second identifier and/or the third identifier.

Example 8. The method according to any of examples 1-7, wherein the one or more first indications indicate PCell ID and/or PSCell ID and their associated Tracking area codes.

Example 9. The method according to any of examples 1-8, wherein the one or more first indications indicate the Global Node ID of the first cell (121) or the primary secondary cell (122) (e.g., Primary SCG cell of PSCell), the cell global Identity and tracking area code.

Example 10. The method according to any of examples 1-9, wherein the one or more first indications are the one or more second indications.

Example 11. The method according to any of examples 1-10, wherein the one or more second indications are comprised in a report (e.g., a RACH report list).

Example 12. The method according to example 11, wherein the RACH report is comprised in a message (e.g., a UEInformationResponse).

Example 13. The method according to any of examples 1-12, further comprising:

clearing (1403) the register.

Example 14. A method, performed by a second node (102) (e.g., the third network node (113), for handling a one or more indications related to a random access (e.g., RACH) procedure by a first node (101) to a second cell (122, 124) (e.g., secondary cell), e.g., when served by a first cell (121) (e.g., primary cell, or cell serving/having served the first node (101) during the random access procedure), wherein the second node (102) serves the first node (101) in a configuration supporting simultaneous connectivity to more than one cell, the second node (102) and the first node (101) operating in a wireless communications network (100), the method comprising:

receiving (1501), from the first node (101), one or more second indications, the one or more second indications indicating one or more first indications registered by the first node (101), the one or more first indications indicating at least one of:

i. a first identifier of the second cell (122, 124), (e.g., PCI, ARFCN)

ii. a second identifier (e.g., CGI and TAC) of the first cell (121), iii. a third identifier (e.g., CGI and TAC) of a primary secondary cell (123) (e.g., Primary SCG cell of PSCell), iv. a fourth identifier (e.g., Global Node ID) of a first network node (111) owning the first cell (121), v. a fifth identifier (e.g., Global Node ID) of a second network node (112) owning the primary secondary cell (123), vi. an indicator of a cell group, e.g., cell group type (e.g., MSC, SCG), the second cell (122, 124) belongs to, and i.

sending (1502) to third node (103), e.g., at least one of: the first cell (121), the primary secondary cell (123), the first network node (111) and the second network node (112), one or more third indications based on the received one or more second indications.

Example 15. The method according to example 14, wherein the one or more first indications indicate PCell ID and its associated Tracking Area Code.

Example 16. The method according to any of examples 14-15, wherein the cell group type the second cell (122) belongs to is a Master Cell Group.

Example 17. The method according to example 16, wherein the one or more second indications indicate the second identifier.

Example 18. The method according to any of examples 14-15, wherein the cell group type the second cell (122) belongs to is a Secondary Cell Group.

Example 19. The method according to example 8, wherein the one or more second indications indicate the second identifier and/or the third identifier.

Example 20. The method according to any of examples 14-19, wherein the one or more first indications indicate PCell ID and/or PSCell ID and their associated Tracking area codes.

Example 21. The method according to any of examples 14-20, wherein the one or more first indications indicate the Global Node ID of the first cell (121) or the primary secondary cell (122) (e.g., Primary SCG cell of PSCell), the cell global Identity and tracking area code.

Example 22. The method according to any of examples 14-21, wherein the one or more first indications are the one or more second indications.

Example 23. The method according to any of examples 14-22, wherein the one or more second indications are comprised in a report (e.g., a RACH report list).

Example 24. The method according to example 23, wherein the RACH report is comprised in a message (e.g., a UEInformationResponse).

Example 25. A method, performed by a third node (103) (e.g., the first network node (111) or the second network node (112), for handling one or more indications related to a random access (e.g., RACH) procedure by a first node (101) to a second cell (122, 124) (e.g., secondary cell), e.g., when served by a first cell (121) (e.g., primary cell, or cell serving/having served the first node (101) during the random access procedure), wherein the third node (103) serves or has served the first node (101) in a configuration supporting simultaneous connectivity to more than one cell, the third node (103) and the first node (101) operating in a wireless communications network (100), the method comprising:

receiving (1601), from a second node (102), one or more third indications, the one or more third indications indicating one or more first indications registered by the first node (101), the one or more first indications indicating at least one of:

i. a first identifier of the second cell (122, 124), (e.g., PCI, ARFCN)

ii. a second identifier (e.g., CGI and TAC) of the first cell (121), iii. a third identifier (e.g., CGI and TAC) of a primary secondary cell (123) (e.g., Primary SCG cell of PSCell), iv. a fourth identifier (e.g., Global Node ID) of a first network node (111) owning the first cell (121), v. a fifth identifier (e.g., Global Node ID) of a second network node (112) owning the primary secondary cell (123), vi. an indicator of a cell group, e.g., cell group type (e.g., MSC, SCG), the second cell (122, 124) belongs to, and adapting (1602) a configuration of one or more cells controlled by the third node (103) based on the received one or more third configurations.

Example 26. The method according to example 25, wherein the one or more first indications indicate PCell ID and its associated Tracking Area Code.

Example 27. The method according to any of examples 25-26, wherein the cell group type the second cell (122) belongs to is a Master Cell Group.

Example 28. The method according to example 27, wherein the one or more second indications indicate the second identifier.

Example 29. The method according to any of examples 25-26, wherein the cell group type the second cell (122) belongs to is a Secondary Cell Group.

Example 30. The method according to example 29, wherein the one or more second indications indicate the second identifier and/or the third identifier.

Example 31. The method according to any of examples 25-30, wherein the one or more first indications indicate PCell ID and/or PSCell ID and their associated Tracking area codes.

Example 32. The method according to any of examples 25-31, wherein the one or more first indications indicate the Global Node ID of the first cell (121) or the primary secondary cell (122) (e.g., Primary SCG cell of PSCell), the cell global Identity and tracking area code.

Example 33. The method according to any of examples 25-32, wherein the one or more first indications are the one or more second indications.

Example 34. The method according to any of examples 25-33, wherein the one or more second indications are comprised in a report (e.g., a RACH report list).

Example 35. The method according to example 34, wherein the RACH report is comprised in a message (e.g., a UEInformationResponse).

Further Extensions And Variations

Figure 23:
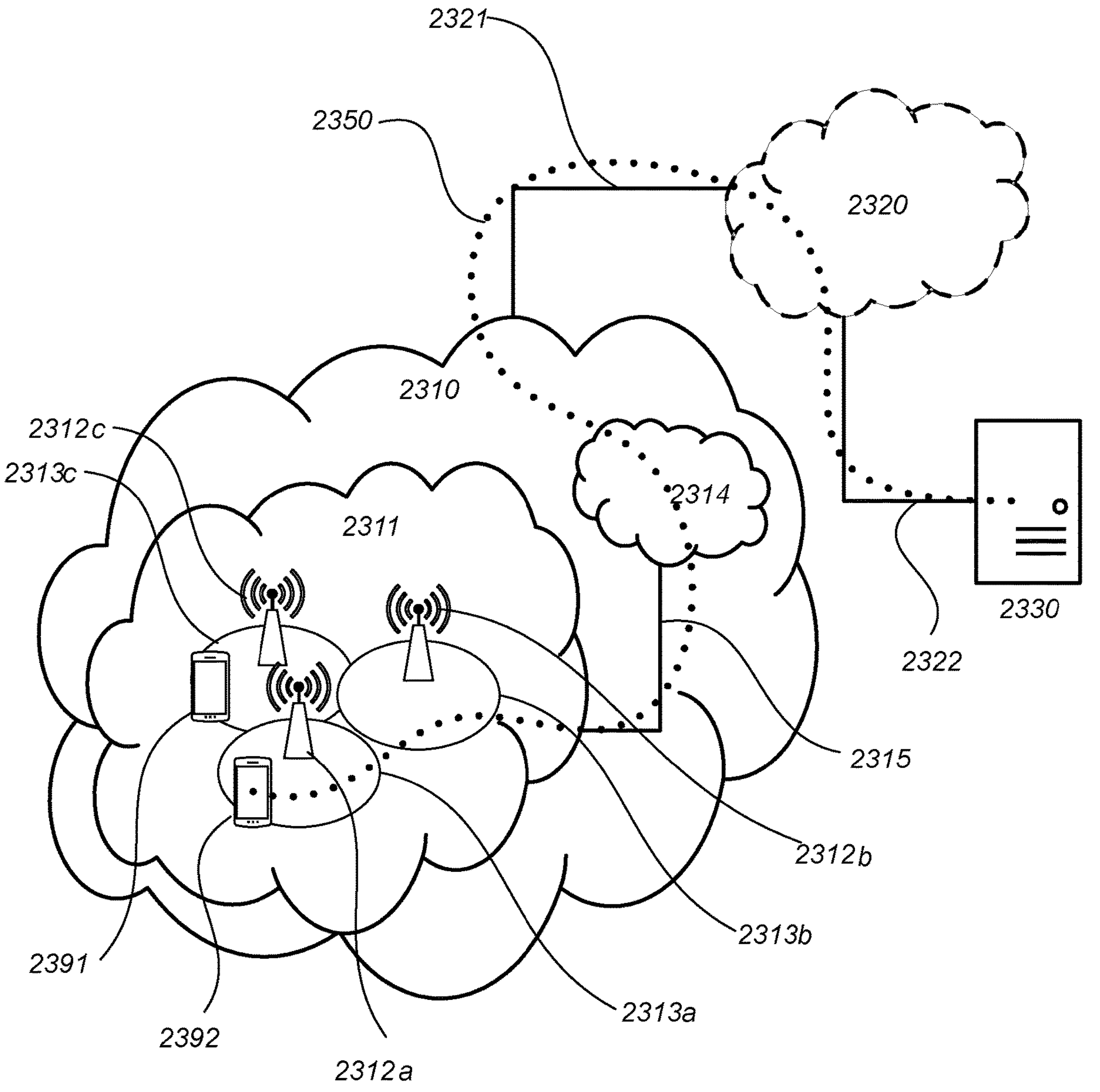
FIG. 23 is a schematic block diagram illustrating a telecommunication network connected via an intermediate network to a host computer, according to embodiments herein.

FIG. 23: Telecommunication Network Connected Via an Intermediate Network to a Host Computer in Accordance with Some Embodiments With reference to FIG. 23, in accordance with an embodiment, a communication system includes telecommunication network 2310 such as the wireless communications network 100, for example, a 3GPP-type cellular network, which comprises access network 2311, such as a radio access network, and core network 2314. Access network 2311 comprises a plurality of network nodes such as the second node 102 and/or the third node 103. For example, base stations 2312*a*, 2312*b*, 2312*c*, such as NBs, eNBs, gNBs or other types of wireless access points, each defining a corresponding coverage area 2313*a*, 2313*b*, 2313*c*. Each base station 2312*a*, 2312*b*, 2312*c* is connectable to core network 2314 over a wired or wireless connection 2315. A plurality of wireless devices, such as the first node 101 are comprised in the wireless communications network 100. In FIG. 23, a first UE 2391 located in coverage area 2313*c* is configured to wirelessly connect to, or be paged by, the corresponding base station 2312*c*. A second UE 2392 in coverage area 2313*a* is wirelessly connectable to the corresponding base station 2312*a*. While a plurality of UEs 2391, 2392 are illustrated in this example, the disclosed embodiments are equally applicable to a situation where a sole UE is in the coverage area or where a sole UE is connecting to the corresponding base station 2312. Any of the UEs 2391, 2392 are examples of the first node 101.

Telecommunication network 2310 is itself connected to host computer 2330, which may be embodied in the hardware and/or software of a standalone server, a cloud-implemented server, a distributed server or as processing resources in a server farm. Host computer 2330 may be under the ownership or control of a service provider, or may be operated by the service provider or on behalf of the service provider. Connections 2321 and 2322 between telecommunication network 2310 and host computer 2330 may extend directly from core network 2314 to host computer 2330 or may go via an optional intermediate network 2320. Intermediate network 2320 may be one of, or a combination of more than one of, a public, private or hosted network; intermediate network 2320, if any, may be a backbone network or the Internet; in particular, intermediate network 2320 may comprise two or more sub-networks (not shown).

The communication system of FIG. 23 as a whole enables connectivity between the connected UEs 2391, 2392 and host computer 2330. The connectivity may be described as an over-the-top (OTT) connection 2350. Host computer 2330 and the connected UEs 2391, 2392 are configured to communicate data and/or signaling via OTT connection 2350, using access network 2311, core network 2314, any intermediate network 2320 and possible further infrastructure (not shown) as intermediaries. OTT connection 2350 may be transparent in the sense that the participating communication devices through which OTT connection 2350 passes are unaware of routing of uplink and downlink communications. For example, base station 2312 may not or need not be informed about the past routing of an incoming downlink communication with data originating from host computer 2330 to be forwarded (e.g., handed over) to a connected UE 2391. Similarly, base station 2312 need not be aware of the future routing of an outgoing uplink communication originating from the UE 2391 towards the host computer 2330.

In relation to FIGS. 24, 25, 26, 27, and 28, which are described next, it may be understood that a UE is an example of the first node 101, and that any description provided for the UE equally applies to the first node 101. It may be also understood that the base station is an example of the second node 102 and/or the third node 103, and that any description provided for the base station equally applies to the second node 102 and/or the third node 103.

The first node 101 may comprise an interface unit to facilitate communications between the first node 101 and other nodes or devices, e.g., the second node 102, the third node 103, the host computer 2410, or any of the other nodes. In some particular examples, the interface may, for example, include a transceiver configured to transmit and receive radio signals over an air interface in accordance with a suitable standard.

The first node 101 may also be configured to communicate user data with a host application unit in a host computer 2410, e.g., via another link such as 2460.

The first node 101 may comprise an arrangement as shown in FIG. 17 or in FIG. 24.

The second node 102 may also be configured to communicate user data with a host application unit in a host computer 2410, e.g., via another link such as 2460.

The second node 102 may comprise an interface unit to facilitate communications between the second node 102 and other nodes or devices, e.g., the first node 101, the third node 103, the host computer 2410, or any of the other nodes. In some particular examples, the interface may, for example, include a transceiver configured to transmit and receive radio signals over an air interface in accordance with a suitable standard.

The second node 102 may comprise an arrangement as shown in FIG. 18 or in FIG. 24.

The third node 103 may also be configured to communicate user data with a host application unit in a host computer 2410, e.g., via another link such as 2460.

The third node 103 may comprise an interface unit to facilitate communications between the third node 103 and other nodes or devices, e.g., the first node 101, the second node 102, the host computer 2410, or any of the other nodes. In some particular examples, the interface may, for example, include a transceiver configured to transmit and receive radio signals over an air interface in accordance with a suitable standard.

The third node 103 may comprise an arrangement as shown in FIG. 19 or in FIG. 24.

FIG. 24: Host Computer Communicating Via a Base Station With a User Equipment Over a Partially Wireless Connection in Accordance With Some Embodiments Example implementations, in accordance with an embodiment, of the first node 101, e.g., a UE, the second node 102 and/or the third node 103, e.g., a base station and host computer discussed in the preceding paragraphs will now be described with reference to FIG. 24. In communication system 2400, such as the wireless communications network 100, host computer 2410 comprises hardware 2415 including communication interface 2416 configured to set up and maintain a wired or wireless connection with an interface of a different communication device of communication system 2400. Host computer 2410 further comprises processing circuitry 2418, which may have storage and/or processing capabilities. In particular, processing circuitry 2418 may comprise one or more programmable processors, application-specific integrated circuits, field programmable gate arrays or combinations of these (not shown) adapted to execute instructions. Host computer 2410 further comprises software 2411, which is stored in or accessible by host computer 2410 and executable by processing circuitry 2418. Software 2411 includes host application 2412. Host application 2412 may be operable to provide a service to a remote user, such as UE 2430 connecting via OTT connection 2450 terminating at UE 2430 and host computer 2410. In providing the service to the remote user, host application 2412 may provide user data which is transmitted using OTT connection 2450.

Communication system 2400 further includes the second node 102 and/or the third node 103, exemplified in FIG. 24 as a base station 2420 provided in a telecommunication system and comprising hardware 2425 enabling it to communicate with host computer 2410 and with UE 2430. Hardware 2425 may include communication interface 2426 for setting up and maintaining a wired or wireless connection with an interface of a different communication device of communication system 2400, as well as radio interface 2427 for setting up and maintaining at least wireless connection 2470 with the first node 101, exemplified in FIG. 24 as a UE 2430 located in a coverage area (not shown in FIG. 24) served by base station 2420. Communication interface 2426 may be configured to facilitate connection 2460 to host computer 2410. Connection 2460 may be direct or it may pass through a core network (not shown in FIG. 24) of the telecommunication system and/or through one or more intermediate networks outside the telecommunication system. In the embodiment shown, hardware 2425 of base station 2420 further includes processing circuitry 2428, which may comprise one or more programmable processors, application-specific integrated circuits, field programmable gate arrays or combinations of these (not shown) adapted to execute instructions. Base station 2420 further has software 2421 stored internally or accessible via an external connection.

Communication system 2400 further includes UE 2430 already referred to. Its hardware 2435 may include radio interface 2437 configured to set up and maintain wireless connection 2470 with a base station serving a coverage area in which UE 2430 is currently located. Hardware 2435 of UE 2430 further includes processing circuitry 2438, which may comprise one or more programmable processors, application-specific integrated circuits, field programmable gate arrays or combinations of these (not shown) adapted to execute instructions. UE 2430 further comprises software 2431, which is stored in or accessible by UE 2430 and executable by processing circuitry 2438. Software 2431 includes client application 2432. Client application 2432 may be operable to provide a service to a human or non-human user via UE 2430, with the support of host computer 2410. In host computer 2410, an executing host application 2412 may communicate with the executing client application 2432 via OTT connection 2450 terminating at UE 2430 and host computer 2410. In providing the service to the user, client application 2432 may receive request data from host application 2412 and provide user data in response to the request data. OTT connection 2450 may transfer both the request data and the user data. Client application 2432 may interact with the user to generate the user data that it provides.

It is noted that host computer 2410, base station 2420 and UE 2430 illustrated in FIG. 24 may be similar or identical to host computer 2330, one of base stations 2312*a*, 2312*b*, 2312*c* and one of UEs 2391, 2392 of FIG. 23, respectively. This is to say, the inner workings of these entities may be as shown in FIG. 24 and independently, the surrounding network topology may be that of FIG. 23.

In FIG. 24, OTT connection 2450 has been drawn abstractly to illustrate the communication between host computer 2410 and UE 2430 via base station 2420, without explicit reference to any intermediary devices and the precise routing of messages via these devices. Network infrastructure may determine the routing, which it may be configured to hide from UE 2430 or from the service provider operating host computer 2410, or both. While OTT connection 2450 is active, the network infrastructure may further take decisions by which it dynamically changes the routing (e.g., on the basis of load balancing consideration or reconfiguration of the network).

Wireless connection 2470 between UE 2430 and base station 2420 is in accordance with the teachings of the embodiments described throughout this disclosure. One or more of the various embodiments improve the performance of OTT services provided to UE 2430 using OTT connection 2450, in which wireless connection 2470 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 2450 between host computer 2410 and UE 2430, in response to variations in the measurement results. The measurement procedure and/or the network functionality for reconfiguring OTT connection 2450 may be implemented in software 2411 and hardware 2415 of host computer 2410 or in software 2431 and hardware 2435 of UE 2430, or both. In embodiments, sensors (not shown) may be deployed in or in association with communication devices through which OTT connection 2450 passes; the sensors may participate in the measurement procedure by supplying values of the monitored quantities exemplified above, or supplying values of other physical quantities from which software 2411, 2431 may compute or estimate the monitored quantities. The reconfiguring of OTT connection 2450 may include message format, retransmission settings, preferred routing etc.; the reconfiguring need not affect base station 2420, and it may be unknown or imperceptible to base station 2420. Such procedures and functionalities may be known and practiced in the art. In certain embodiments, measurements may involve proprietary UE signaling facilitating host computer 2410's measurements of throughput, propagation times, latency and the like. The measurements may be implemented in that software 2411 and 2431 causes messages to be transmitted, in particular empty or 'dummy' messages, using OTT connection 2450 while it monitors propagation times, errors etc.

Figure 25:
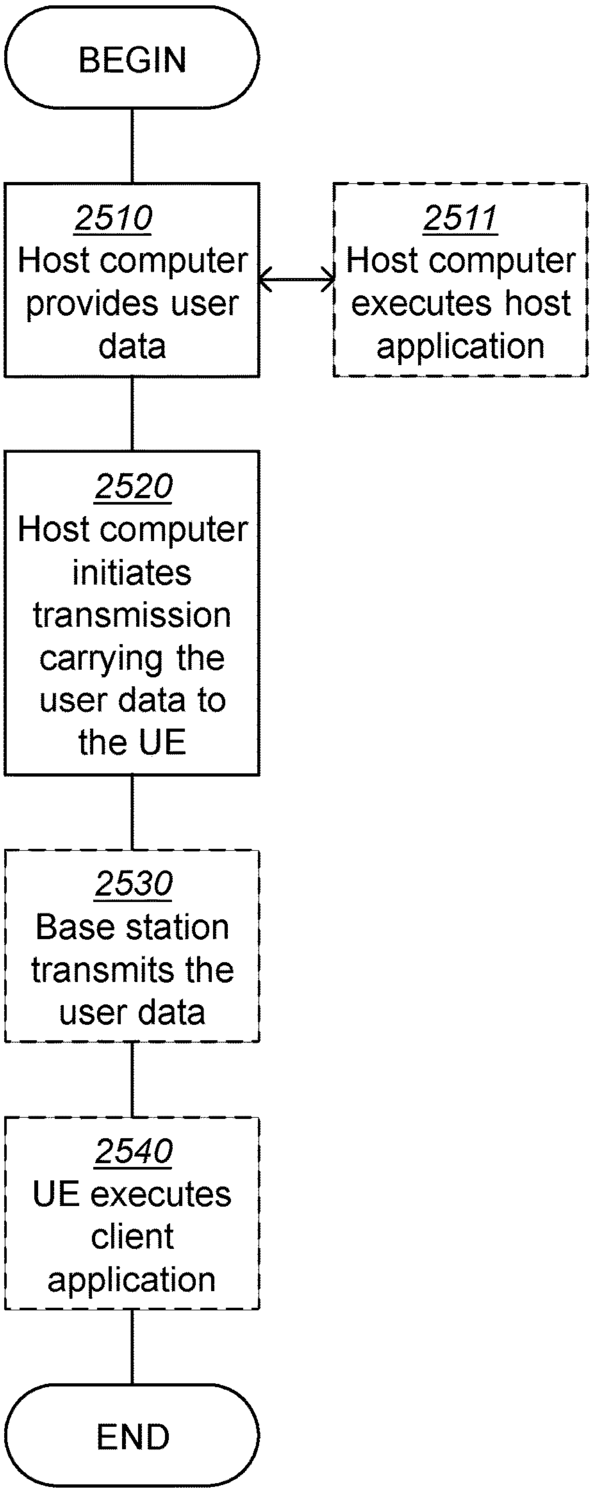
FIG. 25 is a flowchart depicting embodiments of a method in a communications system including a host computer, a base station and a user equipment, according to embodiments herein.

FIG. 25: Methods Implemented in a Communication System Including a Host Computer, a Base Station and a User Equipment in Accordance With Some Embodiments FIG. 25 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 25 will be included in this section. In step 2510, the host computer provides user data. In substep 2511 (which may be optional) of step 2510, the host computer provides the user data by executing a host application. In step 2520, the host computer initiates a transmission carrying the user data to the UE. In step 2530 (which may be optional), the base station transmits to the UE the user data which was carried in the transmission that the host computer initiated, in accordance with the teachings of the embodiments described throughout this disclosure. In step 2540 (which may also be optional), the UE executes a client application associated with the host application executed by the host computer.

Figure 26:
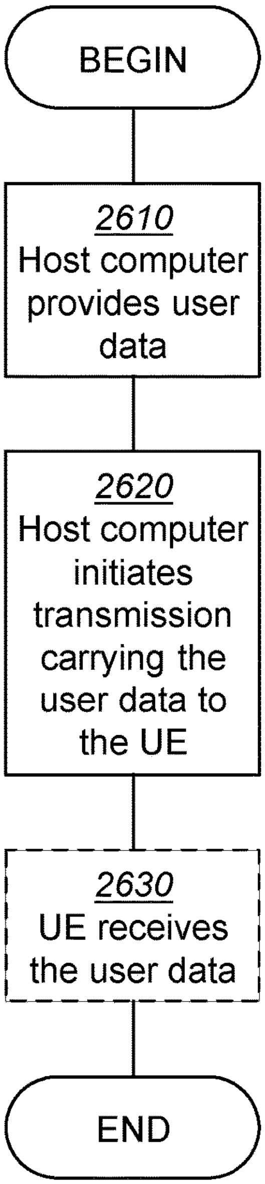
FIG. 26 is a flowchart depicting embodiments of a method in a communications system including a host computer, a base station and a user equipment, according to embodiments herein.

FIG. 26: Methods Implemented in a Communication System Including a Host Computer, a Base Station and a User Equipment in Accordance With Some Embodiments FIG. 26 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 26 will be included in this section. In step 2610 of the method, the host computer provides user data. In an optional substep (not shown) the host computer provides the user data by executing a host application. In step 2620, the host computer initiates a transmission carrying the user data to the UE. The transmission may pass via the base station, in accordance with the teachings of the embodiments described throughout this disclosure. In step 2630 (which may be optional), the UE receives the user data carried in the transmission.

Figure 27:
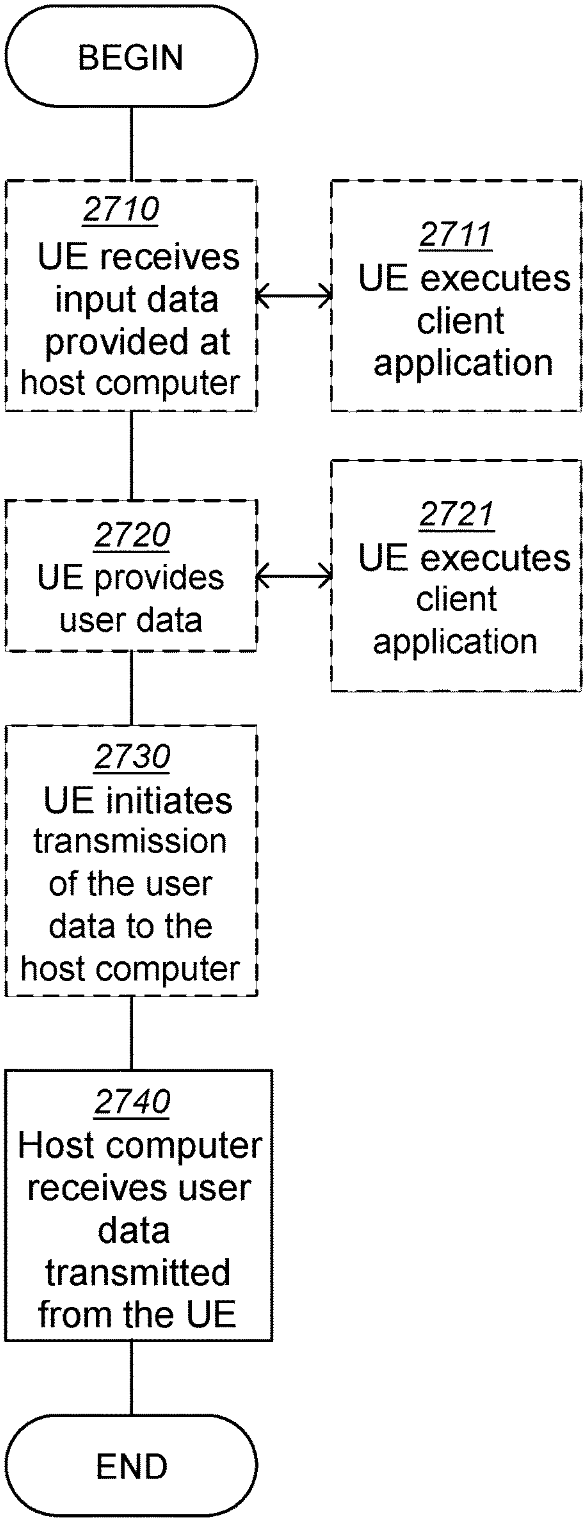
FIG. 27 is a flowchart depicting embodiments of a method in a communications system including a host computer, a base station and a user equipment, according to embodiments herein.

FIG. 27: Methods Implemented in a Communication System Including a Host Computer, a Base Station and a User Equipment in Accordance With Some Embodiments FIG. 27 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 27 will be included in this section. In step 2710 (which may be optional), the UE receives input data provided by the host computer. Additionally or alternatively, in step 2720, the UE provides user data. In substep 2721 (which may be optional) of step 2720, the UE provides the user data by executing a client application. In substep 2711 (which may be optional) of step 2710, the UE executes a client application which provides the user data in reaction to the received input data provided by the host computer. In providing the user data, the executed client application may further consider user input received from the user. Regardless of the specific manner in which the user data was provided, the UE initiates, in substep 2730 (which may be optional), transmission of the user data to the host computer. In step 2740 of the method, the host computer receives the user data transmitted from the UE, in accordance with the teachings of the embodiments described throughout this disclosure.

Figure 28:
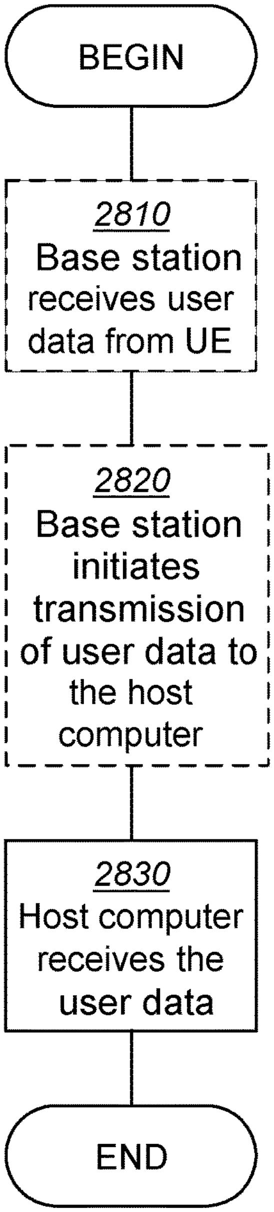
FIG. 28 is a flowchart depicting embodiments of a method in a communications system including a host computer, a base station and a user equipment, according to embodiments herein.

FIG. 28: Methods Implemented in a Communication System Including a Host Computer, a Base Station and a User Equipment in Accordance With Some Embodiments FIG. 28 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 28 will be included in this section. In step 2810 (which may be optional), in accordance with the teachings of the embodiments described throughout this disclosure, the base station receives user data from the UE. In step 2820 (which may be optional), the base station initiates transmission of the received user data to the host computer. In step 2830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by the second node 102 and/or the third node 103.
5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions described herein as performed by the second node 102 and/or the third node 103.
6. The communication system of embodiment 5, further including the base station.
7. The communication system of embodiment 6, further including the UE, wherein the UE is configured to communicate with the base station.
8. The communication system of embodiment 7, wherein:
   the processing circuitry of the host computer is configured to execute a host application, thereby providing the user data; and
   the UE comprises processing circuitry configured to execute a client application associated with the host application.
11. A method implemented in a base station, comprising one or more of the actions described herein as performed by the second node 102 and/or the third node 103.
15. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs one or more of the actions described herein as performed by the second node 102 and/or the third node 103.
16. The method of embodiment 15, further comprising:
   at the base station, transmitting the user data.
17. The method of embodiment 16, wherein the user data is provided at the host computer by executing a host application, the method further comprising:
   at the UE, executing a client application associated with the host application.
21. A user equipment (UE) configured to communicate with a base station, the UE comprising a radio interface and processing circuitry configured to perform one or more of the actions described herein as performed by the first node 101.
25. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's processing circuitry configured to perform one or more of the actions described herein as performed by the first node 101.
26. The communication system of embodiment 25, further including the UE.
27. The communication system of embodiment 26, wherein the cellular network further includes a base station configured to communicate with the UE.
28. The communication system of embodiment 26 or 27, wherein:
   the processing circuitry of the host computer is configured to execute a host application, thereby providing the user data; and
   the UE's processing circuitry is configured to execute a client application associated with the host application.
31. A method implemented in a user equipment (UE), comprising one or more of the actions described herein as performed by the first node 101.
35. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs one or more of the actions described herein as performed by the first node 101.

36. The method of embodiment 35, further comprising:
at the UE, receiving the user data from the base station.

41. A user equipment (UE) configured to communicate with a base station, the UE comprising a radio interface and processing circuitry configured to perform one or more of the actions described herein as performed by the first node 101.

45. A communication system including a host computer comprising:
a communication interface configured to receive user data originating from a transmission from a user equipment (UE) to a base station,
wherein the UE comprises a radio interface and processing circuitry, the UE's processing circuitry configured to: perform one or more of the actions described herein as performed by the first node 101.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
the processing circuitry of the host computer is configured to execute a host application; and
the UE's processing circuitry is configured to execute a client application associated with the host application, thereby providing the user data.

49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.

51. A method implemented in a user equipment (UE), comprising one or more of the actions described herein as performed by the first node 101.

52. The method of embodiment 51, further comprising:
providing user data; and
forwarding the user data to a host computer via the transmission to the base station.

55. A method implemented in a communication system including a host computer, a base station and a user equipment (UE), the method comprising:
at the host computer, receiving user data transmitted to the base station from the UE, wherein the UE performs one or more of the actions described herein as performed by the first node 101.

56. The method of embodiment 55, further comprising:
at the UE, providing the user data to the base station.

57. The method of embodiment 56, further comprising:
at the UE, executing a client application, thereby providing the user data to be transmitted; and
at the host computer, executing a host application associated with the client application.

58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.

61. A base station configured to communicate with a user equipment (UE), the base station comprising a radio interface and processing circuitry configured to perform one or more of the actions described herein as performed by the second node 102 and/or the third node 103.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the second node 102 and/or the third node 103.

66. The communication system of embodiment 65, further including the base station.

67. The communication system of embodiment 66, further including the UE, wherein the UE is configured to communicate with the base station.

68. The communication system of embodiment 67, wherein:
the processing circuitry of the host computer is configured to execute a host application;
the UE is configured to execute a client application associated with the host application, thereby providing the user data to be received by the host computer.

71. A method implemented in a base station, comprising one or more of the actions described herein as performed by the second node 102 and/or the third node 103.

75. A method implemented in a communication system including a host computer, a base station and a user equipment (UE), the method comprising:
at the host computer, receiving, from the base station, user data originating from a transmission which the base station has received from the UE, wherein the UE performs one or more of the actions described herein as performed by the first node 101.

76. The method of embodiment 75, further comprising:
at the base station, receiving the user data from the UE.

77. The method of embodiment 76, further comprising:
at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

| Abbreviation | Explanation |
|---|---|
| C-RNTI | Cell RNTI |
| RNTI | Radio Network Temporary Identifier |
| SI | System Information |

-continued

| Abbreviation | Explanation |
|---|---|
| SIB | System Information Block |
| SS | Synchronization Signal |
| WLAN | Wide Local Area Network |

The invention claimed is:

1. A method, performed by a first node, for providing one or more indications related to a random access procedure by the first node to a second cell, when served by a first cell, the second cell being a secondary cell, the first node operating in a wireless communications network, the method comprising:

registering, in a register, a first identifier of the second cell and one or more first indications, the one or more first indications indicating at least one of:

i. a second identifier of the first cell, ii. a third identifier of a primary secondary cell, iii. a fourth identifier of a first network node owning the first cell, iv. a fifth identifier of a second network node owning the primary secondary cell, and v. an indicator of a cell group the second cell belongs to, and providing, to a second node, one or more second indications based on the registered first identifier and the one or more first indications.

2. The method according to claim 1, wherein at least one of:

a. the random access procedure is one of: a two step procedure and a four step procedure, and b. the registering is performed upon performing the random access procedure to the second cell.

3. The method according to claim 1, wherein the one or more first indications indicate Primary Cell Identity (PCell ID) and its associated Tracking Area Code.

4. The method according to claim 1, wherein the one or more first indications comprise the indicator of the cell group, and the indicator indicates a cell group type the second cell belongs to is a Master Cell Group.

5. The method according to claim 4, wherein the one or more second indications indicate the second identifier.

6. The method according to claim 1, wherein the one or more first indications comprise the indicator of the cell group, and the indicator indicates a cell group type the second cell belongs to is a Secondary Cell Group.

7. The method according to claim 6, wherein the one or more second indications indicate at least one of the second identifier and the third identifier.

8. The method according to claim 1, wherein the one or more first indications indicate at least one of:

a. at least one of a PCell ID, and a Primary Secondary Cell Identity (PSCell ID) and their associated Tracking area codes, b. at least one of a global cell identity of the first cell, wherein the first cell is a primary cell, and a global cell identity of the primary secondary cell, and c. at least one of the identity of the first cell, wherein the first cell is the primary cell, and the global cell identity of the primary secondary cell, and their associated Tracking area codes.

9. The method according to claim 1, wherein the one or more first indications indicate the Global Node Identity of the first cell or the primary secondary cell, the cell global Identity and tracking area code.

10. The method according to claim 1, wherein the first node registers at least one of:

a. the first identifier, the second identifier and the indicator, and b. the first identifier, and another identifier of the second network node owning the second cell.

11. A method, performed by a second node, for handling one or more indications related to a random access procedure by a first node to a second cell, when served by a first cell, the second cell being a secondary cell, the second node and the first node operating in a wireless communications network, the method comprising:

receiving, from the first node, one or more second indications, the one or more second indications indicating a first identifier of the second cell and one or more first indications registered by the first node, the one or more first indications indicating at least one of:

i. a second identifier of the first cell, ii. a third identifier of a primary secondary cell, iii. a fourth identifier of a first network node owning the first cell, iv. a fifth identifier of a second network node owning the primary secondary cell, and v. an indicator of a cell group the second cell belongs to, and sending to a third node, one or more third indications based on the received one or more second indications.

12. The method according to claim 11, wherein the one or more first indications indicate Primary Cell Identity (PCell ID) and its associated Tracking Area Code.

13. The method according to claim 11, wherein the one or more first indications comprise the indicator of the cell group, and the indicator indicates a cell group type the second cell belongs to is a Master Cell Group.

14. The method according to claim 11, wherein the one or more first indications comprise the indicator of the cell group, and the indicator indicates a cell group type the second cell belongs to is a Secondary Cell Group.

15. The method according to claim 14, wherein the one or more second indications indicate at least one of the second identifier and the third identifier.

16. The method according to claim 11, wherein the one or more first indications indicate at least one of:

a. at least one of a PCell ID, and a Primary Secondary Cell Identity (PSCell ID) and their associated Tracking area codes, b. at least one of a global cell identity of the first cell, wherein the first cell is a primary cell, and a global cell identity of the primary secondary cell, and c. at least one of the identity of the first cell, wherein the first cell is the primary cell, and the global cell identity of the primary secondary cell, and their associated Tracking area codes.

17. A method, performed by a third node, for handling one or more indications related to a random access procedure by a first node to a second cell, when served by a first cell, the second cell being a secondary cell, wherein the third node serves or has served the first node in a configuration supporting simultaneous connectivity to more than one cell, the third node and the first node operating in a wireless communications network, the method comprising:

receiving, from a second node, one or more third indications, the one or more third indications indicating a first identifier of the second cell and one or more first indications registered by the first node, the one or more first indications indicating at least one of:

i. a second identifier of the first cell, ii. a third identifier of a primary secondary cell, iii. a fourth identifier of a first network node owning the first cell, iv. a fifth identifier of a second network node owning the primary secondary cell, and v. an indicator of a cell group the second cell belongs to, and adapting a configuration of one or more cells controlled by the third node based on the received one or more third indications.

18. The method according to claim 17, wherein the one or more first indications indicate Primary Cell Identity (PCell ID) and its associated Tracking Area Code.

19. The method according to claim 17, wherein the one or more first indications comprise the indicator of the cell group, and the indicator indicates a cell group type the second cell belongs to is a Master Cell Group.

20. The method according to claim 19, wherein the one or more first indications indicate the second identifier.

21. The method according to claim 17, wherein the one or more first indications indicate at least one of:

a. at least one of a PCell ID and Primary Secondary Cell Identity (PSCell ID) and their associated Tracking area codes, b. at least one of a global cell identity of the first cell, wherein the first cell is a primary cell, and a global cell identity of the primary secondary cell, and c. at least one of the identity of the first cell, wherein the first cell is the primary cell, and the global cell identity of the primary secondary cell, and their associated Tracking area codes.

22. The method according to claim 17, wherein the one or more first indications indicate the Global Node Identity, ID, of the first cell or the primary secondary cell, the cell global Identity and tracking area code.

23. The method according to claim 17, wherein the one or more first indications indicate at least one of:

a. the first identifier, the second identifier and the indicator, and b. the first identifier, and another identifier of the second network node owning the second cell.

24. A first node, for providing one or more indications related to a random access procedure by the first node to a second cell, when served by a first cell, the second cell being configured to be a secondary cell, the first node being configured to operate in a wireless communications network, the first node being further configured to:

register, in a register, a first identifier of the second cell and one or more first indications, the one or more first indications being configured to indicate at least one of:

i. a second identifier of the first cell, ii. a third identifier of a primary secondary cell, iii. a fourth identifier of a first network node configured to own the first cell, iv. a fifth identifier of a second network node configured to own the primary secondary cell, and v. an indicator of a cell group the second cell is configured to belong to, and provide, to a second node, one or more second indications configured to be based on the first identifier and the one or more first indications configured to be registered.

25. The first node according to claim 24, wherein at least one of:

a. the random access procedure is configured to be one of: a two step procedure and a four step procedure, and b. the registering is configured to be performed upon performing the random access procedure to the second cell.

* * * * *